(12) United States Patent
Cook

(10) Patent No.: US 11,169,008 B2
(45) Date of Patent: Nov. 9, 2021

(54) TRANSMITTER AND RECEIVER CONFIGURATION FOR INDUCTIVE POSITION ENCODER

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 40 days.

(21) Appl. No.: 16/863,543

(22) Filed: Apr. 30, 2020

(65) Prior Publication Data

US 2021/0293582 A1    Sep. 23, 2021

Related U.S. Application Data

(63) Continuation-in-part of application No. 16/826,842, filed on Mar. 23, 2020, now Pat. No. 11,067,414.

(51) Int. Cl.
    *G01D 5/20* (2006.01)
    *G01D 5/22* (2006.01)
    *G01B 3/20* (2006.01)

(52) U.S. Cl.
    CPC ........... *G01D 5/2275* (2013.01); *G01B 3/205* (2013.01); *G01D 5/202* (2013.01); *G01D 5/2053* (2013.01)

(58) Field of Classification Search
    CPC ........ G01D 5/2053; G01D 5/20; G01D 5/204; G01D 5/202; G01D 5/2046; G01D 5/2497; G01D 5/2452; G01D 5/2013; G01D 5/2216; G01B 7/003; G01B 3/205
    See application file for complete search history.

(56) References Cited

U.S. PATENT DOCUMENTS

| | | | |
|---|---|---|---|
| 5,841,274 A | | 11/1998 | Masreliez et al. |
| 5,886,519 A | * | 3/1999 | Masreliez ............. G01B 7/003 324/207.17 |
| 5,894,678 A | | 4/1999 | Masreliez et al. |
| 5,901,458 A | | 5/1999 | Andermo et al. |

(Continued)

FOREIGN PATENT DOCUMENTS

| | | |
|---|---|---|
| CN | 1272620 A | 11/2000 |
| CN | 1441226 A | 9/2003 |

(Continued)

*Primary Examiner* — Alesa Allgood
(74) *Attorney, Agent, or Firm* — Seed IP Law Group LLP

(57) ABSTRACT

An electronic position encoder includes a scale and detector. The detector includes a field generating coil (FGC) having elongated portion configurations (EPCs) bounding a generated field area (GFA) aligned with sensing elements in a sensing area, to provide position signals responsive to the scale interacting with the generated field. Sensing elements and EPCs are fabricated in "front" layers of the detector portion. The EPCs include end gradient arrangements (EGAs) configured to reduce field strength in the generated field area as a function of position along the x-axis direction for positions approaching the end of the GFA. A shielded transverse conductor portion (TCP) fabricated in a "rear" layer connects the EPCs and/or EGAs of the FGC via feedthroughs. A conductive shield region (CSR) configuration in a CSR layer between the front and rear layers intercepts at least a majority of a projection of the TCP toward the front layers.

20 Claims, 14 Drawing Sheets

(56) References Cited

U.S. PATENT DOCUMENTS

| | | |
|---|---|---|
| 5,936,399 A | 8/1999 | Andermo et al. |
| 5,973,494 A | 10/1999 | Masreliez et al. |
| 5,998,990 A | 12/1999 | Andermo et al. |
| 6,002,250 A | 12/1999 | Masreliez et al. |
| 6,011,389 A | 1/2000 | Masreliez et al. |
| 6,049,204 A | 4/2000 | Andermo et al. |
| 6,124,708 A * | 9/2000 | Dames ............... G01D 5/2053 324/207.12 |
| 6,157,188 A | 12/2000 | Steinke |
| 6,259,249 B1 | 7/2001 | Miyata |
| 6,329,813 B1 | 12/2001 | Andermo |
| 6,335,618 B1 | 1/2002 | Nahum |
| 6,400,138 B1 | 6/2002 | Andermo |
| 6,522,129 B2 | 2/2003 | Miyata et al. |
| 6,531,866 B2 | 3/2003 | Miyata et al. |
| 6,545,461 B1 | 4/2003 | Miyata |
| 6,573,707 B2 | 6/2003 | Kiriyama et al. |
| 6,628,115 B2 | 9/2003 | Sasaki et al. |
| 6,646,433 B2 | 11/2003 | Milvich |
| 6,646,434 B2 | 11/2003 | Miyata et al. |
| 6,714,004 B2 | 3/2004 | Jagiella |
| 6,720,760 B2 | 4/2004 | Milvich |
| 7,015,687 B2 | 3/2006 | Meyer |
| 7,239,130 B1 | 7/2007 | Milvich |
| 7,530,177 B1 | 5/2009 | Meichle et al. |
| 7,652,469 B2 | 1/2010 | Meyer |
| 7,705,585 B2 | 4/2010 | Howard |
| 7,906,958 B2 | 3/2011 | Nakayama et al. |
| 8,222,891 B2 | 7/2012 | Steinke et al. |
| 8,309,906 B2 | 11/2012 | Kapner et al. |
| 8,847,583 B2 | 9/2014 | Sasaki et al. |
| 8,928,311 B2 | 1/2015 | Sasaki |
| 9,267,819 B2 | 2/2016 | Cook |
| 9,383,184 B2 * | 7/2016 | Tiemann ............... G01B 7/30 |
| 9,435,663 B2 | 9/2016 | Cook |
| D774,928 S | 12/2016 | Matsumiya et al. |
| 9,612,136 B1 | 4/2017 | Cook |
| 9,618,366 B2 | 4/2017 | Nahum |
| 9,678,701 B2 | 6/2017 | Cook |
| 9,778,072 B1 | 10/2017 | Nahum |
| 9,833,802 B2 | 12/2017 | Kalistaja et al. |
| 9,835,473 B2 | 12/2017 | Nahum |
| 9,958,294 B2 | 5/2018 | Cook |
| 10,520,335 B2 | 12/2019 | Cook |
| 10,551,217 B2 | 2/2020 | Cook |
| 10,591,316 B2 | 3/2020 | Cook |
| 10,612,943 B2 | 4/2020 | Cook |
| 2001/0003422 A1 | 6/2001 | Andermo et al. |
| 2001/0020846 A1 | 9/2001 | Miyata |
| 2002/0030484 A1 | 3/2002 | Kiriyama et al. |
| 2002/0030485 A1 | 3/2002 | Gleixner |
| 2003/0090264 A1 | 5/2003 | Milvich |
| 2003/0128028 A1 | 7/2003 | Jordil |
| 2003/0160608 A1 | 8/2003 | Milvich |
| 2006/0103376 A1 | 5/2006 | Ma |
| 2009/0119940 A1 | 5/2009 | Meichle et al. |
| 2011/0254541 A1 | 10/2011 | Sasaki |
| 2012/0007591 A1 | 1/2012 | Howard et al. |
| 2014/0184202 A1 | 7/2014 | Horiguchi et al. |
| 2015/0375246 A1 | 12/2015 | Kalistaja et al. |
| 2016/0054154 A1 | 2/2016 | Cook |
| 2016/0146636 A1 | 5/2016 | Nahum |
| 2017/0089738 A1 | 3/2017 | Cook |
| 2017/0268905 A1 | 9/2017 | Nahum |
| 2017/0268906 A1 | 9/2017 | Nahum |
| 2018/0003524 A1 | 1/2018 | Cook |
| 2018/0058883 A1 | 3/2018 | Cook |
| 2018/0113004 A1 | 4/2018 | Cook |
| 2018/0180452 A1 | 6/2018 | Cook |
| 2018/0195880 A1 | 7/2018 | Cook |
| 2019/0120660 A1 | 4/2019 | Hitchman et al. |
| 2019/0301895 A1 | 10/2019 | Cook |
| 2020/0003581 A1 | 1/2020 | Cook et al. |
| 2020/0003583 A1 | 1/2020 | Cook |

FOREIGN PATENT DOCUMENTS

| | | |
|---|---|---|
| CN | 105415882 A | 3/2016 |
| EP | 1 014 041 A1 | 6/2000 |
| JP | 2018-004628 A | 1/2018 |
| JP | 2018-031777 A | 3/2018 |
| JP | 2018-105854 A | 7/2018 |

* cited by examiner

*(Prior Art - US Pat. No. 10520335)*

*(Prior Art - US Pat. No. 10520335)*

TRANSMITTER AND RECEIVER CONFIGURATION FOR INDUCTIVE POSITION ENCODER

CROSS-REFERENCE TO RELATED APPLICATION(S)

This application is a continuation-in-part of U.S. patent application Ser. No. 16/826,842 entitled "TRANSMITTER AND RECEIVER CONFIGURATION FOR INDUCTIVE POSITION ENCODER" filed Mar. 23, 2020, the disclosure of which is hereby incorporated herein by reference in its entirety.

BACKGROUND

Technical Field

This disclosure relates to measurement instruments, and more particularly to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale. Magnetic and inductive transducers are relatively robust to contamination, and are therefore desirable in many applications.

U.S. Pat. No. 6,011,389 (the '389 patent) describes an induced current position transducer usable in high accuracy applications, U.S. Pat. No. 5,973,494 (the '494 patent) and U.S. Pat. No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 7,906,958 (the '958 patent) describes an induced current position transducer usable in high accuracy applications, wherein a scale having two parallel halves and a plurality of sets of transmitting coils and receiving coils mitigates certain signal offset components that may otherwise produce errors in an induced current position transducer. All of the foregoing are hereby incorporated herein by reference in their entireties. As described in these patents, an induced current transducer may be manufactured using printed circuit board technology and is largely immune to contamination.

However, such systems may be limited in their ability to provide certain combinations of features desired by users, such as combinations of signal strength, compact size, high resolution, cost, robustness to misalignment and contamination, etc. Configurations of encoders that provide improved combinations of these and other features would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction that coincides with an x-axis direction. In various implementations, the electronic position encoder includes a scale, a detector portion, and a signal processing configuration. The scale extends along the measuring axis direction and includes a signal modulating scale pattern comprising at least a first pattern track having a track width dimension along a y-axis direction that is perpendicular to the x-axis direction. In some embodiments, the signal modulating scale pattern includes the first pattern track and a second pattern track extending in the x-axis direction parallel to the first pattern track. Each pattern track comprises signal modulating elements that are arranged to provide a spatially varying characteristic which changes as a periodic function of position along the x-axis direction.

The detector portion is configured to be mounted proximate to the at least first pattern track and to move along the measuring axis direction relative to the at least first pattern track.

In various implementations, the detector portion includes a multi-layer circuit element (e.g., a printed circuit board or multi-layer circuit element) having a front surface that faces the scale during normal operation, A field generating coil configuration (a transmitter) is fixed on the multi-layer circuit element. The field generating coil configuration includes an input portion that connects it to a coil drive signal from a signal processing configuration, and a first-track field generating coil portion configured to nominally surround a first-track generated field area aligned with the first pattern track and generate a first-track changing magnetic flux in the first-track generated field area in response to the coil drive signal. The first-track field generating coil portion may be described as comprising first-track first-side and second-side elongated portion configurations fabricated in one or more elongated portion layer of the multi-layer circuit element and extending along the x-axis direction on first and second sides of the first-track generated field area, wherein the first-track first-side and second-side elongated portion configurations collectively span or define a first-track elongated portion length dimension along the x-axis direction, and a minimum y-axis direction separation between the first-track first-side and second-side elongated portion configurations defines a first-track generated field area minimum width dimension. The first-track field generating coil portion further comprises a set of first-track conductor paths, wherein each member conductor path is connected to at least one of the first-track first-side or second-side elongated portion configurations and at least one member conductor path comprises a shielded layer conductor portion that is fabricated in a first-track shielded conductor layer of the multi-layer circuit element. In various implementations, at least one such shielded layer conductor portion is a transverse conductor portion that extends along a direction transverse to the x-axis direction, and at least one such shielded layer transverse conductor portion spans at least the minimum y-axis direction separation between the first-track first-side and second-side elongated portion configurations and is included in a member conductor path that connects the first-track first-side and second-side elongated portion configurations in the first-track field generating coil portion.

The detector portion further comprises a conductive shield region configuration comprising at least one first-track conductive shield region that extends along the x-axis and y-axis directions and that is fabricated in a first-track shield region layer that is located between the first-track shielded conductor layer and one or more receiver loop layers of the multi-layer circuit element, with respect to their locations along a z-axis direction that is nominally normal to the front surface of the multi-layer circuit element. The detector portion further comprises a plurality of sensing elements comprising respective conductive receiver loops fabricated in the one or more receiver loop layers of the multi-layer circuit element, wherein the conductive receiver loops are distributed along the x-axis direction over a first-track sensing element area that is nominally aligned with the first pattern track. The sensing elements are configured to provide detector signals or detector signal contributions which respond to a local effect on the first-track changing magnetic flux provided by adjacent signal modulating elements of the scale pattern.

The signal processing configuration may be operably connected to the detector portion to provide the coil drive signal and is configured to determine the relative position between the detector portion and the scale pattern based on detector signals input from the detector portion.

In various implementations according to principles disclosed herein, the detector portion is configured as follows:
at each end of the generated field area, at least one of the first-track first-side and second-side elongated portion configurations includes an end gradient arrangement configured to induce a field gradient that reduces the field strength in the generated field area as a function of position along the x-axis direction as the position approaches the end of the generated field area;
at least one end gradient arrangement is connected to an associated one of the member conductor paths that includes an associated shielded layer transverse conductor portion that connects the first-track first-side and second-side elongated portion configurations; and
the conductive shield region configuration comprises at least one first-track conductive shield region that is configured such that it is interposed between the receiver loop layers and the associated shielded layer transverse conductor portion that connects the first-track first-side and second-side elongated portion configurations, and is configured to intercept at least a majority of area of a z-axis projection of that associated shielded layer transverse conductor portion along the z-axis direction toward the receiver loop layers.

It has been found that end gradient arrangements configured as outlined above reliably reduce certain periodic errors that otherwise arise in position measurements due to "end effects" associated with known field generating coil configurations, and are especially useful in reducing the sensitivity of such errors to misalignments that may occur between the detector and scale (e.g., mounting or guiding misalignments, or the like.)

In various implementations, the end gradient arrangements maybe configured according to at least one of a "Type A" end gradient arrangement or a "Type B" end gradient arrangement.

As disclosed herein, a Type A end gradient arrangement comprises at least two respective current path nodes in an associated first-side or second-side elongated portion configuration, including a distal current path node that is closest to the end and farthest from the center of the generated field area with respect to the x-axis direction, and a proximal current path node that is closest to the center and farthest from the end of the generated field area with respect to the x-axis direction. The distal and proximal current path nodes are each connected in the elongated portion layer to a member conductor path (CPX-xx) that carries current outside the elongated portion layer. As a result of such a Type A end gradient arrangement, in the associated elongated portion configuration the net operational current flow in a central region that extends along the x-axis direction to the proximal current path node is relatively greater in the elongated portion layer, and the net operational current flow in an end node region that extends along the x-axis direction between the proximal current path node and the distal current path node is relatively smaller in the elongated portion layer. This results a desirable field gradient near the end of the generated field area.

As disclosed herein, a Type B end gradient arrangement comprises a configuration wherein the first-track first-side and second-side elongated portion configurations are relatively closer to one another along the y-axis direction in the elongated portion layer over a central region that extends along the x-axis direction, and the associated first-side or second-side elongated portion configuration is configured such that the first-track first-side and second-side elongated portion configurations are relatively farther from one another along the y-axis direction in the elongated portion layer over a respective end region that extends along the x-axis direction. A respective end region is associated with a respective Type B end gradient arrangement. The associated first-side or second-side elongated portion configuration is connected in the elongated portion layer in the respective end region to a member conductor path that carries current outside the elongated portion layer. As a result of such a Type B end gradient arrangement, the generated field area is relatively narrower along the y-axis direction along the central region and relatively wider along the y-axis direction along the respective end region associated with a respective Type B end gradient arrangement. This results in a desirable field gradient near the end of the generated field area.

In some implementations, at least one included Type A end gradient arrangement further comprises at least one intermediate current path node located in the end node region between the distal current path node and the proximal current path node, with respect to the x-axis direction. The intermediate current path node is connected in the elongated portion layer to a member conductor path that carries current outside the elongated portion layer. As a result of such a Type A end gradient arrangement, the net operational current flow in the elongated portion layer in a subregion of the end node region between the proximal current path node and the intermediate current path node is relatively smaller than the net operational current flow in the central region and relative larger than the net operational current flow in a subregion of the end node region between the intermediate current path node and the distal current path node. This may result in a particularly desirable field gradient near the end of the generated field area.

In some implementations, in at least one included Type A end gradient arrangement each respective current path node is connected to a respective member conductor path comprising a respective conductive feedthrough that extends generally along the z-axis direction and connects that current path node to a shielded layer conductor portion. In some such Type A end gradient arrangements (EGAs), each respective current path node is connected through its respective conductive feedthrough to the same shielded layer conductor portion, which may be advantageous in some implementations.

In some implementations, such Type A EGAs are used in conjunction with a conductive shield region configuration that comprises respective first-track conductive shield regions interposed between the receiver loop layers and all respective shielded layer transverse conductor portions included in any member conductor paths connected to current path nodes included in any such Type A EGAs. The respective first-track conductive shield regions may be configured to intercept the entire area of a z-axis projection of all the respective shielded layer transverse conductor portions included in any member conductor paths connected to current path nodes included in such Type A EGAs, at least where the z-axis projection overlaps the first-track sensing element area, except where the respective first-track conductive shield regions may include insulating voids that surround the respective conductive feedthroughs.

In various implementations, the signal modulating elements of the first pattern track are arranged corresponding to a spatial wavelength WL along the x-axis direction. In some implementations it is advantageous if each included Type A end gradient arrangement is configured such that its end node region has an end node region dimension ENRDX along the x-axis direction that is at least J*WL, wherein J is a number that is at least 1. In some implementations it is even more advantageous if J is at least 2.

In various implementations that include a Type A end gradient arrangement, the first-track sensing element area may extend over a first-track sensing element area length dimension along the x-axis direction and a first-track sensing element area width dimension along the y-axis direction, and the first-track sensing element area length dimension along the x-axis direction is longer than the first-track elongated portion length dimension (e.g., at each end, by an amount that is at least WL, in some implementations.) In some such implementations, a shielded layer transverse conductor portion included in a member conductor path connected to current path node included in a Type A end gradient arrangement may be configured such that its z-axis projection toward the receiver loop layers at least partially overlaps with the conductive receiver loops in the first-track sensing element area. In some such implementations it may be advantageous if the conductive shield region configuration comprises respective first-track conductive shield regions interposed between the receiver loop layers and all respective shielded layer transverse conductor portions included in any member conductor paths connected to current path nodes included in any Type A end gradient arrangement. The respective first-track conductive shield regions may be advantageously configured to intercept the entire area of a z-axis projection of any/all the respective shielded layer transverse conductor portions included in any member conductor paths connected to current path nodes included in any Type A end gradient arrangement, at least where the z-axis projection overlaps the first-track sensing element area, except where respective first-track conductive shield regions may include insulating voids that surround conductive feedthroughs that extend generally along the z-axis direction and pass through the respective first-track conductive shield regions. In some such implementations, the respective first-track conductive shield regions may be advantageously configured to intercept the entire area of a z-axis projection of any/all the respective shielded layer conductor portions included in any member conductor paths connected to current path nodes included in any Type A end gradient arrangement, including respective shielded layer conductor portions that are not transverse conductor portions.

In some implementations, in at least one included Type B end gradient arrangement the respective end region includes a proximal subregion that is closer to the central region and a distal subregion that is farther from the central region than the proximal subregion. In the distal subregion the first-side and second-side elongated portion configurations are separated relatively farther from one another along the y-axis direction in comparison to their separation in the proximal subregion. This may result in a particularly desirable field gradient along the x-axis direction near the end of the generated field area.

In some implementations, in each included Type B end gradient arrangement its associated first-side or second-side elongated portion configuration comprises at least one respective elongated portion connected in its respective end region to a member conductor path comprising a respective conductive feedthrough and a shielded layer conductor portion, wherein that respective conductive feedthrough connects the respective elongated portion to the shielded layer conductor portion.

In various implementations, the signal modulating elements of the first pattern track are arranged corresponding to a spatial wavelength WL along the x-axis direction. In some implementations it is advantageous if each included Type B end gradient arrangement is configured such the its respective end region extends over an end region dimension ERDX along the x-axis direction that is at least J*WL, wherein J is a number that is at least 1. In some implementations, it is even more advantageous if J as at least 2.

In various implementations that include a Type B end gradient arrangement, the first-track sensing element area may extend over a first-track sensing element area length dimension along the x-axis direction and a first-track sensing element area width dimension along the y-axis direction, and the first-track sensing element area length dimension along the x-axis direction is longer than the first-track elongated portion length dimension (e.g., at each end, by an amount that is at least WL, in some implementations.) In some such implementations, a shielded layer transverse conductor portion that connects the first-side and second-side elongated portion configurations may be included in a member conductor path connected to a Type B end gradient arrangement, and it may be configured such that its z-axis projection toward the receiver loop layers at least partially overlaps with the conductive receiver loops in the first-track sensing element area.

In some such implementations it may be advantageous if the conductive shield region configuration comprises respective first-track conductive shield regions interposed between the receiver loop layers and all such respective shielded layer transverse conductor portions (e.g., shielded layer transverse conductor portions that connect the first-side and second-side elongated portion configurations) that are included in any member conductor paths connected to any Type B end gradient arrangement. The respective first-track conductive shield regions may be advantageously configured to intercept the entire area of a z-axis projection of any/all such respective shielded layer transverse conductor portions that are included in any member conductor paths connected to any Type B end gradient arrangement, at least where the z-axis projection overlaps the first-track sensing element area, except where respective first-track conductive shield regions may include insulating voids that surround conductive feedthroughs that extend generally along the z-axis direction and pass through the respective first-track conductive shield regions. In some such implementations, the respective first-track conductive shield regions may be advantageously configured to intercept the entire area of a z-axis projection of any/all the respective shielded layer conductor portions included in any member conductor paths connected to any Type B end gradient arrangement, including respective shielded layer conductor portions that are not transverse conductor portions.

Some implementations may comprise a field generating coil portion that is configured with multi-turn configuration around the generated field area that includes a plurality of end gradients arrangements (EGAs) that comprise a combination of a Type A end gradient arrangement and a Type B end gradient arrangement. The multi-turn configuration may comprise: a first first-side elongated portion of first-side elongated portion configuration including a proximal current path node of a first-side first-end EGA near a first end of the generated field area, and including a proximal current path node of a first-side second-end EGA near a second end of the generated field area; a first second-side elongated portion of a second-side elongated portion configuration including a proximal current path node of a second-side second-end EGA near the second end of the generated field area, and including a proximal current path node of a second-side first-end EGA near the first end of the generated field area; a second first-side elongated portion of the first-side elongated portion configuration including a distal current path node of the first-side first-end EGA near the first end of the generated field area, and including a distal current path node of the first-side second-end EGA near the second end of the generated field area; and a second second-side elongated portion of the second-side elongated portion configuration including a distal current path node of the second-side second-end EGA near the second end of the generated field area, and including a distal current path node of a second-side first-end EGA near the first end of the generated field area. The proximal current path node of the first-side second-end EGA may be connected in series to the proximal current path node of the second-side second-end EGA through a first member conductor path which comprises a conductive feedthrough that is connected to a shielded layer transverse conductor portion that is connected to a conductive feedthrough. The proximal current path node of the second-side first-end EGA may be connected in series to the distal current path node of the first-side first-end EGA through a second member conductor path which comprises a conductive feedthrough that is connected to a shielded layer transverse conductor portion that is connected to a conductive feedthrough. The distal current path node of the first-side second-end EGA may be connected in series to the distal current path node of the second-side second-end EGA through a third member conductor path which comprises a conductive feedthrough that is connected to a shielded layer transverse conductor portion that is connected to a conductive feedthrough. The distal current path node of the second-side first-end EGA may be connected in series to a drive signal input through a conductor path which comprises a conductive feedthrough and a shielded layer conductor portion, and the proximal current path node of the first-side first-end EGA may be connected in series to a drive signal input through a conductor path which comprises a conductive feedthrough and a shielded layer conductor portion. In some such "multi-turn" implementations, the conductive shield region configuration may comprise respective first-track conductive shield regions interposed between the receiver loop layers and all respective shielded layer transverse conductor portions included in any member conductor paths connected to current path nodes included in the included EGAs.

In various implementations that include Type A and/or Type B end gradient arrangements, it may be advantageous if at each end of the generated field area, each of the first-track first-side and second-side elongated portion configurations comprises an end gradient arrangement (EGA) configured to induce a field gradient that reduces the field strength in the generated field area as a function of position along the x-axis direction as the position approaches the end of the generated field area.

In various implementations Type A and/or Type B end gradient arrangements may be implemented in a detector portion wherein at least one elongated portion layer and at least one receiver loop layer are the same layer of the multi-layer circuit element, and at least one of the first-track elongated portion configurations and at least some portions of the conductive receiver loops are fabricated in that same layer.

In some implementations of the electronic position encoder, the signal modulating scale pattern further includes a second pattern track arranged parallel to the first pattern track, and the first and second pattern tracks each include the signal modulating elements distributed along the x-axis direction. In such implementations, the field generating coil configuration includes a second-track field generating coil portion configured to nominally surround a second-track generated field area that is nominally aligned with the second pattern track and generate a second-track changing magnetic flux in the second-track generated field area in response to the coil drive signal. Various implementations of a such a second-track field generating coil portion may advantageously include various features of any of the "first-track" configurations outlined above, including any features associated with implementing an end gradient arrangement as outlined above.

DETAILED DESCRIPTION

Figure 1:
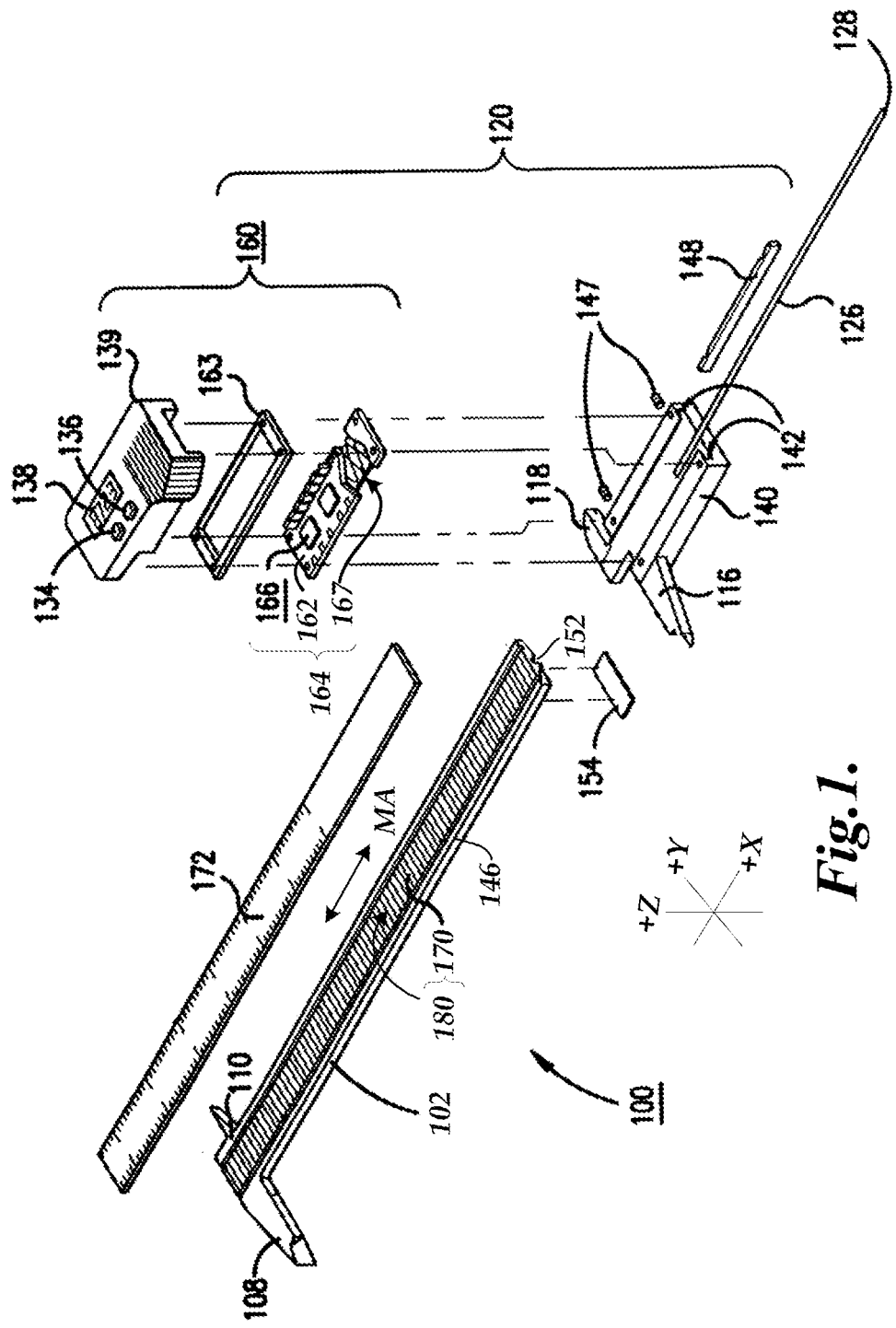
FIG. 1 is an exploded isometric view diagram of a hand tool type caliper utilizing an electronic position encoder including a detector portion and a scale.

FIG. 1 is an exploded isometric view diagram of a hand tool type caliper 100 which may utilize an electronic position encoder including a known detector portion 167 and scale pattern 180, or a novel detector portion 167 and scale pattern 180 according to principles disclosed herein. In the illustrated implementation, the caliper 100 includes a scale member 102 having a spar of roughly rectangular cross-section including a scale 170, and slider assembly 120. In various implementations, the scale 170 may extend along a measuring axis direction MA corresponding to an x-axis direction and may include a signal modulating scale pattern 180. A known type of cover layer 172 (e.g., 100 μm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include an on/off switch 134, a zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which, in this implementation, includes a multi-layer circuit element 162 (e.g., a printed circuit board or PCB) that carries a detector portion 167 including a field generating coil configuration and a group of sensing elements (e.g., collectively, a field generating and sensing winding configuration) arranged along the measuring axis direction MA, and a signal processing configuration 166 (e.g., a control circuit). A resilient seal 163 may be compressed between the cover 139 and the multi-layer circuit element 162 to exclude contamination from the circuitry and connections. The detector portion 167 may be covered by an insulative coating.

In one specific illustrative example, the detector portion 167 may be arranged parallel with and facing the scale 170, and a front face or surface of the detector portion 167 that faces the scale 170 may be separated from the scale 170 (and/or the scale pattern 180) by a gap on the order of 0.5 mm along the depth (Z) direction. Together, the read head portion 164 and the scale 170 may form a transducer as part of an electronic position encoder. In one implementation, the transducer may be an eddy current or inductive type transducer which operates by generating changing magnetic fields, wherein the changing magnetic fields induce circulating currents, known as eddy currents, in some of the signal modulating elements of the scale pattern 180 that are placed within the changing magnetic field, as will be described in more detail below. It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, robustness to contamination, etc. Even small improvements in any of these factors and/or the signal to noise ratio (S/N) achievable in the position encoder are highly desirable, but difficult to achieve, especially in light of the design constraints imposed in order to achieve commercial success in the various applications. The principles disclosed in the following description provide improvements in a number of these factors in a particularly cost effective and compact manner.

Figure 2:
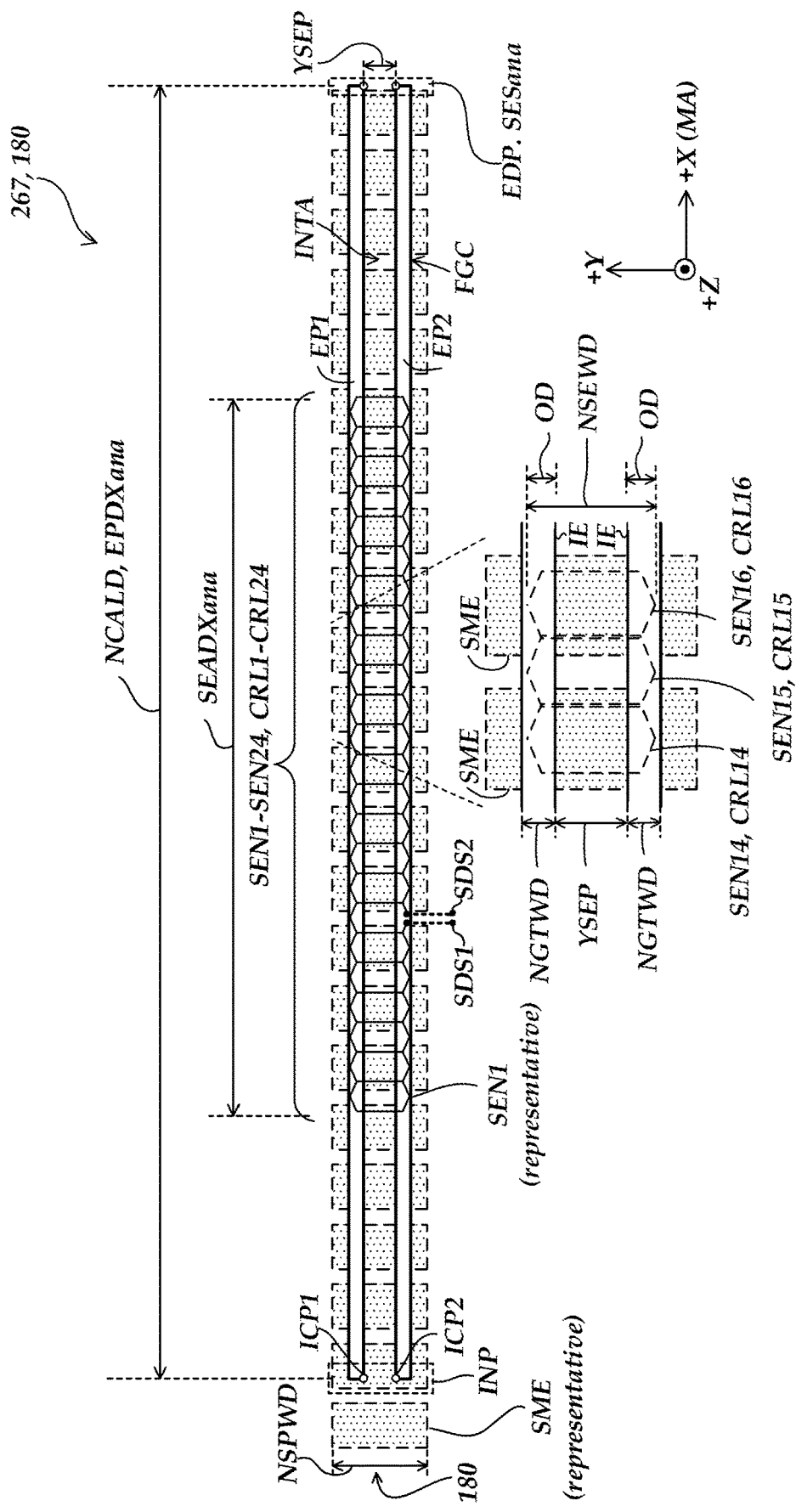
FIG. 2 is a plan view diagram illustrating a prior art implementation of a detector portion usable in an electronic position encoder.
Figure 3:
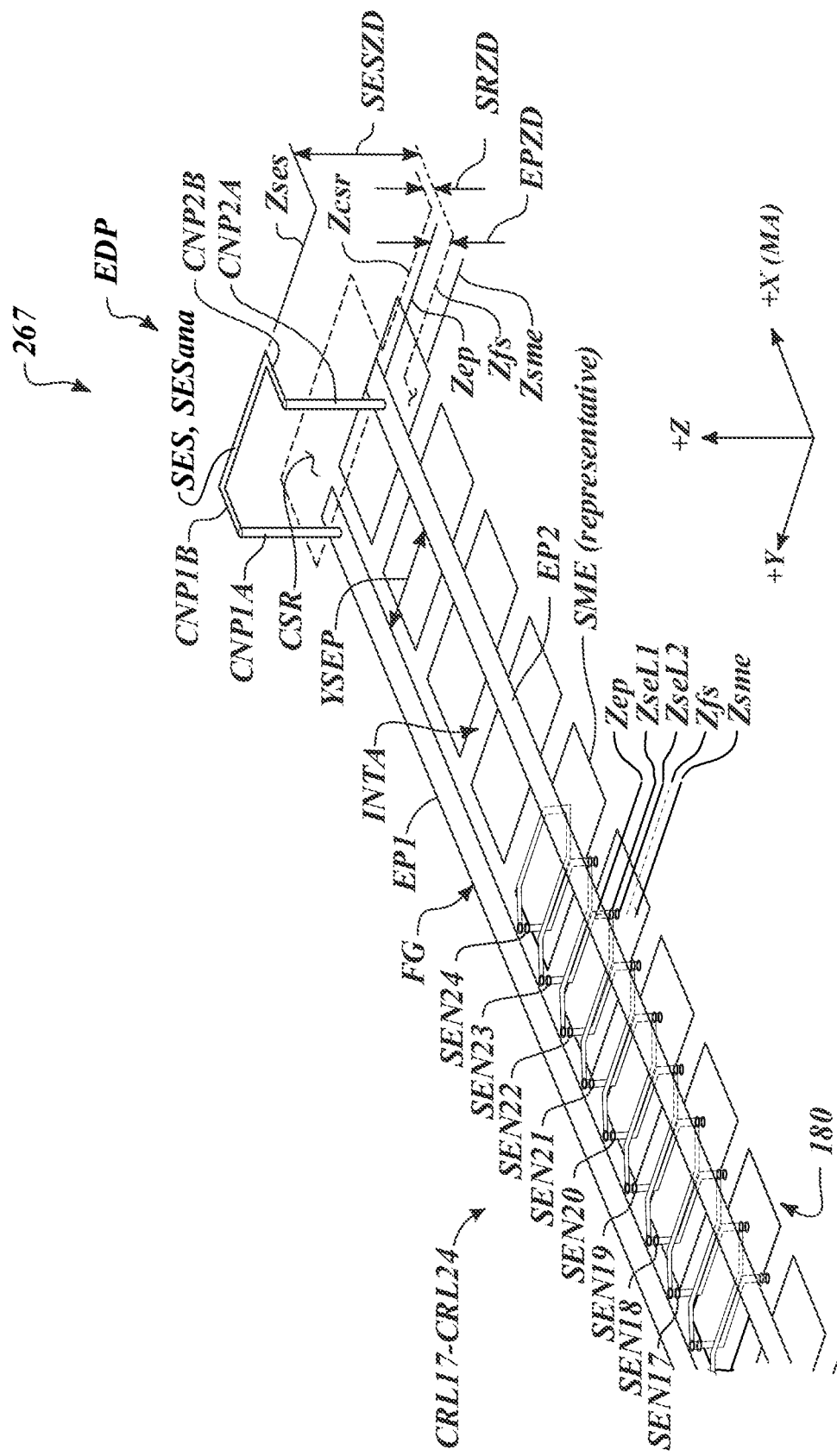
FIG. 3 is an isometric view diagram generally corresponding to FIG. 2 illustrating a prior art implementation of an end portion of a field generating coil configuration of a detector portion, in which the relative placement of field generating elongated portions and conductive receiver loops in the detector portion is more clearly illustrated.

FIG. 2 and FIG. 3 are respective plan view and isometric view diagrams illustrating a known prior art implementation of a detector portion 267 and scale pattern 180 usable as the detector portion 167 and the signal modulating scale pattern 180 in the electronic position encoder shown in FIG. 1, or the like. Only certain features of FIG. 2 and FIG. 3 are described in detail below, insofar as that description provides pertinent background and explanation applicable to the understanding of certain analogous features and operations of the novel electronic position encoders and detector portions described further below with reference to FIGS. 4-9. Additional detail useful in understanding the implementations shown in FIGS. 2 and 3 may be found in commonly assigned U.S. patent Ser. No. 10/520,335 (the '335 patent), which is hereby incorporated by reference in its entirety.

FIG. 2 is a plan view diagram illustrating a known prior art implementation of a detector portion 267 and scale pattern 180. FIG. 2 may be regarded as partly representational, partly schematic. An enlarged section of the detector portion 267 and scale pattern 180 is illustrated in the lower portion of FIG. 2. In FIG. 2, the various elements described below are represented by their shape or outline, and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on generally known design practices and/or as outlined in the following description, and/or in the description further below (with reference to FIG. 3, for example.) In the particular embodiment illustrated in FIGS. 2 and 3, elongated portions EP1 and EP2 of the field generating coil configuration FGC overlap with the conductive receiver loops SEN1-SEN24 and are therefore fabricated using a set of elongated portion metal layers including at least a first interior metal layer of a multi-layer circuit element, and conductive receiver loops SEN1-SEN24 are fabricated using a set of receiver loop metal layers of the multi-layer circuit element that include at least one metal layer that is closer than the first interior metal layer to a front surface of the detector portion that faces the scale pattern 180. With reference to this subject matter, the enlarged section of the detector portion 267 of FIG. 2 illustrates two edges of each of the conductive receiver loops SEN14-SEN16, which overlap with the elongated portions EP1 and EP2, in broken lines to indicate that the conductive receiver loops are closer than the elongated portions to the front surface of the detector portion. (See also, FIG. 3.) On the other hand, the main view of the detector portion 267 of FIG. 2 illustrates two edges of each of the conductive receiver loops SEN1-SEN24 in solid lines, for ease of illustration only. Throughout the figures of this disclosure, it will be appreciated that the x-axis, y-axis and/or z-axis dimensions of one or more elements may be exaggerated for clarity.

The illustrated portion of the scale pattern 180 includes signal modulating elements SME shown in dashed outline, which are located on the scale 170 (shown in FIG. 1). The y-direction extremes of most of the signal modulating elements SME are hidden below the first and second elongated portions EP1 and EP2 in the embodiment illustrated in FIG. 2. It will be appreciated that the scale pattern 180 moves relative to the detector portion 267 during operation, as may be seen in FIG. 1.

In the example of FIG. 2, the scale pattern 180 has a nominal scale pattern width dimension NSPWD along a y-axis direction that is perpendicular to the x-axis, and comprises discrete signal modulating elements SME that are arranged periodically along the measuring axis direction MA (e.g., corresponding to an x-axis direction). However, more generally, the scale pattern 180 may comprise various alternative spatially modulated patterns including discrete elements, or one or more continuous pattern element(s), provided that the pattern has a spatial characteristic which changes as a function of position along the x-axis direction, so as to provide position dependent detector signals (also referred to as detector signal components, in some embodiments) arising in the sensing elements SEN (e.g., SEN14) of the detector portion 267, according to known methods.

In various implementations, the detector portion 267 is configured to be mounted proximate to the scale pattern 180, and to move along the measuring axis direction MA relative to the scale pattern 180. The detector portion includes a field generating coil configuration FGC and a plurality of sensing elements SEN, which may take a variety of alternative configurations to be used in combination with a variety of corresponding signal processing schemes in various embodiments, as will be understood by one skilled in the art based on the following disclosure. FIG. 2 shows a single representative set of sensing elements SEN1-SEN24, which in this particular embodiment comprise conductive receiver loops CRL1-CRL24 (alternatively referred to as sensing loop elements, sensing coil elements or sensing winding elements) which are connected in series. In this embodiment, adjacent loop elements are connected by a configuration of conductors on various layers of the multi-layer circuit element (e.g., as connected by feedthroughs) according to known methods such that they have opposite winding polarities. That is, if a first loop responds to a changing magnetic field with a positive polarity detector signal contribution, then the adjacent loops respond with a negative polarity detector signal contribution. In this particular embodiment, the sensing elements are connected in series such that their detector signals or signal contributions are summed, and a "summed" detector signal is output at the detector signal output connections SDS1 and SDS2 to a signal processing configuration (not shown). Although FIG. 2 shows a single set of sensing elements to avoid visual confusion, it will be appreciated that in various embodiments it is advantageous to configure the detector to provide one or more additional sets of sensing elements at a different spatial phase position (e.g., to provide quadrature signals), as will be understood by one of ordinary skill in the art. It should be appreciated that the configurations of sensing elements described herein are exemplary only, and not limiting. As one example, individual sensing element loops may output individual signals to a corresponding signal processing configuration in some embodiments, for example, as disclosed in commonly assigned U.S. Pat. App. Pub. No. 2018/003524, which is hereby incorporated by reference in its entirety. More generally, various known sensing element configurations may be used in combination with the principles disclosed and claimed herein, for use in combination with various known scale pattern and signal processing schemes, in various embodiments.

The various sensing elements and the field generating coil configuration FGC may be fixed on a substrate (e.g., multi-layer circuit element 162 of FIG. 1). The field generating coil configuration FGC may be described as surrounding an interior area INTA having a nominal coil area length dimension NCALD along the x-axis direction and a nominal coil area width dimension of approximately YSEP along the y-axis direction. In various implementations, the field generating coil configuration FGC may comprise a single turn surrounding the interior area INTA. In operation, the field generating coil configuration FGC generates a changing magnetic flux in the interior area INTA in response to a coil drive signal.

In various implementations, the field generating coil configuration FGC may include an input portion INP, first and second elongated portions EP1 and EP2, and an end portion EDP (e.g., implemented as disclosed with reference to FIG. 3). The input portion INP includes first and second input connection portions ICP1 and ICP2 that connect a coil drive signal from a signal processing configuration (e.g., the signal processing configuration 166 of FIG. 1, or the signal processing configuration 966 of FIG. 9, etc.) to the field generating coil configuration FGC. The first and second connection portions ICP1 and ICP2 may be connected to the signal processing configuration through printed circuit board feedthroughs or the like, and the connections may also be shielded utilizing principles analogous to those disclosed below with reference to the end portion EDP, in some embodiments. The first and second elongated portions EP1 and EP2 each extend along the x-axis direction adjacent or proximate to a side of the interior area INTA, and have a nominal generating trace width dimension NGTWD along the y-axis direction. In the illustrated embodiment, the nominal generating trace width dimensions NGTWD are the same for the first and second elongated portions EP1 and EP2, but this is not a requirement in all embodiments. The end portion EDP (e.g., implemented as disclosed with reference to FIG. 3) spans the y-axis direction separation corresponding to the nominal coil width dimension YSEP between the first and second elongated portions EP1 and EP2 to provide a connection therebetween near an end of the interior area INTA. In the known implementation shown in FIGS. 2 and 3, the field generating coil configuration FGC is advantageously configured using a design ratio wherein each nominal generating trace width dimension NGTWD may be at least 0.1 times, or 0.15 times, or 0.25 times the nominal coil area width dimension YSEP, and/or at least 25 times the skin depth of the elongated portions EP1 and EP2 in order to minimize the impedance of the field generating coil configuration FGC at a nominal operating frequency defined corresponding to detector signals that arise in response to the changing magnetic flux. However, despite its utility in various known implementations, it should be appreciated that this design ratio is not required in various novel implementations disclosed herein which may minimize the impedance of the field generating coil configuration FGC by other means.

The sensing elements SEN1-SEN24 are arranged along the x-axis direction (e.g., corresponding to the measuring axis direction MA) and are fixed on the substrate (e.g., multi-layer circuit element 162 of FIG. 1). In the example of FIG. 2, each of the sensing elements SEN has a nominal sensing element width dimension NSEWD along the y-axis direction, wherein at least a majority of the nominal sensing element width dimension NSEWD is included within the nominal coil area width dimension YSEP along the y-axis direction. The sensing elements SEN are configured to provide detector signals which respond to a local effect on the changing magnetic flux provided by an adjacent signal modulating portion of the scale pattern 180 (e.g., one or more signal modulating elements SME) of the scale 170. A signal processing configuration (e.g., the signal processing configuration 166 of FIG. 1, or the signal processing configuration 966 of FIG. 9, etc.) may be configured to determine a position of the plurality of sensing elements SEN1-SEN24 relative to the scale pattern 180 (or the scale 170) based on the detector signals input from the detector portion 267. In general, the field generating coil configuration FGC and the sensing elements SEN1-SEN24, or the like, may operate according to known principles (e.g., for inductive encoders), such as those described in the incorporated references.

In various implementations, the field generating coil configuration FGC and the sensing elements SEN are insulated from one another. In some implementations, they are located in different metal layers separated by insulating layers in a multi-layer circuit element, as previously described. Such is the case in the known implementation illustrated in FIGS. 2 and 3, wherein the nominal sensing element width dimension NSEWD of at least one sensing element SEN is advantageously greater than the nominal coil area width dimension YSEP between the elongated portions EP1 and EP2 and extends beyond an interior edge IE of at least one of the elongated portions EP1 or EP2 by an amount defined as an overlap dimension OD. In addition, the field generating coil configuration FGC may be advantageously configured such that each nominal generating trace width dimension NGTWD is larger than the corresponding overlap dimension OD, in various embodiments. These and other features described above for the known implementation illustrated in FIGS. 2 and 3 are generally selected to optimize the impedances and signal coupling in the detector portion 267, in order to maximize its S/N ratio and/or accuracy. However, despite their utility in various known implementations, it should be appreciated that these design features are not necessarily required in various novel implementations according to principles disclosed here. These novel implementations may achieve equal or better impedances and signal coupling by other means, as disclosed with reference to FIGS. 4-8, in order to equal or better S/N ratios and/or accuracy.

As described above with respect to FIG. 1, in various implementations the detector portion 267 may be included in various types of measurement instruments (e.g., calipers, micrometers, gauges, linear scales, etc.). For example, the detector portion 267 may be fixed to a slide member, and the scale pattern 180 may be fixed to a beam member having a measuring axis that coincides with an x-axis direction. In such a configuration, the slide member may be movably mounted on the beam member and movable along the measuring axis direction MA in a plane that extends along the x-axis direction and a y-axis direction, with a z-axis direction being orthogonal to the plane.

FIG. 3 is an isometric view "wire frame" diagram generally corresponding to FIG. 2 and illustrating a prior art implementation of an end portion EDP of a field generating coil configuration FGC usable in the detector portion 267, in which the relative placement of the elongated portions EP1 and EP2 and the end portion EDP of the field generating coil configuration FGC and the conductive receiver loops SEN in the detector portion 267 are more clearly illustrated. It will be appreciated that the elements of the detector portion 267 of FIG. 3 may be similar or identical to the similarly numbered elements of the detector portion 267 of FIG. 2 and may be generally understood by analogy thereto.

The detector portion 267 is shown to include the field generating coil configuration FGC and the plurality of sensing elements SEN1-SEN24 (representative sensing elements SEN17-SEN24 comprising conductive receiver loops CRL14-CRL24 are illustrated in FIG. 3). The field generating coil configuration FGC includes the first and second elongated portions EP1 and EP2 and the end portion EDP and is fixed on a multi-layer circuit element 162 (e.g., the multi-layer circuit element 162 shown in FIG. 1) and nominally surrounds the interior area INTA.

In various implementations, the field generating coil configuration FGC and the sensing elements SEN are insulated from one another, e.g., as located in different conductive layers of a printed circuit board that are separated by intervening insulating layers as previously outlined. In the particular implementation shown in FIG. 3, the elongated portions EP1 and EP2 of the field generating coil configuration FGC are fabricated using a set of elongated portion metal or conductive layers including at least a first interior metal layer (at a Z coordinate Zep in FIG. 3) of the multi-layer circuit element, and conductive receiver loops SEN1-SEN24 are fabricated using a set of receiver loop metal layers of the multi-layer circuit element that include two metal layers (at a Z coordinates ZseL1 or ZseL2) that are closer than the first interior metal layer (at Zep) to a front surface of the detector portion (at a Z coordinate Zfs) that faces the scale pattern 180. In FIG. 3, the various labeled Z coordinates may be understood to coincide with or identify respective surfaces of various multi-layer circuit element layers. In various embodiments, the multi-layer circuit element may comprise a PCB, a thick film hybrid circuit, a thin film circuit, or other alternative fabrication methods may be used according to known methods. The signal modulating elements SME of the scale pattern 180 reside on a surface of the scale 170 (shown in FIG. 1), at a Z coordinate Zsme. It will be understood that the scale 170 is separate from the multi-layer circuit element that carries the detector portion 267. As described above, the multi-layer circuit element (the detector portion 267) has a front surface (e.g., a front surface of an insulative coating) located at Z coordinate Zfs. An operating gap exists between the scale surface Z coordinate Zsme and the front surface Z coordinate Zfs. The sensing elements SEN comprise interconnected conductive receiver loops fabricated using a set of receiver loop metal layers of the multi-layer circuit element that include at least one metal layer at Z coordinate ZseL1 or ZseL2. The conductive receiver loops may be connected between the layers (at Z coordinates ZseL1 and ZseL2) using known types of conductive feedthroughs through insulating layers which generally separate the metal layers according to known methods, such that conductive portions of the conductive receiver loops may cross over one another while connecting the sensing elements signal contributions in a serial manner and providing respective signal contribution polarities, as will be more fully described below.

In the particular implementation shown in FIG. 3, the first and second elongated portions EP1 and EP2 each extend along the x-axis direction and are nominally located at the elongated portion z distance EPZD=(Zep−Zfs) from the front surface (Zfs) of the multi-layer circuit element of the detector portion 267 that faces the scale pattern 180, along a z-axis direction that is perpendicular to the x-axis and y-axis directions. In some implementations, the conductive receiver loops include planar trace loop portions formed in respective layers included in the set of receiver loop metal layers (at ZseL1 and ZseL2), and feedthrough portions including plated holes that connect the planar trace portions between their respective layers. In the illustrated implementation, the planar trace portions are fabricated in respective layers (at ZseL1 and ZseL2) that are closer to the front surface of the detector portion (at Zfs) than the first interior metal layer (at Zep). In some implementations, at least some of the planar trace portions of the conductive receiver loops may be fabricated in a respective layer (at ZseL1 or ZseL2) that is a metal layer located on the front surface of the detector portion (at Zfs) or that is closest to the front surface of the detector portion.

As outlined previously, the end portion EDP comprises a conductive path that spans a y-axis direction separation corresponding to the nominal coil area width dimension YSEP between the first and second elongated portions EP1 and EP2 to provide a connection therebetween near an end of the interior area INTA. In the implementation shown in FIG. 3, the end portion EDP includes a shielded end section SES that resides on a respective multi-layer circuit element layer having a Z coordinate Zses, which is nominally located at a shielded end section z distance SESZD=(Zses−Zfs) from the front surface (Zfs) of the multi-layer circuit element of the detector portion 267, wherein the shielded end section z distance SESZD is greater than the elongated portion z distance EPZD. In the particular implementation shown in FIG. 3 the shielded end section SES is offset along the x-axis direction from the ends of the elongated portions EP1 and EP2, and a first connection portion CNP1 (e.g., comprising a multi-layer circuit element feedthrough CNP1A and a conductive trace CNP1B) connects the first elongated portion EP1 to a first end of the shielded end section SES, and a second connection portion CNP2 (e.g., comprising a multi-layer circuit element feedthrough CNP2A and a conductive trace CNP2B) connects the second elongated portion EP2 to a second end of the shielded end section SES. In an alternative implementation (not shown in FIG. 3) the shielded end section SES need not be significantly offset along the x-axis direction from the ends of the elongated portions EP1 and EP2, and the conductive traces CNP1B and CNP2B may be omitted. That is, the multi-layer circuit element feedthrough CNP1A may connect the first elongated portion EP1 to a first end of the "non-offset" shielded end section SES, and the multi-layer circuit element feedthrough CNP2A may connect the second elongated portion EP2 to a second end of the "non-offset" shielded end section.

In either implementation of the end portion EDP outlined above, the detector portion 267 further includes a conductive shield region CSR (e.g., a conductive plane region represented by somewhat arbitrarily placed dashed "edge" lines in FIG. 3), extending along the x-axis and y-axis directions and nominally located on a respective multi-layer circuit element layer surface having a Z coordinate Zcsr, which is nominally located at a shield region z distance SRZD=(Zcsr−Zfs) from the front surface of the multi-layer circuit element of the detector portion 267. In various implementations, the shield region z distance SRZD is smaller than the shielded end section z distance SESZD, and the conductive shield region CSR is located between at least part of the shielded end section SES and the front surface (Zfs) of the multi-layer circuit element of the detector portion 267. The conductive shield region CSR may comprise a portion of an extensive ground plane layer in the multi-layer circuit element of the detector portion 267, or it may comprise a discrete region in some embodiments. The conductive shield region CSR may include clearance holes such that the first and second connection portion CNP1 and CNP2 (e.g., multi-layer circuit element feedthroughs) are separated from or insulated from the conductive shield region CSR.

As taught in the '335 patent, prior to the use of a shielded end section configuration according to the principles outlined above with reference to FIG. 3, field components generated by the end portions of field generating coil configurations (e.g., end portions that extend along the y-axis direction) have caused error components to arise in the detector signals of the sensing elements closest to them—a so-called "end effect". It has been attempted to mitigate this end effect using "tapered end configurations" in the detector, and/or by spacing the field generating coil end portions far from the end sensing elements. However, these approaches undesirably reduce signal strength, or increase the detector x-axis dimension, or both. In contrast, the shielded end section configuration outlined above, with reference to FIG. 3, tends to reduce the field component generated by an end portion and/or prevent it from reaching the signal modulating elements SME. As such, the field component that is coupled to the closest sensing elements is smaller and/or approximately constant regardless of the scale position, thus substantially mitigating any end effect. The '335 patent further summarizes that a shielded end section configuration, such as that outlined above with reference to FIG. 3, uses a conductive shield region(s) CSR to reduce the effect (e.g., related to the changing magnetic flux) of the shielded end section SES on the sensing elements SEN, which may allow a shorter overall x-axis dimension for the field generating coil configuration FGC (or detector portion 267), for which the end portion EDP does not need to be located as far away from the sensing elements SEN in order to avoid influencing the detector signals that arise in response to the changing magnetic flux, etc.

However, while the '335 patent (which is commonly assigned with this application) suggests that an end portion of a field generating coil configuration FGC need not be located as far away from the sensing elements SEN relative to previous conventional configurations, it still discloses and teaches only configurations that include some separation between the end portion EDP of a field generating coil configuration FGC and the nearest sensing element SEN. In particular, the '335 patent does not recognize or suggest that an end portion EDP or a shielded end section SES may be located proximate to or overlap with any sensing element SEN. In contrast, the inventor has discovered configurations in which it is advantageous for an end portion EDP or a shielded end section SES to be located proximate to and/or overlapping with a sensing element SEN. Or stated another way, the inventor has discovered configurations in which it is advantageous for the field generating coil configuration FGC to be substantially shorter than previously known configurations, and for the plurality of sensing elements SEN to extend beyond the end portion EDP or a shielded end section SES of the field generating coil configuration FGC, along the x-axis direction. Various features and alternatives usable in such configurations are disclosed below with reference to FIGS. 4-8.

Figure 4:
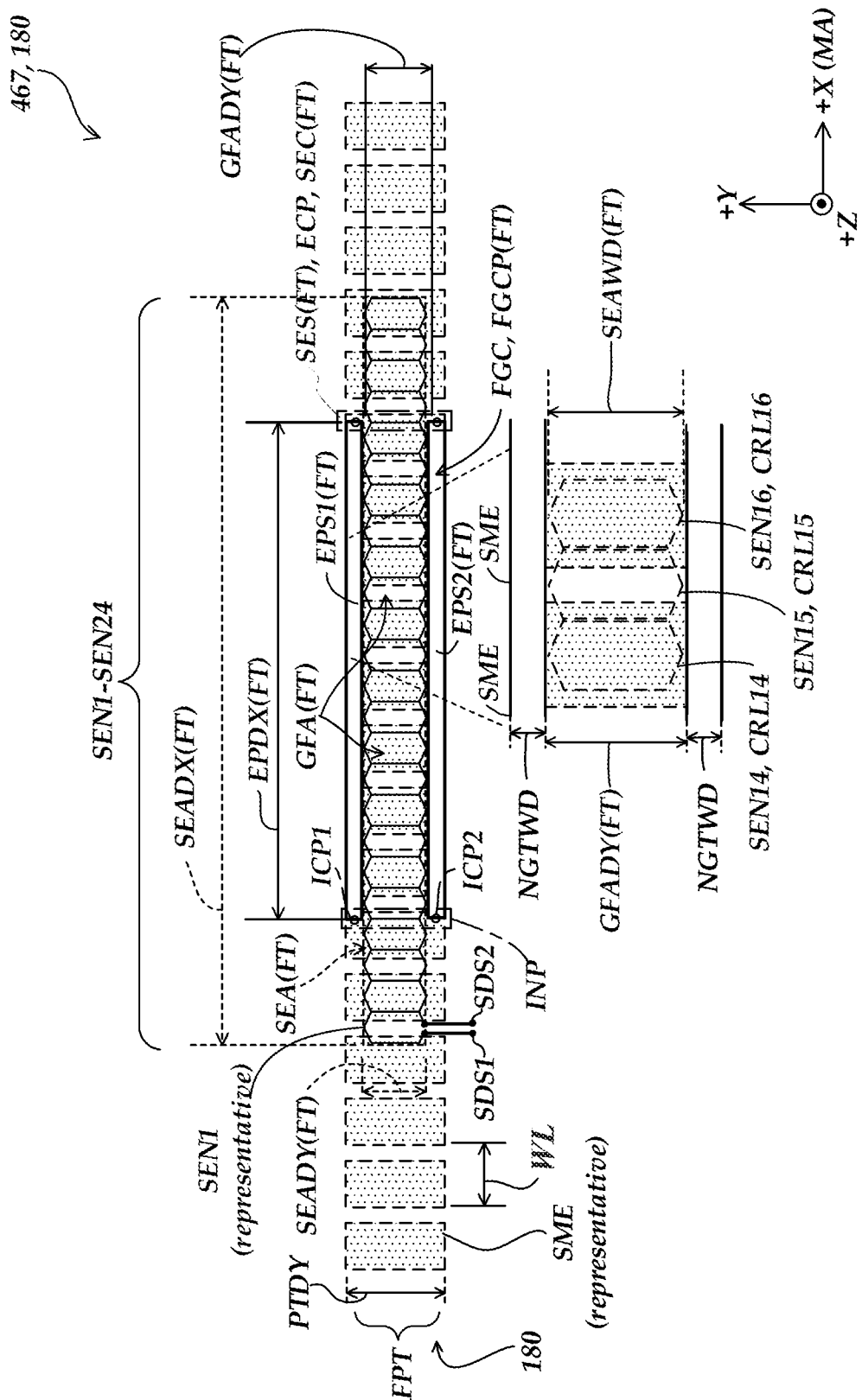
FIG. 4 is a plan view diagram illustrating a first exemplary implementation of a detector portion according to principles disclosed herein and a compatible scale pattern usable in an electronic position encoder.
Figure 5:
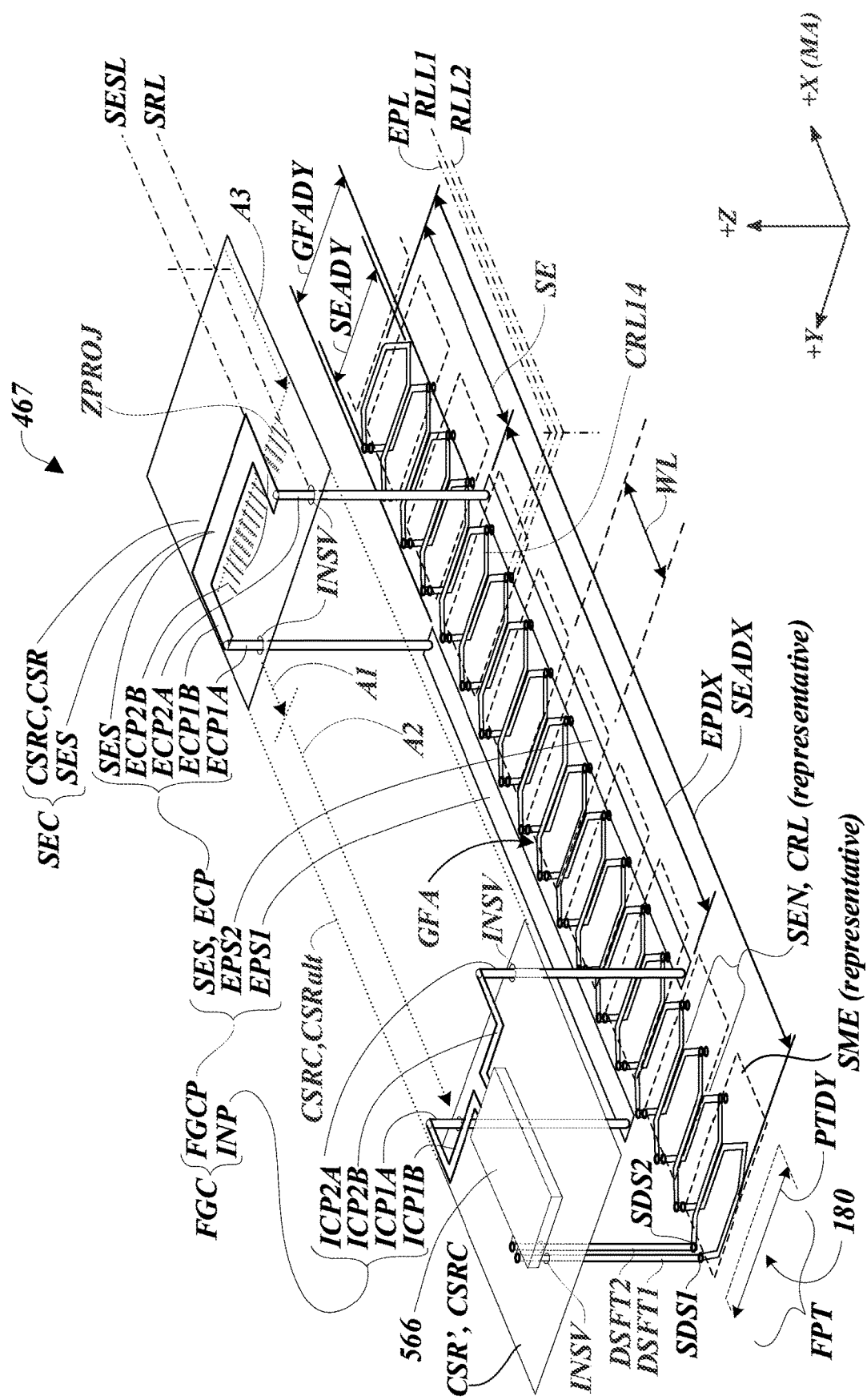
FIG. 5 is an isometric view diagram illustrating the first exemplary implementation generally corresponding to FIG. 4, in which the relative placement of field generating elongated portions and conductive receiver loops in the detector portion is more clearly illustrated.

FIG. 4 and FIG. 5 are respective plan view and isometric view diagrams illustrating a first implementation of a detector portion 467 according to principles disclosed and claimed herein, and a compatible scale pattern 180, usable as the detector portion 167 and the signal modulating scale pattern 180 in the electronic position encoder shown in FIG. 1, or the like. The detector portion 467 has certain characteristics and components similar to the detector portion 267 of FIGS. 2 and 3. In particular, elements designated by similar reference numbers in FIGS. 4 and 2 or in FIGS. 5 and 3 (e.g., similar names or numerals or numerical "suffixes"), or elements that are otherwise obviously similar elements in various figures, are analogous elements, and may be understood to operate similarly, except as otherwise indicated below. Only certain features of FIG. 4 and FIG. 5 are described in detail below, insofar as that description is intended to emphasize novel features and/or benefits according to principles disclosed and claimed herein, and the figures may otherwise be understood by analogy to other figures and description included herein, or in the incorporated references, by one of ordinary skill in the art.

FIG. 4 is a plan view diagram illustrating a first exemplary implementation of a detector portion 467 and a compatible scale pattern 180 usable in an electronic position encoder. FIG. 4 may be regarded as partly representational, partly schematic. As previously indicated, throughout the figures of this disclosure, it will be appreciated that the x-axis, y-axis and/or z-axis dimensions of one or more elements may be exaggerated for clarity. An enlarged section of the detector portion 467 and scale pattern 180 is illustrated in the lower portion of FIG. 4. In FIG. 4, the various elements described below are represented by their shape or outline and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on generally known design practices and/or as outlined in the following description, and/or in the description further below (with reference to FIG. 5, for example.)

As shown in FIGS. 4 and 5, the signal modulating scale pattern 180 includes a first pattern track FPT having a pattern track width dimension PTDY along a y-axis direction that is perpendicular to the x-axis direction. The first pattern track includes signal modulating elements SME that are arranged to provide a spatially varying characteristic which changes as a periodic function of position along the x-axis direction. The detector portion 467 is configured to be mounted proximate to the first pattern track FPT and to move along the measuring axis direction MA relative to the first pattern track FPT. The detector portion 467 includes a multi-layer circuit element (e.g., as previously outlined herein) having a front surface that faces the scale that carries the scale pattern 180 during normal operation. The detector portion 467 comprises a field generating coil configuration FGC that is fixed on the multi-layer circuit element, as well as at least one first-track shielded end configuration SEC (FT), and a plurality of sensing elements SEN, as described in greater detail below.

As shown in FIG. 4, the field generating coil configuration FGC comprises an input portion INP including at least two connection portions ICP1, ICP2 that connect the field generating coil configuration to a coil drive signal from a signal processing configuration (e.g., the signal processing configuration 166 of FIG. 1 or 966 of FIG. 9), and a first-track field generating coil portion FGCP(FT) configured to nominally surround a first-track generated field area GFA(FT) that is nominally aligned with the first pattern track FPT and generate a first-track changing magnetic flux in the first-track generated field area GFA(FT) in response to the coil drive signal. The first-track field generating coil portion FGCP(FT) illustrated in FIG. 4 comprises the first-track first-side elongated portion EPS1(FT) and first-track second-side elongated portion EPS2(FT), which are fabricated in one or more elongated portion layer EPL of the multi-layer circuit element (e.g., as shown in FIG. 5) and extend along the x-axis direction proximate to first and second sides S1, S2 of the first-track generated field area GFA(FT). The first-track first-side and second-side elongated portions EPS1(FT) and EPS2(FT) collectively span or define a first-track elongated portion length dimension EPDX along the x-axis direction, and a y-axis direction separation between the first-track first-side and second-side elongated portions EPS1(FT) and EPS2(FT) defines a first-track generated field area minimum width dimension GFADY(FT). The first-track field generating coil portion FGCP(FT) further comprises a first-track shielded end section SES(FT) that is fabricated in a first-track shielded end section layer SESL (FT) of the multi-layer circuit element (e.g., as shown in FIG. 5) and that spans the y-axis direction separation between the first-track first-side and second-side elongated portions EPS1(FT) and EPS2(FT) and that is included in an end conductor path ECP that connects the first-track first-side and second-side elongated portions EPS1(FT) and EPS2(FT) in the first-track field generating coil portion FGCP(FT).

The first-track shielded end configuration SEC(FT) comprises the first-track shielded end section SES(FT) outlined above as well as a first-track conductive shield region CSR(FT) (e.g., as shown in FIG. 5). As described in greater detail below with reference to FIG. 5, the conductive shield region CSR(FT) is included in a conductive shield region configuration CSRC, and extends along the x-axis and y-axis directions, and is fabricated in a first-track shield region layer SRL(FT) that is located between the first-track shielded end section layer SESL(FT) and one or more receiver loop layers RLL (e.g., RLL1 and RLL2) of the multi-layer circuit element, with respect to their locations along a z-axis direction that is nominally normal to the front surface of the multi-layer circuit element.

As shown in FIG. 4, the plurality of sensing elements SEN (e.g., SEN1-SEN24) comprise respective conductive receiver loops CRL (e.g., CRL1-CRL24) fabricated in the one or more receiver loop layers RLL (e.g., RLL1 and RLL2 as shown in FIG. 5) of the multi-layer circuit element, wherein the conductive receiver loops CRL are distributed along the x-axis direction over a first-track sensing element area SEA(FT) that is nominally aligned with the first pattern track FPT. The sensing elements SEN are configured to provide detector signals or detector signal contributions which respond to a local effect on the first-track changing magnetic flux provided by adjacent signal modulating elements SME of the scale pattern180. The sensing elements SEN are described in greater detail below with reference to FIG. 5.

It will be understood that a signal processing configuration (e.g., the signal processing configuration 566 of FIG. 5, etc.) may be operably connected to the detector portion 467 to provide the coil drive signal (e.g., at the connection points ICP1 and ICP2) and may be configured to determine the relative position between the detector portion 467 and the scale pattern 180 based on detector signals input from the detector portion 467 (e.g., at the detector signal output connections SDS1 and SDS2 as shown in FIG. 4, and as described in greater detail below with reference to the signal processing configuration 566 shown in FIG. 5.)

FIG. 5 is an isometric view "wire frame" diagram illustrating the first exemplary implementation generally corresponding to FIG. 4, in which one exemplary implementation of the relative placement of field generating elongated portions EPS1 and EPS2, and the shielded end section SES and end conductor path ECP of the field generating coil configuration FGC, and the conductive receiver loops CRL in the detector portion 467 is more clearly illustrated. Fewer sensing elements SEN and/or conductive receiver loops CRL are included in FIG. 5 than in FIG. 4 for clarity of illustration, but these elements may otherwise be understood to be similar in FIGS. 4 and 5. FIG. 5 may be regarded as partly representational, partly schematic. The "first-track" suffix "(FT)" used in FIG. 4 has been omitted from the reference numerals/designation throughout FIG. 5, for clarity of illustration. However, it will be understood that the elements illustrated in FIG. 5 may be considered as "first-track" elements despite this omission, and may alternatively be considered to be usable as "second-track" elements (corresponding to a reference designation suffix "(ST)", usable in certain implementations described in greater detail below. It will be appreciated that the elements of the detector portion 467 of FIG. 5 may be similar or identical to the similarly numbered elements of the detector portion 467 of FIG. 4 and may be generally understood by analogy thereto. Therefore, only certain features of FIG. 5 are described in detail below, as needed to emphasize novel features and/or benefits according to principles disclosed and claimed herein.

As shown in FIG. 5, the signal modulating scale pattern 180 includes the first pattern track FPT having the previously outlined features and dimensions. The detector portion 467 is configured to be mounted proximate to the first pattern track FPT and to displace relative to it along the measuring axis direction MA. It will be understood that the detector portion 467 includes a multi-layer circuit element, e.g., as previously outlined herein, and represented by its conductive layers as described below, which are separated by insulating layers according to known principles. The multi-layer circuit element will be understood to have a front surface that faces the scale that carries the scale pattern 180 during normal operation. The detector portion 467 comprises the field generating coil configuration FGC that is fixed on the multi-layer circuit element, as well as at least one first-track shielded end configuration SEC, and a plurality of sensing elements SEN comprising conductive receiver loops CRL, as described in greater detail below.

As shown in FIG. 5, the field generating coil configuration FGC comprises an input portion INP, and a first-track field generating coil portion FGCP configured to nominally surround a first-track generated field area GFA that is nominally aligned with the first pattern track FPT and generate a first-track changing magnetic flux in the first-track generated field area GFA in response to the coil drive signal from the signal processing configuration 566.

In the particular implementation shown in FIG. 5, the input portion INP comprises the two input connection portions ICP1A, and ICP2A, which are respectively connected to input connection portions ICP1B, and ICP2B that connect the field generating coil configuration FGC to the coil drive signal from the signal processing configuration 566.

The first-track field generating coil portion FGCP illustrated in FIG. 5 comprises the first-track first-side elongated portion EPS1 and first-track second-side elongated portion EPS2, which are fabricated in one or more elongated portion layer EPL of the multi-layer circuit element. The layer EPL and other layers described herein are represented in FIG. 5 by reference designations and dashed lines that correspond to exemplary planes for such layers. The first-track first-side elongated portion EPS1 and first-track second-side elongated portion EPS2 extend along the x-axis direction proximate to first and second sides S1, S2 of the first-track generated field area GFA. The first-track first-side and second-side elongated portions EPS1 and EPS2 collectively span or define a first-track elongated portion length dimension EPDX along the x-axis direction, and a y-axis direction separation between the first-track first-side and second-side elongated portions EPS1 and EPS2 defines a nominal first-track generated field area width dimension GFADY.

The first-track field generating coil portion FGCP further comprises a first-track shielded end section SES that is fabricated in a first-track shielded end section layer SESL of the multi-layer circuit element and that spans the y-axis direction separation between the first-track first-side and second-side elongated portions EPS1 and EPS2 and that is included in an end conductor path ECP that connects the first-track first-side and second-side elongated portions EPS1 and EPS2 in the first-track field generating coil portion FGCP. In the particular implementation shown in FIG. 5, the end conductor path ECP comprises the first-track shielded end section SES, end conductor path portions ECP1B, and ECP2B, and the two end conductor path portions ECP1A, and ECP2A, which are feedthrough elements respectively connected to the end conductor path portions ECP1B, and ECP2B to connect the first-track first-side and second-side elongated portions EPS1 and EPS2 through the shielded end section SES in the first-track field generating coil portion FGCP. In the particular implementation shown in FIG. 5 the shielded end section SES is offset along the x-axis direction from the ends of the elongated portions EPS1 and EPS2, which necessitates the use of the end conductor path portions ECP1B, and ECP2B in the end conductor path ECP. In an alternative implementation (not shown in FIG. 5) the shielded end section SES need not be significantly offset along the x-axis direction from the ends of the elongated portions EPS1 and EPS2 (particularly in alternative configurations where the conductive shield region is enlarged along the x-axis direction as indicated by the arrows A1 or A2 in FIG. 5.) In such an alternative implementation, and the end conductor path portions ECP1B, and ECP2B may be omitted. That is, the feedthrough element ECP1A may connect the first elongated portion EPS1 to a first end of the "non-offset" shielded end section SES, and the feedthrough element ECP2A may connect the second elongated portion EPS2 to a second end of the "non-offset" shielded end section SES. As shown in FIG. 5, the two end conductor path portions or feed through elements ECP1A, and ECP2A extend along the z-axis direction and utilize insulated voids INSV to pass through the conductive shield region CSR and connect the first-track first-side and second-side elongated portions EPS1 and EPS2 through the shielded end section SES via the end conductor path ECP. In various implementations, which may use various configurations of the conductive shield region CSR and/or end conductor path ECP, each connection between a first-track elongated portion such as EPS1 or EPS2 and a first-track shielded end section SES comprises a feedthrough element (e.g., a PCB feedthrough element) similar to those outlined above.

In the particular implementation shown in FIG. 5, the first-track shielded end configuration SEC comprises the first-track shielded end section SES outlined above as well as a first-track conductive shield region CSR, which in one implementation may be configured approximately as illustrated in solid outline in the first-track shielded end configuration SEC in FIG. 5. As shown in FIG. 5, the conductive shield region CSR may be considered to be included in a conductive shield region configuration CSRC (which may include additional conductive shield regions CSR', in some implementations). The conductive shield region CSR generally extends along the x-axis and y-axis directions to various extents in various implementations, and is fabricated in a first-track shield region layer SRL that is located between the first-track shielded end section layer SESL and one or more receiver loop layers RLL (e.g., RLL1 and RLL2) of the multi-layer circuit element, with respect to their locations along a z-axis direction.

As shown in FIGS. 4 and 5, the plurality of sensing elements SEN (e.g., SEN1-SEN24) comprise respective conductive receiver loops CRL (e.g., CRL1-CRL24) fabricated in the one or more receiver loop layers RLL (e.g., RLL1 and RLL2) of the multi-layer circuit element, wherein the conductive receiver loops CRL are distributed along the x-axis direction over a first-track sensing element area SEA) (having the corresponding dimensions SEADX and SEADY) that is nominally aligned with the first pattern track FPT. The sensing elements SEN are configured to provide detector signals or detector signal contributions which respond to a local effect on the first-track changing magnetic flux provided by adjacent signal modulating elements SME of the scale pattern180. In the particular implementation illustrated in FIG. 5, the conductive receiver loops CRL do not overlap with the first-track first-side and second-side elongated portions EPS1 and EPS2. Thus, in contrast to the layers in the detector portion 267, in some implementations of the detector portion 467 the elongated portion layer EPL and one of the receiver loop layers RLL1 or RLL2 may be the same layer of the multi-layer circuit element, and at least one of the first-track elongated portions EPS1 and EPS2 and at least some portions of the conductive receiver loops CRL may be fabricated in that same layer.

As previously outlined in describing the particular input portion INP shown in FIG. 5, the signal processing configuration 566 may be operably connected to the detector portion 467, e.g., through the two input connection portions ICP1A, and ICP2A, which are respectively connected to input connection portions ICP1B, and ICP2B that connect the field generating coil configuration FGC to the coil drive signal from the signal processing configuration 566. The signal processing configuration 566 may be further configured to determine the relative position between the detector portion 467 and the scale pattern 180 based on detector signals input from the detector portion 467, e.g., at the detector signal output connections SDS1 and SDS2, as shown in FIG. 5. In the particular implementation shown in FIG. 5, the detector signal output connections SDS1 and SDS2 are connected to the signal processing configuration 566 through feedthrough elements DSFT1 and DSFT2, respectively, which utilize insulated voids INSV to pass through the conductive shield region CSR' and connect to the signal processing configuration 566. It will be appreciated that the connection portions and the conductive shield region CSR' used in the input portion INP are analogous to the end conductor portions and the shielded end section SES and the conductive shield region CSR used in the first-track shielded end configuration SEC in FIG. 5. It will be appreciated that in various implementations, it may be advantageous to utilizing principles analogous to those disclosed with reference to the first-track shielded end configuration SEC to shield various connection portions of the input portion INP (and circuits and connections related to the signal processing configuration 566, if desired).

FIGS. 4 and 5 show a single representative set of sensing elements SEN1-SEN24, which comprise conductive receiver loops CRL1-CRL24 which are connected in series. In this particular implementation, adjacent loop elements are connected by a configuration of conductors on the two conductive receiver loop layers RLL1 and RLL2 according to known methods such that they have opposite winding polarities, as previously outlined with reference to the detector portion 267. The sensing elements SEN (the conductive receiver loops CRL) are connected in series such that their detector signals or signal contributions are summed, and a "summed" detector signal is output at the detector signal output connections SDS1 and SDS2 to a signal processing configuration 566. Although FIGS. 4 and 5 show a single set of sensing elements SEN to avoid visual confusion, it will be appreciated that in various embodiments it is advantageous to configure the detector to provide one or more additional sets of sensing elements at a different spatial phase position (e.g., to provide quadrature signals) and to connect them to the signal processing configuration 566 in a similar fashion, as will be understood by one of ordinary skill in the art. Thus, it should be appreciated that the configurations of sensing elements SEN described herein are exemplary only, and not limiting. As one example, individual sensing element loops may output individual signals to a corresponding signal processing configuration in some embodiments, for example as disclosed in commonly assigned U.S. Pat. App. Pub. No. 2018/003524, which is hereby incorporated by reference in its entirety. More generally, various known sensing element configurations may be used in combination with the principles disclosed and claimed herein, for use in combination with various known scale pattern and signal processing schemes, in various embodiments.

The implementation(s) shown in FIGS. 4 and 5 include the following important and noteworthy features that differ from those used in the detector portions of known prior art electronic position encoders.

Firstly, the first-track sensing element area SEA(FT) extends over a first-track sensing element area length dimension SEADX(FT) along the x-axis direction and a first-track sensing element area width dimension SEADY(FT) along the y-axis direction, wherein the first-track sensing element area length dimension SEADX(FT) along the x-axis direction is longer than the first-track elongated portion length dimension EPDX(FT). Conversely, the first-track elongated portion length dimension EPDX(FT) may be significantly shorter than the first-track sensing element area length dimension SEADX(FT) along the x-axis direction. Surprisingly, the inventor has determined that such a configuration may allow unexpected tradeoffs and advantages related to signal levels, S/N ratio and/or accuracy, and fabrication costs in an electronic position encoder according to principles disclosed herein. For example, it should be appreciated that in such a case, the detector portion 467 may be significantly shorter than known detector portions, and the relatively shorter first-track first-side and second-side elongated portions EPS1 and EPS2 may contribute significantly less resistance to the relative shorter field generating configuration FGC, which may also have an inherently lower impedance compared to known field generating configurations. As a consequence, unexpectedly high signal levels may be achieved in a practical manner while deleterious end effects may be relative suppressed as outlined below, such that various constraints on the configuration of known field generating configurations and detector portions taught in the prior art may be relaxed or eliminated, while also reducing fabrication costs.

In some such implementations, the first-track sensing element area length dimension SEADX along the x-axis direction may extend beyond the first-track elongated portion length dimension EPDX at each end by at least an amount SE, as shown in FIG. 5. In some implementations, the inventor has discovered that it may be advantageous for accuracy if the amount SE is at least K times the nominal first-track generated field area width dimension GFADY, where K is a number that is at least 1. In some such implementations, it may be more advantageous for accuracy if K is at least 2. As shown in FIG. 5, the signal modulating elements of the first pattern track may be arranged corresponding to a spatial wavelength WL along the x-axis direction. According to an additional design principle discovered by the inventor, in some implementations where K is at least 1, it may also be advantageous for accuracy if the amount SE is furthermore at least as large as WL. In some such implementations, it may be more advantageous for accuracy if the amount SE is furthermore at least as large as 2*WL.

Secondly, the first-track shielded end section SES is configured such that its z-axis projection along the z-axis direction toward the receiver loop layers at least partially overlaps with the conductive receiver loops CRL in the first-track sensing element area SEA, e.g., as best shown in FIG. 5 with reference to the first-track shielded end section SES and the conductive receiver loops CRL. It may be understood that this feature is associated with the first-track elongated portion length dimension EPDX being shorter than the first-track sensing element area length dimension SEADX along the x-axis direction, as outlined above. However, it is noteworthy that this configuration feature has been explicitly avoided in the teachings of the '335 patent and known prior art detection portions, and therefore imposed undesirable design limitations which affected the cost, size and/or accuracy that could be achieved with such detector portions.

Thirdly, the inventor has discovered that it is advantageous (e.g., for accuracy, robustness, and/or to facilitate low-cost fabrication) in various implementations (or possibly all implementations) if the first-track conductive shield region CSR is configured in its first-track shield region layer SRL such that it is interposed between the first-track shielded end section SES and the conductive receiver loops CRL in the first-track sensing element area SEA and configured to intercept at least a majority of area of the z-axis projection ZPROJ of the first-track shielded end section SES that overlaps with the conductive receiver loops CRL in the first-track sensing element area SEA. It will be understood that the conductive shield region CSR shown in solid outline in FIG. 5 is configured to intercept all of area of the z-axis projection ZPROJ of the first-track shielded end section SES that overlaps with the conductive receiver loops CRL in the first-track sensing element area SEA (except where it includes insulating voids INSV that surround conductive feedthroughs that extend generally along the z-axis direction and pass through that at least one first-track conductive shield region CSR), which may be advantageous in various implementations. However, in some implementations, a significant and sufficient benefit to accuracy may be achieved if the illustrated first-track conductive shield region CSR is shrunk along the x-axis direction as indicated by the arrow A3, wherein the first-track conductive shield region CSR would be configured to intercept at least a majority of area of the z-axis projection ZPROJ of the first-track shielded end section SES. In either case, known detector portion implementations (e.g., such as those taught in the '335 patent) do not recognize such configurations of a conductive shield region CSR as an important, useful, or adaptable feature because they utilize a fundamentally different configuration or location relationship between the first-track shielded end section SES and the conductive receiver loops CRL in the first-track sensing element area SEA.

It will be understood that the function of the first-track conductive shield region CSR or the like is to mitigate or eliminate the error inducing "end effect" interaction of the fields generated proximate to the first-track shielded end section SES with the sensing elements SEN in the first-track sensing element area SEA and/or the signal modulating elements SME. The description of the configuration of the conductive shield region CSR relative to a hypothetical projection of one or more of these elements is simply a practical way of defining advantageous implementations which achieve the desired mitigation or elimination of such error inducing "end effect" interactions.

The inventor has discovered that, in some implementations, it may be advantageous if a first-track conductive shield region CSR configured according to principles outlined above is furthermore configured according to an additional design principle or design perspective, wherein it is furthermore configured such that it intercepts at least a majority of area of a projection along the z-axis direction of the conductive receiver loops CRL that are distributed in an end portion of first-track sensing element area SEA that is located outside an end of the first-track elongated portion length dimension EPDX that corresponds to the location of the first-track shielded end section SES. By way of further explanation, and not by way of limitation, in the implementation shown in FIG. 5 this description approximately corresponds to a projection along the z-axis direction of the conductive receiver loops CRL that are distributed along the dimension SE in the first-track sensing element area SEA. It will be recognized that the first-track conductive shield region CSR shown in solid outline in FIG. 5 is configured according to this additional design principle.

The inventor has discovered that, in some implementations, it may be advantageous if a first-track conductive shield region CSR configured according to principles outlined above is furthermore configured according to an additional design principle or design perspective, wherein it is furthermore configured such that it intercepts all of the area of a projection along the z-axis direction of at least one conductive receiver loop CRL that is distributed in a portion of first-track sensing element area SEA that is located inside an end of the first-track elongated portion length dimension EPDX that corresponds to the location of the first-track shielded end section SES. By way of further explanation, and not by way of limitation, in the implementation shown in FIG. 5 this description approximately corresponds to a projection along the z-axis direction of the conductive receiver loop CRL14 and corresponds to enlarging the illustrated first-track conductive shield region CSR along the x-axis direction approximately as indicated by the arrow A1.

The inventor has discovered that, in some implementations, it may be advantageous if a first-track conductive shield region CSR configured according to principles outlined above is furthermore configured such that it intercepts all of the area of a projection along the z-axis direction of all of the conductive receiver loops CRL that are distributed in the first-track sensing element area SEA, except where that at least one first-track conductive shield region includes insulating voids that surround conductive feedthroughs that extend generally along the z-axis direction and pass through that at least one first-track conductive shield region. By way of further explanation, and not by way of limitation, in the implementation shown in FIG. 5 this description approximately corresponds to enlarging the illustrated first-track conductive shield region CSR along the x-axis direction approximately as indicated by the arrow A2 and merging the conductive shield region CSR' with/into the conductive shield region CSR in the conductive shield region configuration CSRC.

It should be appreciated that the design principles and implementations disclosed above with reference to FIG. 4 and FIG. 5 differ in several important ways from the prior art implementation(s) taught in the '335 patent and shown in FIG. 2 and FIG. 3.

According to a first principle disclosed above, the first-track sensing element area SEA(FT) extends over a first-track sensing element area length dimension SEADX(FT) along the x-axis direction and a first-track sensing element area width dimension SEADY(FT) along the y-axis direction, wherein the first-track sensing element area length dimension SEADX(FT) along the x-axis direction is longer than the first-track elongated portion length dimension EPDX(FT). The dimension in FIG. 2 that is analogous to the first-track sensing element area length dimension SEADX (FT) is marked SEADXana (the suffix "ana" means analogous) for convenience. The dimension in FIG. 2 that is analogous to the first-track elongated portion length dimension EPDX(FT) is marked EPDXana for convenience. It may be seen that in contrast to the design principle outlined above, the '335 patent teaches the opposite. That is, as shown in FIG. 2, the analog of the first-track sensing element area length dimension SEADXana along the x-axis direction is significantly shorter than the analog of the first-track elongated portion length dimension EPDXana. Or, stated another way, the first-track elongated portion length dimension EPDX(FT) shown in FIG. 4 is significantly shorter (e.g., half as long, or less) than its analog EPDXana shown in FIG. 2.

According to a second principle disclosed above, the first-track shielded end section SES(FT) shown in FIG. 4 is configured such that its z-axis projection along the z-axis direction toward the receiver loop layers at least partially overlaps with the conductive receiver loops CRL in the first-track sensing element area SEA(FT) (e.g., as shown and described in further detail with reference to the first-track shielded end section SES shown in FIG. 5.) The feature in FIGS. 2 and 3 that is analogous to the first-track shielded end section SES(FT) is marked SESana (the suffix "ana" means analogous) for convenience. It may be seen that in contrast to the design principle outlined above, the '335 patent teaches the opposite. That is, as shown in FIGS. 2 and 3, the analog of the first-track shielded end section SESana is configured such that it is intentionally located a significant distance from the nearest end conductive receiver loop CRL, and its z-axis projection along the z-axis direction toward the receiver loop layers is prohibited from overlapping with (that is, it is significantly distant from) the conductive receiver loops CRL in their corresponding sensing element area in FIGS. 2 and 3. This restriction taught in the '335 patent and shown in FIGS. 2 and 3 prevents several of the features and advantages associated with the electronic position encoder and detector portion design principles disclosed and claimed herein.

According to a third principle disclosed above, the first-track conductive shield region CSR(FT) is configured in its first-track shield region layer SRL such that it is interposed between the first-track shielded end section SES(FT) and the conductive receiver loops CRL in the first-track sensing element area SEA(FT) and configured to intercept at least a majority of area of the z-axis projection of the first-track shielded end section SES(FT) that overlaps with the conductive receiver loops CRL in the first-track sensing element area (e.g., as shown and described in detail with reference to the conductive shield region CSR and the conductive shield region configuration CSRC shown in FIG. 5.) The feature in FIG. 3 that is analogous to the conductive shield region CSR is likewise marked CSR. It may be seen in FIG. 3 that in contrast to the design principle outlined above, the '335 patent teaches that a conductive shield region CSR need not be configured in its first-track shield region layer (which is located at the Z location Zcsr in FIG. 3) such that it is interposed between the first-track shielded end section SES and the conductive receiver loops CRL in their corresponding first-track sensing element area. It may also be seen in FIG. 3 that in contrast to the design principle outlined above, the '335 patent further teaches that a conductive shield region CSR need not be configured to intercept at least a majority of area of the z-axis projection of the first-track shielded end section SES that overlaps with the conductive receiver loops CRL in the first-track sensing element area. That is, as shown in FIG. 3, the analog of the first-track shielded end section SESana is configured such that it and its corresponding conductive shield region CSR are intentionally located a significant distance from the nearest end conductive receiver loop CRL. As a consequence, its z-axis projection along the z-axis direction is prohibited from overlapping with (that is, it is significantly distant from) the conductive receiver loops CRL in their corresponding sensing element area in FIG. 3. Furthermore, the illustrated conductive shield region CSR in FIG. 3 is likewise significantly distant from the conductive receiver loops CRL in their corresponding sensing element area.

Thus, according to the foregoing explanation, the teachings in the '335 patent (e.g., as exemplified in FIGS. 2 and 3) do not conform to the electronic position encoder and detector portion design principles disclosed and claimed herein. This is because the '335 patent is directed to a detector portion configuration that includes certain fundamentally different element relationships than a detector portion configured according to principles and claimed disclosed herein. If there is an incidental mention of a configuration in the '335 patent which may fulfil an isolated design principle disclosed herein, it would be an accidental occurrence and not an intentional teaching. It would not be understandable by one of ordinary skill in the art as a particularly advantageous, desirable or adaptable design principle or feature that suggests the various design principles, features and synergistic combinations thereof that are disclosed and claimed herein.

Figure 6:
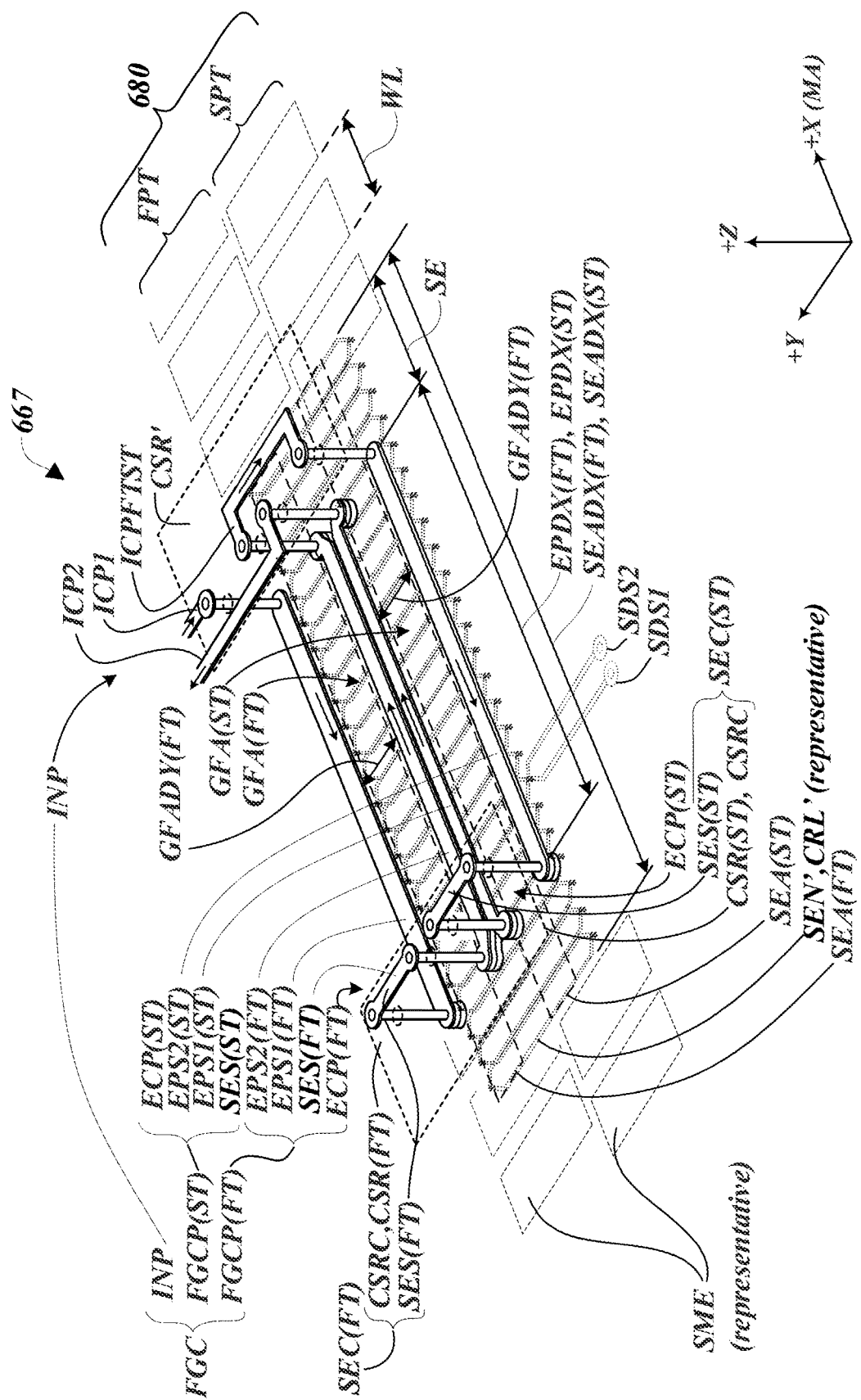
FIG. 6 is an isometric view diagram illustrating a second exemplary implementation of a detector portion according to principles disclosed herein and a compatible scale pattern usable in an electronic position encoder.

FIG. 6 is an isometric view "wire frame" diagram illustrating a second exemplary implementation of a detector portion 667 according to principles disclosed herein and a compatible scale pattern 680 usable in an electronic position encoder. The detector portion 667 has certain characteristics and components similar to the detector portion 467 of FIGS. 4 and 5. In particular, elements designated by similar reference numbers in FIG. 6 and FIGS. 4 and 5 (e.g., similar names or numerals or numerical "suffixes"), or elements that are otherwise obviously similar elements in various figures, are analogous elements, and may be understood to operate similarly, except as otherwise indicated below. Only certain features of FIG. 6 are described in detail below, insofar as that description is intended to emphasize novel features and/or benefits according to principles disclosed and claimed herein, and the figures may otherwise be understood by analogy to other figures and description included herein, or in the incorporated references, by one of ordinary skill in the art. The detector portion 667 and a compatible scale pattern 680 provide additional advantages with regard to providing more robust signal accuracy and/or signal strength in comparison to previously described implementations.

Broadly speaking, the primary differences between the embodiment of FIG. 6 and FIGS. 4 and 5 are as follows:

the scale pattern 680, in addition to the first pattern track FPT, further comprises a second pattern track SPT that is analogous to the previously described first pattern track FPT; and the detector portion 667, in addition to the first-track detector portion elements (generally identified by the suffix "(FT)", for "First Track"), further comprises second-track detector portion elements (generally identified by the suffix "(ST)", that are analogous to the previously described first-track detector portion elements.

As shown in FIG. 6, the signal modulating scale pattern 680 includes the first pattern track FPT which will be understood to have previously outlined features and dimensions, and the second pattern track SPT which is similar to the first pattern track FPT. The first and second pattern tracks FPT and SPT each include the same type of signal modulating elements SME that are arranged according to a same spatial period or wavelength WL along the x-axis direction in the first and second pattern tracks FPT and SPT, wherein the signal modulating elements SME in the second pattern track SPT are offset along the measuring axis direction by a nominal scale track offset of approximately WL/2 relative to the signal modulating elements in the first pattern track.

The detector portion 667 is configured to be mounted proximate to the first and second pattern tracks FPT and SPT and to displace relative to them along the measuring axis direction MA. It will be understood that the detector portion 667 includes a multi-layer circuit element, e.g., as previously outlined herein, with its conductive layers represented by the various conductive elements illustrated in FIG. 6, which are separated by insulating layers according to known principles as previously described herein. The detector portion 667 comprises the field generating coil configuration FGC that is fixed on the multi-layer circuit element, as well as at least one first-track shielded end configuration SEC, and a plurality of sensing elements SEN' comprising conductive receiver loops CRL', as described in greater detail below.

As shown in FIG. 6, the field generating coil configuration FGC comprises an input portion INP and first-track and second-track field generating coil portions FGCP(FT) and FGCP(ST). The first-track field generating coil portion FGCP(FT) is configured to nominally surround the first-track generated field area GFA(FT) that is nominally aligned with the first pattern track FPT and generate a first-track changing magnetic flux in the first-track generated field area GFA(FT) in response to the coil drive signal from a signal processing configuration. Similarly, the second-track field generating coil portion FGCP(ST) is configured to nominally surround the second-track generated field area GFA(ST) that is nominally aligned with the second pattern track FPT and generate a second-track changing magnetic flux in the second-track generated field area GFA(ST) in response to the coil drive signal from the signal processing configuration.

In the particular implementation shown in FIG. 5, the input portion INP comprises the two input connection portions ICP1 and ICP2, which are connected to the field generating coil configuration FGC through feedthroughs, and also connected to the signal processing configuration, as will be understood based on previous description.

The first-track field generating coil portion FGCP(FT) illustrated in FIG. 6 comprises the first-track first-side elongated portion EPS1 and first-track second-side elongated portion EPS2, which are fabricated in one or more elongated portion layer of the multi-layer circuit element as previously outlined. The first-track first-side elongated portion EPS1 (FT) and first-track second-side elongated portion EPS2(FT) extend along the x-axis direction proximate to first and second sides of the first-track generated field area GFA(FT). The first-track first-side and second-side elongated portions EPS1(FT) and EPS2(FT) collectively span or define a first-track elongated portion length dimension EPDX(FT) along the x-axis direction, and a y-axis direction separation between the first-track first-side and second-side elongated portions EPS1(FT) and EPS2(FT) defines a nominal first-track generated field area width dimension GFADY(FT). Similarly, the second-track first-side elongated portion EPS1 (ST) and second-track second-side elongated portion EPS2 (ST) extend along the x-axis direction proximate to first and second sides of the second-track generated field area GFA (ST). The second-track first-side and second-side elongated portions EPS1(ST) and EPS2(ST) collectively span or define a second-track elongated portion length dimension EPDX (ST) along the x-axis direction, and a y-axis direction separation between the second-track first-side and second-side elongated portions EPS1(ST) and EPS2(ST) defines a nominal second-track generated field area width dimension GFADY(ST).

The first-track field generating coil portion FGCP(FT) further comprises a first-track shielded end section SES(FT) that is fabricated in a first-track shielded end section layer of the multi-layer circuit element as previously outlined and that spans the y-axis direction separation between the first-track first-side and second-side elongated portions EPS1 (FT) and EPS2(FT) and that is included in an end conductor path ECP(FT) that also includes feedthroughs as illustrated and that connects the first-track first-side and second-side elongated portions EPS1(FT) and EPS2(FT) in the first-track field generating coil portion FGCP(FT). The second-track field generating coil portion FGCP(ST) further comprises a second-track shielded end section SES(ST) that is fabricated in a second-track shielded end section layer of the multi-layer circuit element as previously outlined and that spans the y-axis direction separation between the second-track first-side and second-side elongated portions EPS1(ST) and EPS2(ST) and that is included in an end conductor path ECP(ST) that also includes feedthroughs as illustrated and that connects the second-track first-side and second-side elongated portions EPS1(ST) and EPS2(ST) in the second-track field generating coil portion FGCP(ST).

In the particular implementation shown in FIG. 6, the first-track shielded end configuration SEC(FT) comprises the first-track shielded end section SES(FT) as well as a first-track conductive shield region CSR(FT), which in one implementation may be configured approximately as illustrated in dashed outline in the first-track shielded end configuration SEC(FT) in FIG. 6. The second-track shielded end configuration SEC(ST) comprises the second-track shielded end section SES(ST) as well as a second-track conductive shield region CSR(ST), which in one implementation may be configured approximately as illustrated in dashed outline in the second-track shielded end configuration SEC(ST) in FIG. 6. As shown in FIG. 6, the conductive shield regions CSR(FT) and CSR(ST) may be considered to be included in a conductive shield region configuration CSRC (which may include additional conductive shield regions CSR', in some implementations). According to previously outlined principles, the conductive shield regions CSR(FT) and CSR(ST) generally extend along the x-axis and y-axis directions to various extents in various implementations, and are fabricated in a shield region layer (or layers) that is (are) located between the shielded end section layer(s) of the detector portion 667 and the one or more receiver loop layers of the detector portion 667, with respect to their locations along the z-axis direction.

As shown in FIG. 6, the plurality of sensing elements SEN' comprise respective conductive receiver loops CRL' that are, fabricated in the one or more receiver loop layers of the multi-layer circuit element to operate according to previously outlined principles. However, one difference in the sensing elements SEN' compared to previously described implementations is that in the plurality of sensing elements the conductive receiver loops CRL' of the sensing elements SEN' are extended along the y-axis direction to overlap both the first pattern track FPT and the second pattern track SPT. Thus, they are distributed along the x-axis direction over both the first-track sensing element area SEA(FT) and also over the second-track sensing element area SEA(ST) that is nominally aligned with the second pattern track SPT. The sensing elements SEN' are thus configured to provide detector signals or detector signal contributions which respond to a local effect on the first-track changing magnetic flux provided by adjacent signal modulating elements SME of the first pattern track FPT of the scale pattern 180', and also respond to a local effect on the second-track changing magnetic flux provided by adjacent signal modulating elements SME of the second pattern track SPT of the scale pattern 180'.

As indicated by the current flow arrows in FIG. 6, the field generating coil configuration FGC is configured to generate the first-track changing magnetic flux with a first polarity in the first-track generated field area GFA(FT), and generate the second-track changing magnetic flux with a second polarity that is opposite to the first polarity in the second-track generated field area GFA(ST). The conductive receiver loops CRL' are configured to extend along the y-axis direction into both the first-track and second-track sensing element areas SEA(FT) and SEA(ST) and provide the same sensing loop polarity in the first-track and second-track sensing element areas SEA(FT) and SEA(ST). This configuration, operating in combination with the scale track offset of approximately WL/2 in the first and second pattern tracks FPT and SPT, produces reinforcing signal contributions from the first-track and second-track sensing element areas SEA(FT) and SEA(ST) in each of the sensing elements SEN'.

In the particular implementation illustrated in FIG. 6, the conductive receiver loops CRL' overlap with various elongated portions of the field generating coil configuration. Thus, in this particular implementation of the detector portion 667 the elongated portion layer(s) EPL are not the same layers as the receiver loop layers of the multi-layer circuit element, and blind vias (such as that term is used in printed circuit board manufacturing technology, or other multi-layer fabrication technology) may be required for the fabrication of the conductive receiver loops CRL', such that they remain insulated from the elongated portion layer(s) EPL. However, based on the teachings of this disclosure, one of ordinary skill in the art will understand that such an implementation is exemplary only, and not limiting.

It will be appreciated that a signal processing configuration (e.g., analogous to the signal processing configuration 566) may be operably connected to the detector portion 667, through the two input connection portions ICP1 and ICP2, and through the detector signal output connections SDS1 and SDS2 and the like, in a manner analogous to the previously outlined with reference to FIG. 5, and/or known methods. The signal processing configuration may be configured to provide the coil drive signal to the field generating coil configuration FGC at the two input connection portions ICP1 and ICP2. The signal processing configuration may be further configured to determine the relative position between the detector portion 667 and the scale pattern 180' based on detector signals input from the detector portion 667, e.g., at the detector signal output connections SDS1 and SDS2, and the like.

It will be appreciated that the connection portions (e.g., the connection portion ICPFTST, ICP1, ICP2, feedthroughs, etc.), and the conductive shield region CSR' used in the input portion INP are analogous to the end conductor portions ECP, the shielded end sections SES, and the conductive shield regions CSR used in the first-track and second-track shielded end configurations SEC(FT) and SEC(ST) in FIG. 6. It will be appreciated that in various implementations, it may be advantageous to utilizing principles analogous to those disclosed with reference to the first-track and second-track shielded end configurations SEC(FT) and SEC(ST) to shield various connection portions of the input portion INP (and circuits and connections related to the signal processing configuration, if desired).

It will be appreciated that the detector portion 667 shown in FIG. 6 and described above includes the important and noteworthy features previously outlined with reference to FIGS. 4 and 5, which differ from those used in the detector portions of known prior art electronic position encoders, and provide previously outlined advantages and benefits. To briefly summarize:

Firstly, the first-track sensing element area SEA(FT) extends over a first-track sensing element area length dimension SEADX(FT) that is longer than the first-track elongated portion length dimension EPDX(FT) along the x-axis direction. Similarly, the second-track sensing element area SEA(ST) extends over a second-track sensing element area length dimension SEADX(ST) that is longer than the second-track elongated portion length dimension EPDX(ST) along the x-axis direction.

Secondly, the first-track shielded end section SES(FT) is configured such that its z-axis projection along the z-axis direction toward the receiver loop layers at least partially overlaps with the conductive receiver loops CRL' in the first-track sensing element area SEA(FT). Similarly, the second-track shielded end section SES(ST) is configured such that its z-axis projection along the z-axis direction toward the receiver loop layers at least partially overlaps with the conductive receiver loops CRL' in the second-track sensing element area SEA(ST).

Thirdly, the first-track conductive shield region CSR(FT) is configured in its first-track shield region layer such that it is interposed between the first-track shielded end section SES(FT) and the conductive receiver loops CRL' in the first-track sensing element area SEA(FT) and configured to intercept at least a majority of area of the z-axis projection of the first-track shielded end section SES(FT) that overlaps with the conductive receiver loops CRL' in the first-track sensing element area SEA(FT). Similarly, the second-track conductive shield region CSR(ST) is configured in its second-track shield region layer (which may be the same as the first-track shield regions layer) such that it is interposed between the second-track shielded end section SES(ST) and the conductive receiver loops CRL' in the second-track sensing element area SEA(ST) and configured to intercept at least a majority of area of the z-axis projection of the second-track shielded end section SES(ST) that overlaps with the conductive receiver loops CRL' in the second-track sensing element area SEA(ST).

It will be understood that the conductive shield regions CSR(FT) and CSR(ST) shown in FIG. 6 are configured to intercept all of area of the z-axis projection of the first-track and second-track shielded end sections SES(FT) and SES(ST) that overlaps with the conductive receiver loops CRL' in the first-track and second-track sensing element areas SEA(FT) and SEA(ST) (except where it includes insulating voids that surround conductive feedthroughs), which may be advantageous in various implementations. However, in some implementations, a significant and sufficient benefit to accuracy may be achieved if the first-track and second-track conductive shield regions CSR(FT) and CSR(ST) are shrunk somewhat along the x-axis direction but still configured intercept at least a majority of area of the z-axis projection of the first-track and second-track shielded end sections SES(FT) and SES(ST). This and other modifications according to previously outlined principles may be made in the detector portion 667.

Figure 7:
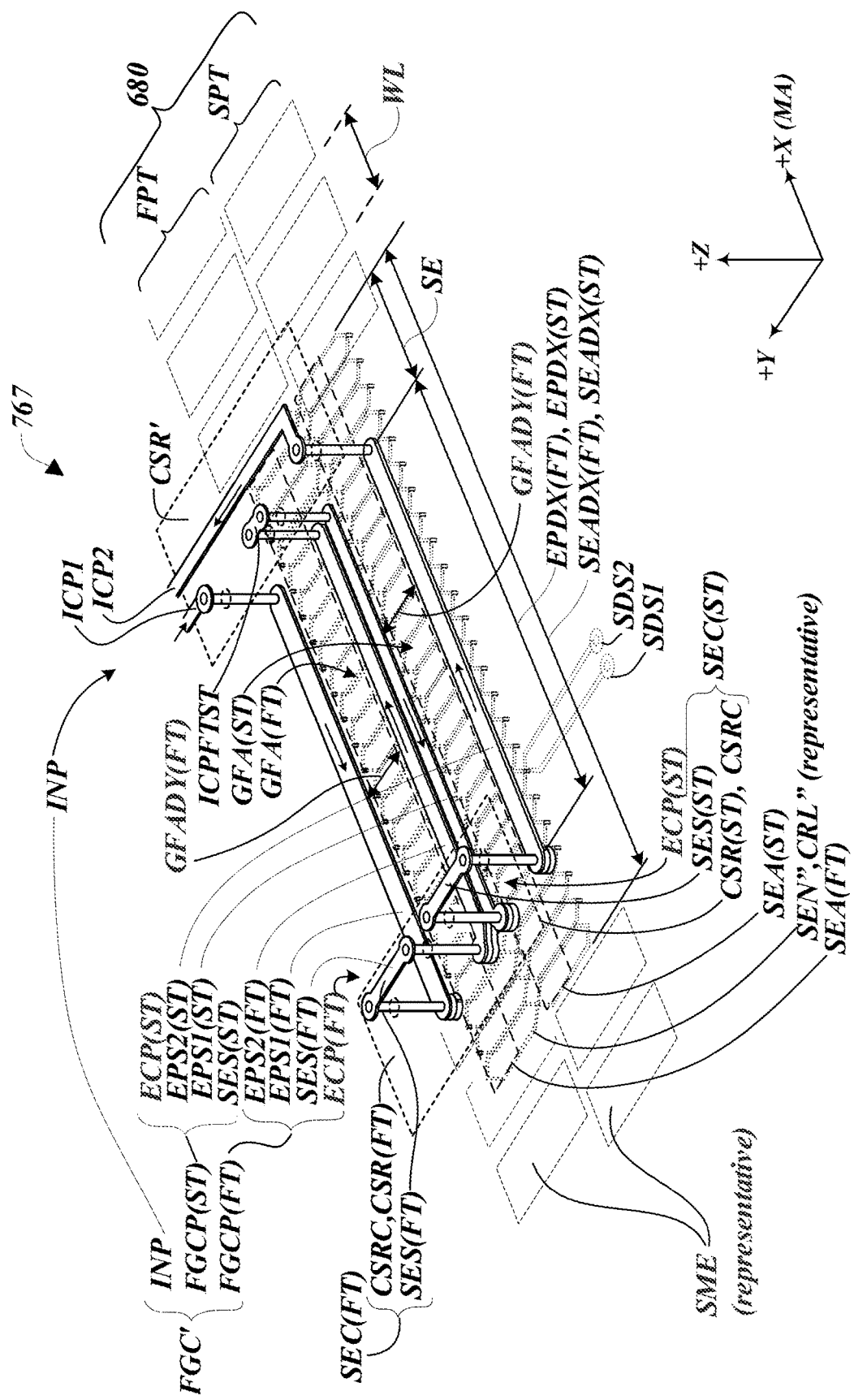
FIG. 7 is an isometric view diagram illustrating a third exemplary implementation generally according to principles disclosed herein and a compatible scale pattern usable in an electronic position encoder.

FIG. 7 is an isometric view "wire frame" diagram illustrating a third exemplary implementation of a detector portion 767 according to principles disclosed herein and a compatible scale pattern 680 usable in an electronic position encoder. The scale pattern 680 may be similar or identical to the scale pattern 680 described with reference to FIG. 6. The detector portion 767 is substantially similar to the detector portion 667 described with reference to FIG. 6, and may be understood by analogy, with the exception of the differences outlined below. Elements designated by similar reference numbers in FIG. 7 and FIG. 6 (e.g., similar names or numerals or numerical "suffixes"), are analogous elements, and may be understood to operate similarly, and provide similar benefits and advantages, except as otherwise indicated below.

Broadly speaking, the primary differences between the embodiments of FIG. 7 and FIG. 6 are associated with certain aspects of the field generating coil configuration FGC' and the plurality of sensing elements SEN" comprising conductive receiver loops CRL", as described in greater detail below.

As shown in FIG. 7, in the field generating coil configuration FGC' the input portion INP is differently configured than it is in FIG. 6. In particular, the connection portion ICP2 is connected to the elongated portion EPS2(ST) rather than the elongated portion EPS1(ST), and the connection portion ICPFTST connects the elongated portion EPS2(FT) to the elongated portion EPS1(ST) rather than the elongated portion EPS2(ST).

As shown in FIG. 7, the plurality of sensing elements SEN" include a cross over or twisting of the conductive traces in their conductive receiver loops CRL", in a region including a first-track elongated portion and a second-track elongated portion between the first-track generated field area and the second-track generated field area, to thereby provide opposite sensing loop polarities in each respective sensing element SEN" in the first-track and second-track sensing element areas SEA(FT) and SEA(ST).

As a result of the foregoing, as indicated by the current flow arrows in FIG. 7, the field generating coil configuration FGC' is configured to generate the first-track changing magnetic flux with a first polarity in the first-track generated field area GFA(FT), and generate the second-track changing magnetic flux with a polarity that is the same as the first polarity in the second-track generated field area GFA(ST). The twisted conductive receiver loops CRL" configured as outlined above provide opposite sensing loop polarities in the first-track and second-track sensing element areas SEA (FT) and SEA(ST). This configuration, operating in combination with the scale track offset of approximately WL/2 in the first and second pattern tracks FPT and SPT, produces reinforcing signal contributions from the first-track and second-track sensing element areas SEA(FT) and SEA(ST) in each of the sensing elements SEN". Thus, the detector portion 767 provides substantially similar signals and advantages as the previously described detector portion 667.

Figure 8:
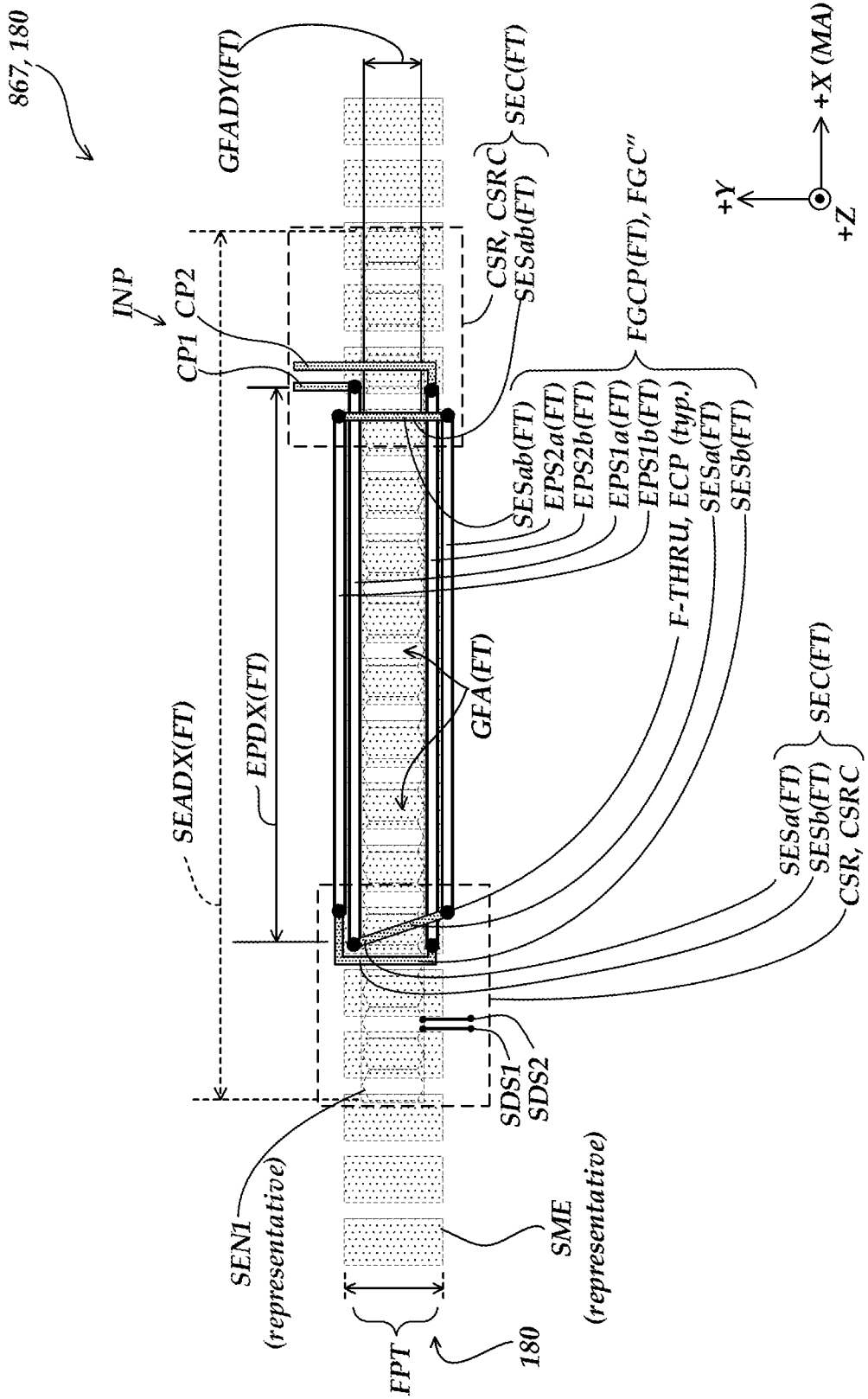
FIG. 8 is a plan view diagram illustrating a fourth exemplary implementation of a detector portion and a compatible scale pattern usable in an electronic position encoder.

FIG. 8 is a plan view diagram illustrating a fourth exemplary implementation of a detector portion 867 according to principles disclosed herein and a compatible scale pattern 180 usable in an electronic position encoder.

The scale pattern 180 may be similar or identical to the scale pattern 180 described with reference to FIGS. 4 and 5. The detector portion 867 is substantially similar to the detector portion 467 described with reference to FIGS. 4 and 5, and may be understood by analogy, with the exception of the differences outlined below. Elements designated by similar reference numbers in FIG. 8 and FIGS. 4 and 5 (e.g., similar names or numerals or numerical "suffixes"), are analogous elements, and may be understood to operate similarly, and provide similar benefits and advantages, except as otherwise indicated below.

Broadly speaking, the primary differences between the embodiments of FIG. 8 and FIGS. 4 and 5 are associated with certain aspects of the field generating coil configuration FGC", as described in greater detail below.

The various field generating coil configurations FGC previously shown and described herein may be characterized as "single turn" configurations, wherein only one conductive turn or loop surrounds a generated field area GFA. In some implementations, such a turn or loop may be a partial loop that incompletely surrounds the generated field area GFA, but nevertheless provides an operational generated field therein. In contrast, the detector portion 867 shown in FIG. 8 comprises a "two turn" configuration, as described in greater detail below.

It will be understood in FIG. 8 that the elongated portions EPXXx(FT) of the field generating coil configuration FGC" are fabricated in an elongated portion layer of the detector portion 867, according to previously outlined principles. Other portions of the field generating coil configuration FGC" such as the shielded end sections SESx(FT) that are illustrated with a darker fill in FIG. 8, are fabricated in a shielded end section layer of the detector portion 867, according to previously outlined principles. Connections between such layers are made by feedthroughs F-THRU, according to previously outlined principles. Feedthroughs F-THRU are represented by black filled circles in FIG. 8.

As shown in FIG. 8, the field generating coil configuration FGC" comprises the following arrangement:
- the input connection CP1 is connected to a first first-side elongated portion EPS1a(FT) connected in series to a first second-side elongated portion EPS2a(FT) by a shielded end section SESa(FT) in a shielded end section configuration SEC(FT) at a first end of the field generating coil configuration FGC";
- the first second-side elongated portion EPS2a(FT) is connected in series to a second first-side elongated portion EPS1b(FT) by a shielded end section SESab (FT) in a shielded end section configuration SEC(FT) at a second end of the field generating coil configuration FGC";
- the second first-side elongated portion EPS1b(FT) is connected in series to a second second-side elongated portion EPS2b(FT) by a shielded end section in the shielded end section SEC(FT) configuration at the first end of the field generating coil configuration FGC"; and
- the second second-side elongated portion EPS2b(FT) is connected to the input connection CP2 proximate to the shielded end section configuration SEC(FT) at the second end of the field generating coil configuration FGC".

It should be appreciated that such a two-turn configuration may become advantageous or desirable in detector portion according to principles disclosed herein, wherein the field generating coil configuration FGC" may be significantly shorter along the x-axis direction than those used in previous known detector portions that offer similar performance and accuracy. As previously explained herein, the significantly shorter elongated portions EP allowed according to principles disclosed and claimed herein inherently allow the field generating coil configuration FGC" to have significantly less resistance and/or impedance, compared to known field generating configurations. As a consequence, an additional turn or loop may be added to field generating coil configuration FGC", to adjust (increase) the impedance to a desirable level for driving resonant oscillations of the coil in some implementations, without exceeding practical or desirable limitations for the resistance and/or impedance of field generating coil configuration FGC". In some such implementations, an unexpectedly high S/N ratio and/or accuracy may be achieved. It should be appreciated that, in some implementations, it may be desirable to use a field generating coil configuration FGC that is a "three turn" configuration, or more.

Figure 9:
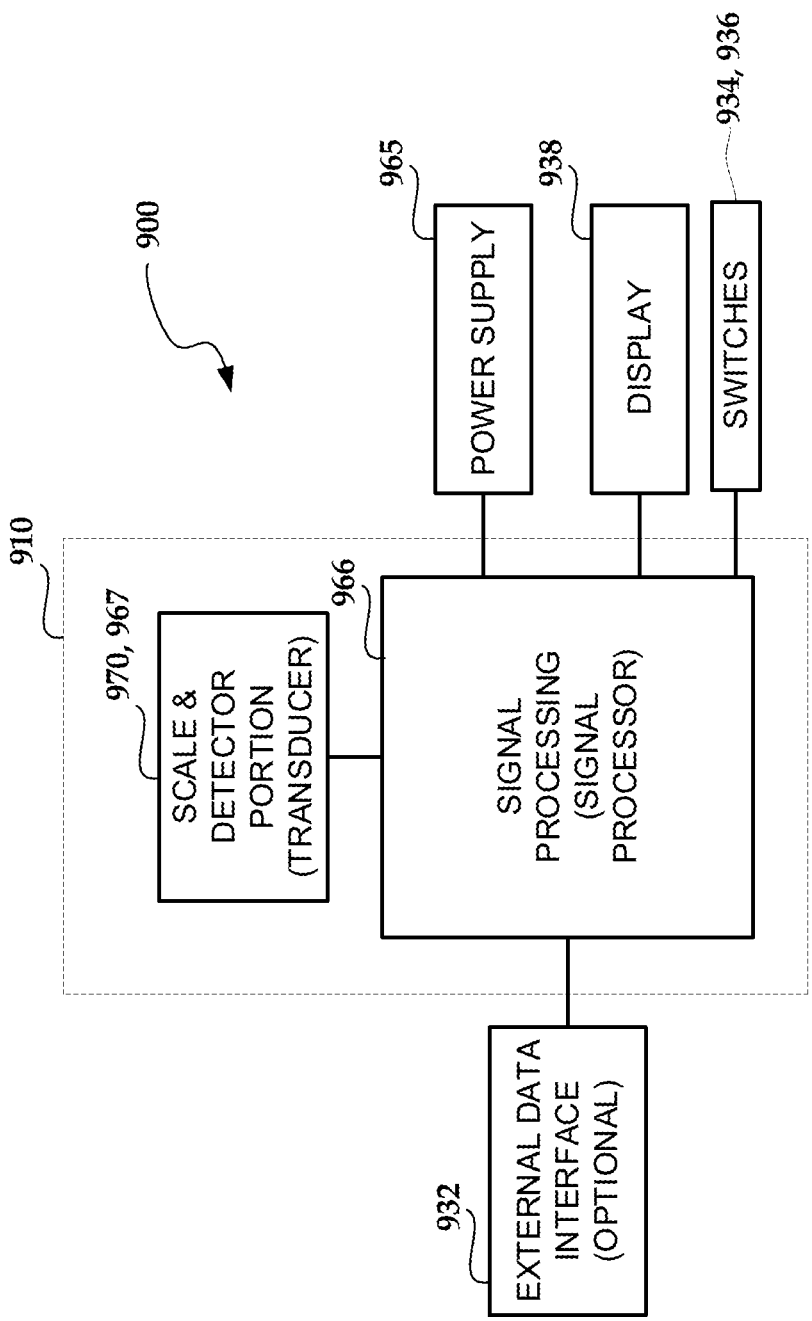
FIG. 9 is a block diagram illustrating one exemplary implementation of components of a measurement system including an electronic position encoder.

FIG. 9 is a block diagram illustrating one exemplary implementation of components of a measurement system 900 including an electronic position encoder 910. It will be appreciated that certain numbered components 9XX of FIG. 6 may correspond to and/or have similar operations as similarly numbered components 1XX of FIG. 1, except as otherwise described below. The electronic position encoder 910 includes a scale 970 and a detector portion 967, which together form a transducer, and a signal processing configuration 966. In various implementations, the detector portion 967 may include any of the configurations described above with respect to FIGS. 2-8, or other configurations. The measurement system 900 also includes user interface features such as a display 938 and user-operable switches 934 and 936, and may additionally include a power supply 965. In various implementations, an external data interface 932 may also be included. All of these elements are coupled to the signal processing configuration 966 (or signal processing and control circuit), which may be embodied as a signal processor. The signal processing configuration 966 may provide a drive signal to a field generating coil configuration in the detector portion 967 and determine a position of the sensing elements of the detector portion 967 relative to the scale 970 based on detector signals input from the detector portion 967, as previously outlined herein.

In various implementations, the signal processing configuration 966 of FIG. 9 (and/or the other signal processing configurations shown and described herein) may comprise or consist of one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The disclosure below with reference to FIGS. 10-14 introduces an element or configuration, referred to below as an end gradient arrangement or EGA, that may be used in a field generating coil configuration FGC to further reduce or remove certain position error components due to end effects. Briefly stated, an EGA is configured to induce a field gradient that reduces the field strength in the generated field area GFA as a function of position along the x-axis direction as the position approaches the end of the generated field area. In contrast, the field generating coil configurations FGC disclosed in the '335 patent or as previously described herein generally provide a nominally uniform field strength within the generated field area GFA. The utility of providing a field gradient within the generated field area GFA near its end is not taught or used to advantage therein. Any field gradient that may exist at the end of the generated field area GFA therein is not explicitly considered or described and may be regarded as inadvertent or unintentional.

Figure 10:
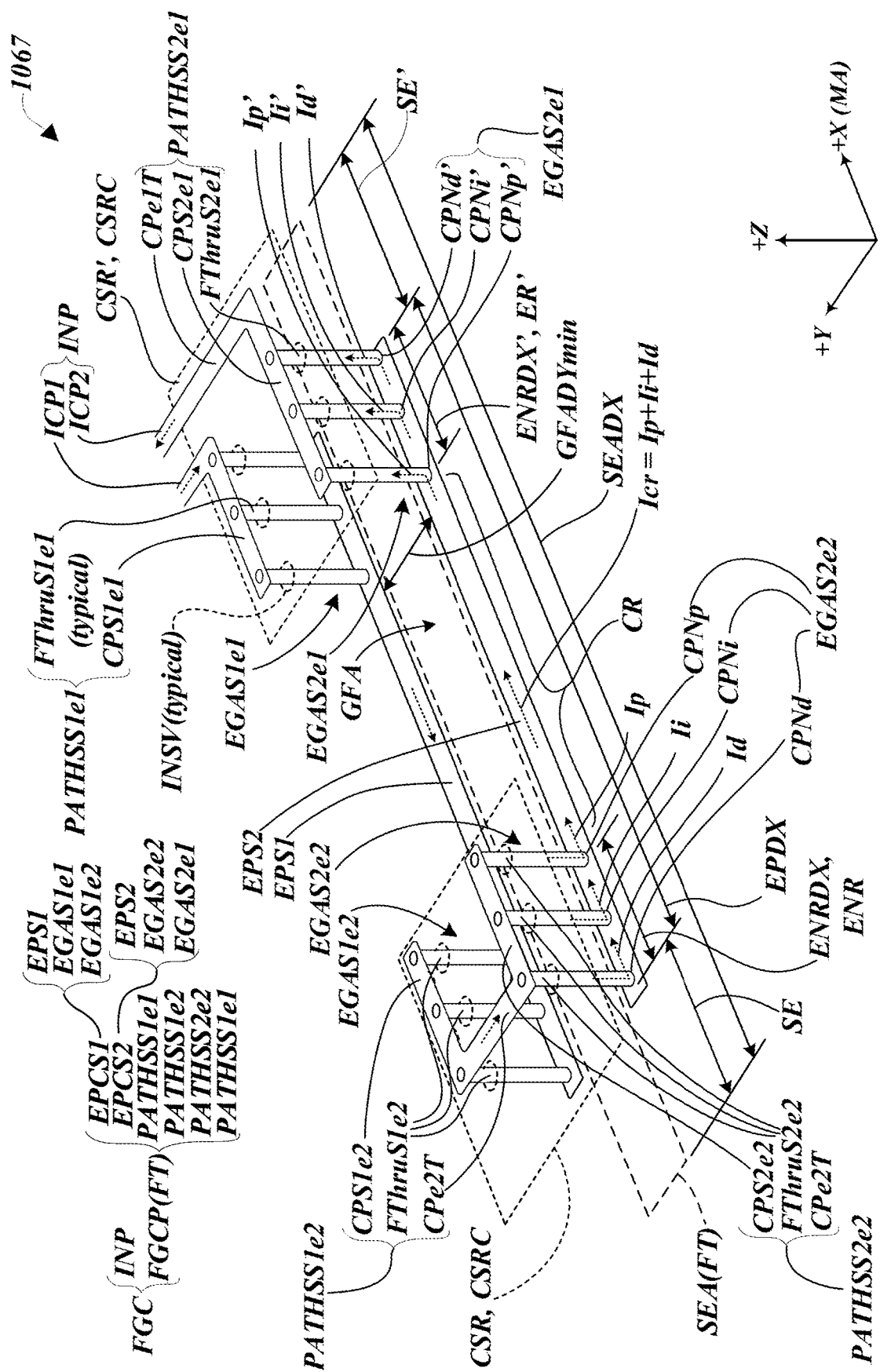
FIG. 10 is an isometric view diagram illustrating a fifth exemplary implementation of a detector portion showing a field generating coil configuration including an implementation of "Type A" end gradient arrangement according to principles disclosed herein.
Figure 11:
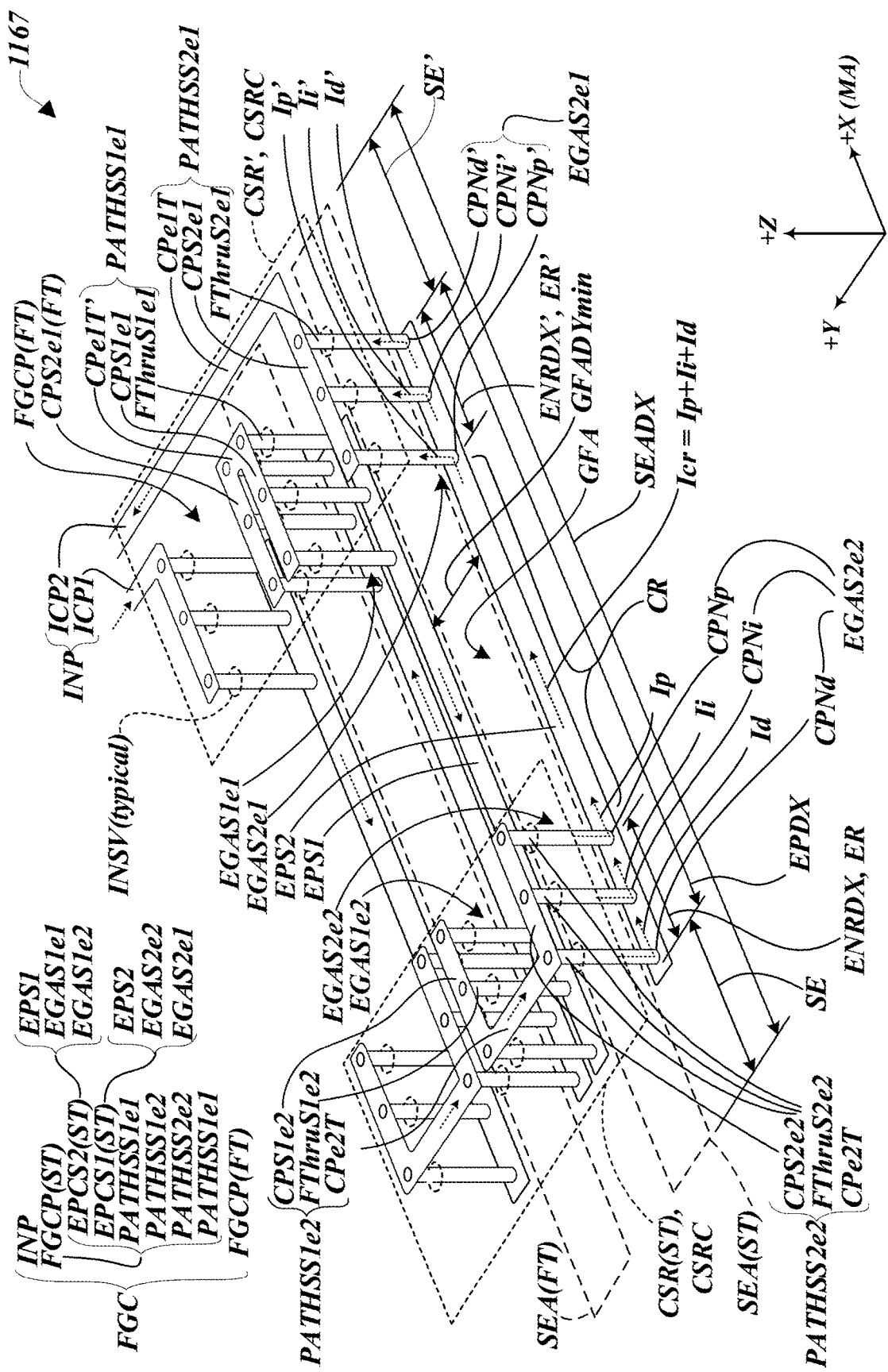
FIG. 11 is an isometric view diagram illustrating a sixth exemplary implementation of a detector portion, showing a field generating coil configuration including first-track and second-track field generating coil portions, each including an implementation of a Type A end gradient arrangement according to principles disclosed herein.
Figure 12:
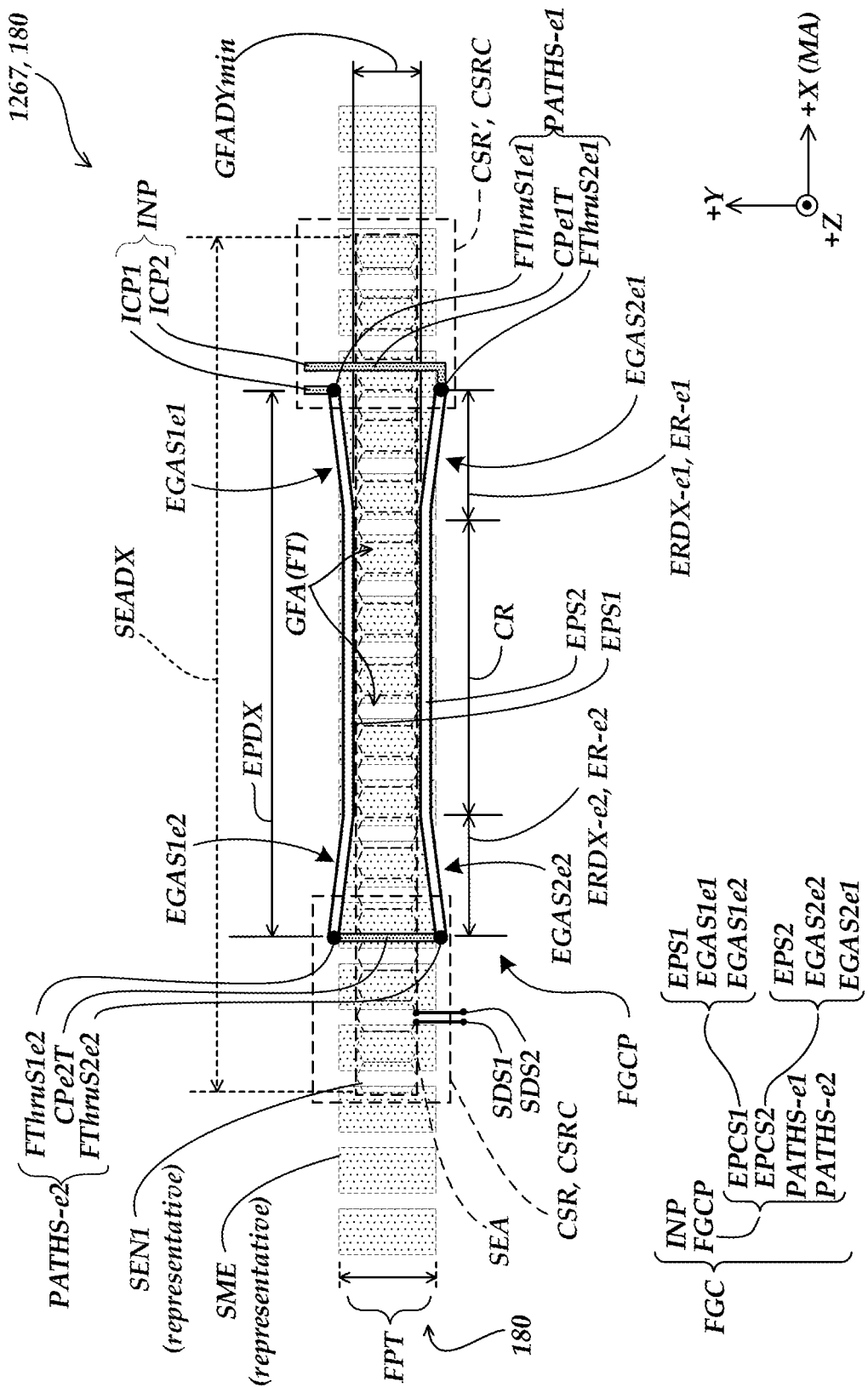
FIG. 12 is a plan view diagram illustrating a seventh exemplary implementation of a detector portion, showing a field generating coil configuration including an implementation of "Type B" end gradient arrangement according to principles disclosed herein.
Figure 13:
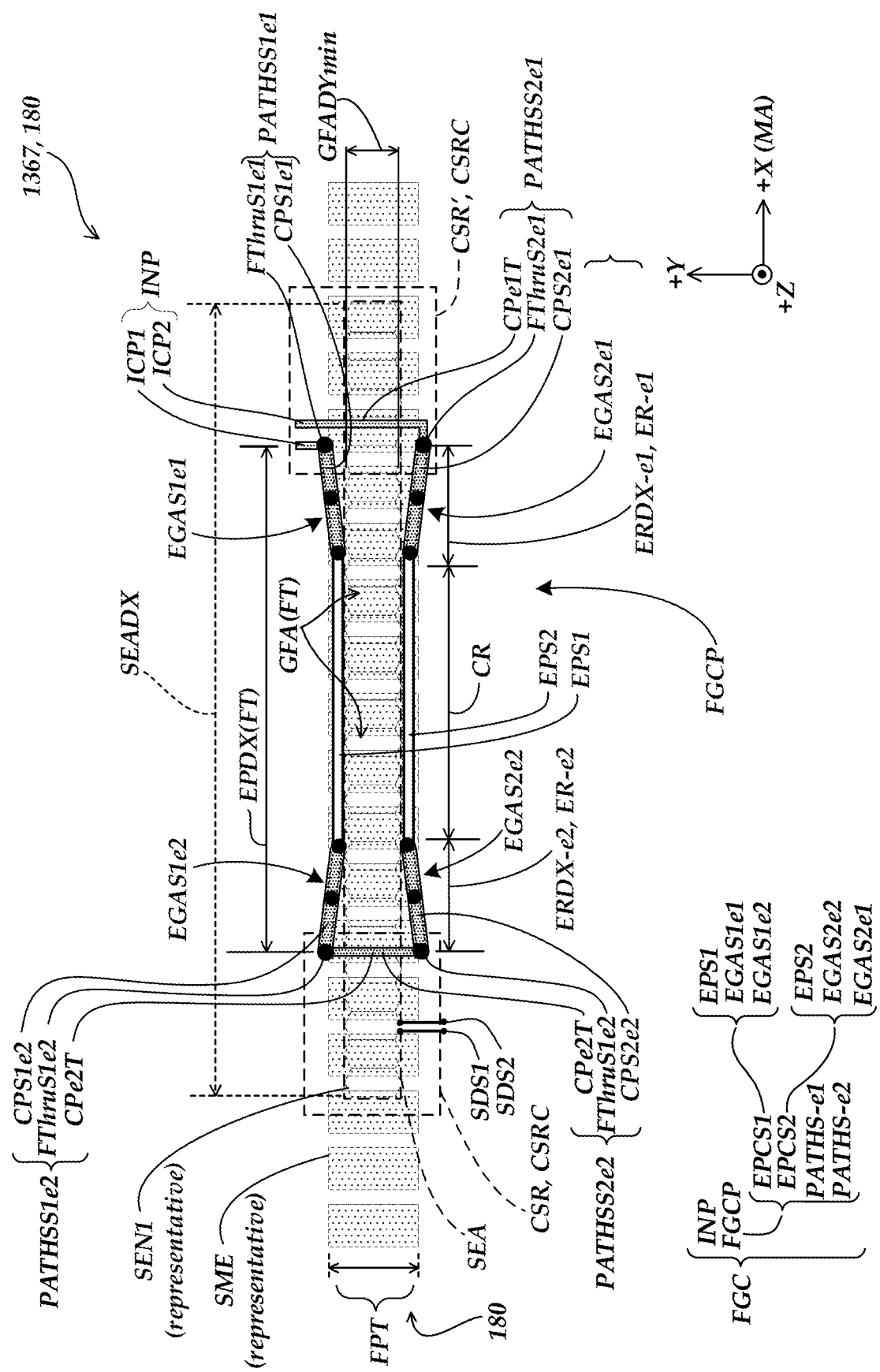
FIG. 13 is a plan view diagram illustrating an eight exemplary implementation of a detector portion, showing a field generating coil configuration including an end gradient arrangement that combines features of both Type A and Type B end gradient arrangements according to principles disclosed herein.
Figure 14:
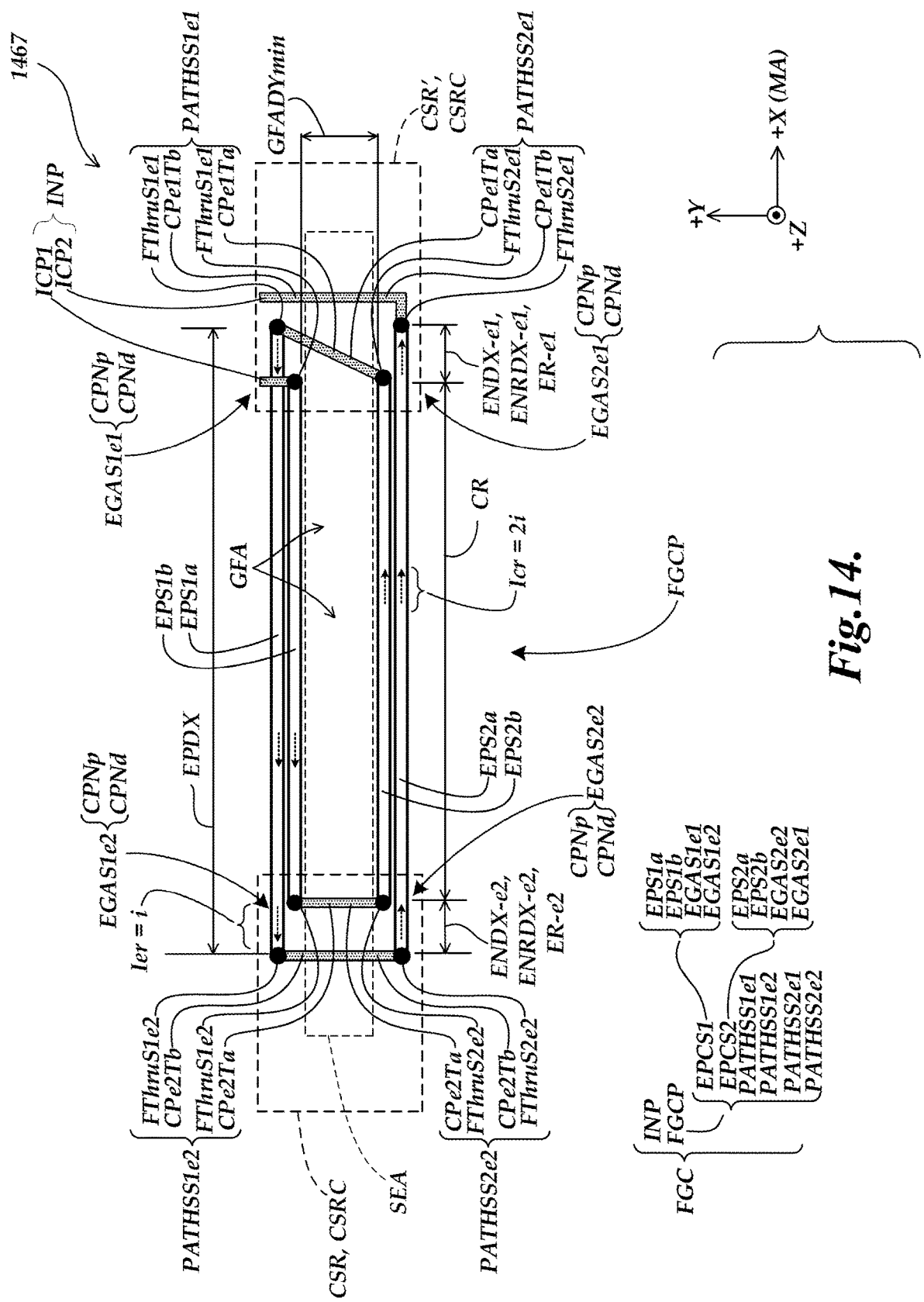
FIG. 14 is a plan view diagram illustrating a ninth exemplary implementation of a detector portion, showing a "two-turn" field generating coil configuration including an end gradient arrangement that combines features of both Type A and Type B end gradient arrangements according to principles disclosed herein.

In some implementations one or more EGAs disclosed herein may be used in combination with one or more teachings disclosed in the '335 patent and/or as previously disclosed herein with reference to FIGS. 4-8 to further improve the S/N ratio, accuracy, and/or size in an electronic position encoder. In some implementations, use of EGAs may allow relaxing certain design constraints implied in the teachings disclosed in the '335 patent and/or as previously disclosed herein with reference to FIGS. 4-8, while still retaining a sufficient or improved S/N ratio, accuracy, and/or size in an electronic position encoder. Two particular "types" of EGAs are shown and described in detail below, "Type A" and Type B". FIGS. 10 and 11 show Type A EGAs. FIG. 12 shows a Type B EGA. FIGS. 13 and 14 show EGAs that include the design features of both Type A and Type B EGAs, used in combination.

In the following description of FIGS. 10-14, due to certain differences in the design and emphasis in the described embodiments, elements similar or identical to those previously referred to as "shielded end sections SES" in various conductor paths are now referred to as particular cases within the more general designation "shielded layer transverse conductor portions CPeXT", which may also refer to shielded layer transverse conductor portions that do not conform strictly to all previously defined characteristics of a shielded end section SES. Similarly, the conductor layer previous referred to as the shielded end section layer is now referred to using the more general designation "shielded conductor layer."

FIG. 10 is an isometric view diagram illustrating a fifth exemplary implementation of a detector portion 1067 showing a field generating coil configuration FGC including an implementation of "Type A" EGA according to principles disclosed herein. It will be understood that the detector portion 1067 includes sensing elements SEN in the sensing element area SEA and is used in conjunction with a compatible scale pattern (e.g., the scale pattern 180 or the like) according to principles previously described herein. The sensing elements SEN and the scale pattern are not shown in order to more clearly illustrate the features of the novel EGAs in FIG. 10. The detector portion 1067 has certain characteristics and components similar to the detector portions 467 of FIGS. 4-5 and detector portions 667 and 767 of FIGS. 6 and 7, respectively. In particular, elements designated by similar reference numbers in FIG. 10 and FIGS. 4-7 (e.g., similar names or numerals or numerical "suffixes"), or elements that are otherwise obviously similar elements in various figures, are analogous elements, and may be understood to operate similarly, except as otherwise indicated below. The various features shown in FIG. 10 may be regarded as first-track features although their reference numbers do not include the suffix "(FT)". However, of course the various features may also be used in a second track if desired, as shown and described below with reference to FIG. 11. Only certain features of FIG. 10 are described in detail below, insofar as the description is intended to emphasize certain features not previously disclosed herein. Otherwise, FIG. 10 may be understood by analogy to other figures and description herein, or in the incorporated references. Broadly speaking, in contrast to the single conductive feedthroughs and conductor paths used at the end of the elongated portions in previously disclosed detector portions, the primary difference in the detector portion 1067 is that its elongated portions EPS1 and EPS2 are connected through specially configured EGAs to multiple conductor paths at their ends, as described in greater detail below. It will be understood that the detector portion 1067 includes a multi-layer circuit element, e.g., as previously outlined herein, with its conductive layers represented by the various conductive elements illustrated in FIG. 10, which are separated by insulating layers.

As shown in FIG. 10, the field generating coil configuration FGC comprises an input portion INP and the first-track field generating coil portion FGCP(FT). The first-track field generating coil portion FGCP(FT) is configured to nominally surround the first-track generated field area GFA that is nominally aligned with the first pattern track (not shown) and generate a first-track changing magnetic flux in the first-track generated field area GFA in response to the coil drive signal from a signal processing configuration. As previously noted, "nominally surrounds" as used herein applies to any generating coil portion FGCP that is a complete or incomplete "loop" configured such that at least its elongated portions provide an operational generated field the generated field area GFA. In the implementation shown in FIG. 10, the input portion INP comprises the two input connection portions ICP1, and ICP2, which are operably connected to the signal processing configuration (e.g., the signal processing configuration 566) to provide position signal measurement operations that will be understood based on previous description.

The first-track field generating coil portion FGCP(FT) illustrated in FIG. 10 comprises the first-side elongated portion configuration EPCS1 and second-side elongated portion configuration EPCS2, which are fabricated in one or more elongated portion layer of the multi-layer circuit element as previously outlined. The first-side elongated portion configuration EPCS1 and second-side elongated portion configuration EPCS2 extend along the x-axis direction on first and second sides of the generated field area GFA and collectively span or define a first-track elongated portion length dimension EPDX along the x-axis direction. A minimum y-axis direction separation between the first-side and second-side elongated portion configurations EPCS1 and EPCS2 defines a first-track generated field area minimum width dimension GFADYmin. In the particular implementation shown in FIG. 10, the first-side elongated portion configuration EPCS1 comprises the single elongated portion EPS1, and its associated EGAs, EGAS1e1 (the suffix meaning Side 1, end 1) and EGAS1e2 (Side 1, end 2). The second-side elongated portion configuration EPCS2 comprises the single elongated portion EPS2, and its associated EGAs EGAS2e1 (Side 2, end 1) and EGAS1e2 (Side 1, end 2). However, in other implementations, it should be appreciated that an elongated portion configuration may be more complicated, for example including a plurality of elongated portions, shaped and interconnected in various ways, if desired.

The first-track field generating coil portion FGCP(FT) further comprises a set of first-track conductor paths PATHS (e.g., comprising subsets PATHSxxxx, as described further below), wherein each member conductor path is connected to at least one of the first-track first-side or second-side elongated portion configurations EPCS1 or EPCS2. At least one member conductor path comprises a shielded layer conductor portion CPxxxx (e.g., shielded layer conductor portion CPS1e2) that is fabricated in a first-track shielded conductor layer of the multi-layer circuit element. At least one such shielded layer conductor portion is a transverse conductor portion (e.g., shielded layer conductor portion CPe1T or CPe2T) that extends along a direction transverse to the x-axis direction, and at least one such shielded layer transverse conductor portion (e.g., CPe2T) spans at least the minimum y-axis direction separation GFADYmin between the first-track first-side and second-side elongated portion configurations and is included in a member conductor path that connects the first-track first-side and second-side elongated portion configurations EPCS1 and EPCS2 in the first-track field generating coil portion FGCP(FT).

In the particular implementation shown in FIG. 10, in operation a current from a drive signal input on the input connection portion ICP1 flows through the conductor path subset PATHSS1e1, which comprises shielded layer conductor portion CPS1e1 (side 1, end 1) and three conductive feedthroughs FThruS1e1 to EGAS1e1 which is part of the first-side elongated portion configuration EPCS1. The current continues through EGAS1e1 and along the elongated portion EPS1 to EGAS1e2 which is part of the first-side elongated portion configuration EPCS1. The current continues through EGAS1e2 to the connected conductor path subset PATHSS1e2, which comprises three conductive feedthroughs FThruS1e2, the shielded layer conductor portion CPS1e2, and the shielded layer transverse conductor portion CPe2T. The current continues through the conductor path subset PATHSS1e2 to the conductor path subset PATHSS2e2. The conductor path subset PATHSS2e2 comprises the shielded layer transverse conductor portion CPe2T (considered to be in two conductor path subsets, which it connects directly), the shielded layer conductor portion CPS2e2, and three conductive feedthroughs FThruS2e2. The current continues through the conductor path subset PATHSS2e2, dividing into three respective current components Id, Ii and Ip that flow to the three current path nodes CPNd. CPNi and CPNp of EGAS2e2, respectively. EGAS2e2 is part of the second-side elongated portion configuration EPCS2. The currents components from the three current path nodes CPNd. CPNi and CPNp of EGAS2e2 are summed in and flow through the central region CR of the elongated portion EPS2 of the second-side elongated portion configuration EPCS2 to EGAS2e1, which is part of the second-side elongated portion configuration EPCS2. The current then divides and continues through the three current path nodes CPNp', CPNi' and CPNd' of EGAS2e1, to the conductor path subset PATHSS2e1 as illustrated. The conductor path subset PATHSS2e1 comprises three conductive feedthroughs FThruS1e1, the shielded layer conductor portion CPS1e1, and the shielded layer transverse conductor portion CPe1T. The current flows through the conductor path subset PATHSS2e1 and continues through the shielded layer transverse conductor portion CPe1T to the input connection portion ICP2 and the signal processing configuration, to operate as previously outlined herein.

In order to describe a Type A EGA in greater detail, we refer to the exemplary end gradient arrangement EGAS2e2, which is a Type A EGA. In general, a Type A EGA comprises at least two respective current path nodes CPN in an associated first-side or second-side elongated portion configuration EPCS1 or EPCS2. The current path nodes include at least a distal current path node CPNd that is closest to the end and farthest from the center of the generated field area GFA with respect to the x-axis direction, and a proximal current path node CPNp that is closest to the center and farthest from the end of the generated field area GFA with respect to the x-axis direction. The current path nodes CPNp and CPNd are each connected in the elongated portion layer to a member conductor path (e.g., of the subset PATHSS2e2, or the like) that carries current outside the elongated portion layer. As a result of such a Type A EGA, in the associated elongated portion configuration the net operational current flow Icr in a central region CR that extends along the x-axis direction to the proximal current path node CPNp is relatively greater than the net operational current flow (e.g., Id or Id+Ii) in an end node region ER that extends along the x-axis direction over a dimension ENRDX between the proximal current path node and the distal current path node is relatively smaller in the elongated portion layer. This results in a desirable field gradient near the end of the generated field area GFA. The particular Type A EGAS2e2 (and others) shown in FIG. 10 further comprises an intermediate current path node CPNi located in the end node region ER between the distal current path node CPNd and the proximal current path node CPNp with respect to the x-axis direction. The intermediate current path node CPNi is likewise connected in the elongated portion layer to a member conductor path of the subset PATHSS2e2 that carries current outside the elongated portion layer. As a result of this particular Type A end gradient arrangement, the net operational current flow Ii+Id in the elongated portion layer in a subregion of the end node region ER between the proximal current path node CPNp and the intermediate current path node CPNi is relatively smaller than the net operational current flow Icr in the central region and relative larger than the net operational current flow Id in a subregion of the end node region ER between the intermediate current path node CPNi and the distal current path node CPNd. This may result in a particularly desirable field gradient near the end of the generated field area GFA. It will be understood that each of the end gradient arrangements EGAS1e1, EGAS1e2, and EGAS2e1 is a Type A EGA configured similarly to EGAS2e2, and may be understand by analogy to the previous description. Each EGA operates in an analogous manner to induce a field gradient that reduces the field strength in the generated field area GFA as a function of position along the x-axis direction as the position approaches the end of the generated field area GFA.

In the particular Type A EGAs shown in FIG. 10, each respective current path node CPNx (e.g., CPNp, CPNi and/or CPNd) is connected to a respective member conductor path comprising a respective conductive feedthrough FThruSXeX, which extends generally along the z-axis direction and connects that current path node CPNx to a shielded layer conductor portion CPSXeX. In the particular Type A EGAs shown in FIG. 10, each respective current path node CPNx is a respective EGASXeX that is connected through its respective conductive feedthrough FThruSXeX to the same shielded layer conductor portion CPSXeX. However, it will be understood that different conductor path configurations are possible, if desired. As one example, in an alternative version of the subset PATHSS2e2, each respective conductive feedthrough FThruS2e2 could be connected to a different shielded layer transverse conductor portion configured similarly to the shielded layer transverse conductor portion CPe2T, which connects directly to a corresponding conductive feedthrough FThruS1e2 in the subset PATHSS1e2, without the use of the shielded layer conductor portion CPS2e2 (and/or CPSS1e2.) Other possible configurations will be apparent to one of ordinary skill in the art based on this disclosure.

As shown in FIG. 10, the conductive shield regions CSR and CSR' may be considered to be included in a conductive shield region configuration CSRC. According to previously outlined principles, the conductive shield regions CSR and CSR' generally extend along the x-axis and y-axis directions to various extents in various implementations, and are fabricated in a shield region layer (or layers) that is (are) located between the shielded conductor layer and one or more receiver loop layers of the multi-layer circuit element, with respect to their locations along a z-axis direction that is nominally normal to the front surface of the multi-layer circuit element. In the particular implementation shown in FIG. 10, the conductive shield region configuration CSRC comprises respective conductive shield regions CSR, CSR' interposed between the receiver loop layers and all respective shielded layer conductor portions CPSXeX, CPeXT, included in any member conductor paths PATHSSXeX connected to current path nodes CPNx, CPNx' included in any Type A end gradient arrangement EGASXeX. The respective conductive shield regions CSR, CSR' are configured to intercept the entire area of a z-axis projection of all the respective shielded layer conductor portions CPSXeX, CPeXT, included in any member conductor paths PATHSSXeX connected to current path nodes CPNx, CPNx' included in any Type A end gradient arrangement EGASXeX, at least where the z-axis projection falls within a y-axis width dimension that spans the first-side and second-side elongated portion configurations EPCS1 and EPCS2, except where the respective conductive shield regions CSR, CSR' include insulating voids INSV that surround conductive feedthroughs FThruSXeX that extend generally along the z-axis direction and pass through the respective conductive shield regions CSR, CSR'. Such extensive shielding by the conductive shield region configuration CSRC may be most advantageous in various implementations, and particularly in implementations such as that shown in FIG. 10, wherein the sensing element area SEA extends over a sensing element area length dimension SEADX along the x-axis direction and a sensing element area width dimension along the y-axis direction, wherein the sensing element area length dimension SEADX along the x-axis direction is longer than the elongated portion length dimension EPDX (e.g., by an amount SE at each end, as shown in FIG. 10.) In various implementations the signal modulating elements of the first pattern track are arranged corresponding to a spatial wavelength WL along the x-axis direction, and the amount SE is at least as large as WL, as previously outlined herein.

However, such extensive shielding is not strictly required in all implementations. For the implementation shown in FIG. 10, the shielded layer transverse conductor portions CPe2T (or CPe1T) included in a member conductor path PATHSS2$e$2 (or PATHSS2$e$1) connected to current path node CPNx included in a Type A end gradient arrangement EGAS2$e$2 (or EGAS2$e$1) is configured such that its (their) z-axis projection toward the receiver loop layers (that is, down in FIG. 10) overlaps with the conductive receiver loops in the sensing element area SEA. In such an implementation, in comparison to the shielded layer transverse conductor portions CPSXeX, it is primarily the shielded layer transverse conductor portions CPe2T and CPe1T that have constrained design locations and that generate unwanted fields and related end effects that would unavoidably strongly couple to the conductive receiver loops in the sensing element area SEA in the absence of shielding. Thus, in some such implementations, it may provide sufficient performance advantages and/or accuracy if the respective first-track conductive shield regions CSR, CSR' are configured to intercept the entire area of a z-axis projection of at least all respective shielded layer transverse conductor portions included in any member conductor paths CPeXT connected to current path nodes CPNx included in any Type A end gradient arrangement EGASXeX, at least where their z-axis projection overlaps the sensing element area SEA, except where the respective conductive shield regions CSR, CSR' include insulating voids INSV that surround conductive feedthroughs FThruSXeX that extend generally along the z-axis direction and pass through the respective conductive shield regions CSR, CSR'. This might be referred to as a shielded layer transverse conductor portion comprehensive-covering shield region configuration.

However, it should be appreciated in some implementations where EGAs are included according to principles disclosed herein, it may not be necessary for the sensing element area length dimension SEADX to extend beyond the elongated portion length dimension EPDX (that is, the amount SE may be zero, or the sensing element area length dimension SEADX may be less than the elongated portion length dimension EPDX), as explained in the following: According to one possible understanding, in the absence of an EGA (e.g., in the implementation shown in FIG. 5) the field strength generated in the generated field area GFA will naturally decay or fall off beyond the ends of the elongated portion length dimension EPDX, and exhibit a field gradient outside the generated field area GFA. There is reason to believe this field gradient outside the generated field area GFA may provide certain spatial filtering advantages when it is received by sensing elements in a sensing element area SEA that extends over the field gradient outside the generated field area GFA. This may be an unexpected effect that benefits performance in the implementations described with reference to FIGS. 4-8, in addition to the other previously outlined effects and benefits attributed to their characteristics. In contrast, in an implementation that uses an EGA according to principles disclosed herein (e.g., as shown in FIG. 10), it will be appreciated that the field strength generated in the generated field area GFA will include an intentionally created gradient inside the ends of the elongated portion length dimension EPDX, and inside the generated field area GFA. As such, there is reason to believe this field gradient inside the generated field area GFA may provide the aforementioned spatial filtering advantages when it is received by sensing elements in a sensing element area SEA that extends over the field gradient inside the generated field area GFA. In such a case, in some implementations, the sensing element area SEA need not extend beyond the end of the generated field area GFA, and sufficient or desirable performance may still be obtained. It will be appreciated that in some such implementations, a z-axis projection of respective shielded layer transverse conductor portion (e.g., CPe2T) that connects the first-side and second-side elongated portion configurations and that is connected to a current path node (e.g., CPNd) included in a Type A end gradient arrangement (e.g., EGAS2$e$2) need not overlap with conductive receiver loops in a sensing element area SEA that is shorter than the generated field area GFA. However, to limit the overall size of a detector portion to be as short as possible (or for other reasons), it may be desirable to position the shielded layer transverse conductor portion (e.g., CPe2T) such that its z-axis project is relatively close to the end of the sensing loop area SEA. Accordingly, in some such implementations, it may still be desirable if the conductive shield region configuration CSRC comprises at least one conductive shield regions CSR interposed between the receiver loop layers and a shielded layer transverse conductor portion that connects the first-side and second-side elongated portion configurations (e.g., CPe2T) and is configured to intercept at least a majority of area of the z-axis projection of that shielded layer transverse conductor portion (e.g., CPe2T) along the z-axis direction toward the receiver loop layers. In such a case, sufficient performance advantages and/or accuracy may still be provided in various implementations that include an EGA (e.g., a Type A EGA, or a Type B EGA) according to principles disclosed here. This might be referred to as a shielded layer transverse conductor portion majority-covering shield region configuration.

As outlined above, there is reason to believe that a field gradient provide by an EGA according to principles disclosed herein may provide certain spatial filtering advantages (e.g., to reduce certain spatial harmonic errors in a resulting position signal, or the like) when it is received by sensing elements in a sensing element area SEA that extends along that field gradient. The inventor has determined that such spatial filtering advantages may be relatively enhanced when the x-axis direction length of the spatial gradient that is received by the sensing elements is relatively longer (at least up to some practical limit that may be determined by experiment or analysis.) Therefore in various implementations where the signal modulating elements of the first pattern track are arranged corresponding to a spatial wavelength WL along the x-axis direction as previously described herein, it may be advantageous if each Type A EGA included in a detector portion is configured such that its end node region ER has an end node region dimension ENRDX along the x-axis direction that is at least J*WL, wherein J is a number that is at least 1, or at least 2, or more.

FIG. 11 is an isometric view diagram illustrating a sixth exemplary implementation of a detector portion 1167, showing a field generating coil configuration FGC including first-track and second-track field generating coil portions FGCP(FT) and FGCP(ST), each substantially similar to the first-track field generating coil portion FGCP(FT) previously described with reference to FIG. 10, including implementation of Type A EGAs according to principles previously disclosed with reference to FIG. 10. The first-track and second-track field generating coil portions FGCP(FT) and FGCP(ST) are arranged and operate in a manner similar to those previously described with reference to FIG. 7. Broadly speaking, in contrast to the single conductive feedthroughs and conductor paths used at the end of the various elongated portions EPS1 and EPS2 shown in FIG. 7, the primary difference in the detector portion 1167 is that its elongated portions EPS1 and EPS2 are connected at their ends through the illustrated Type A EGAs, according to principles described with reference to FIG. 10. Therefore, the detector portion 1167 may be understood based on the previous description of FIGS. 10 and 7, and only certain differences and/or clarifications thereto are described in detail below.

It will be understood that the detector portion 1167 includes sensing elements SEN in the sensing element area SEA that may be similar or identical to those previously described with reference to FIG. 7, and it may be used in conjunction with a compatible scale pattern similar to the scale pattern 680 shown in FIGS. 6 and 7. The sensing elements SEN and the scale pattern are not shown in order to more clearly illustrate certain novel features of the detector portion 1167. Most of the various features shown in FIG. 11 that do not include an explicit "track suffix" (FT) or (ST) may be regarded as second-track features, where the track suffix has been omitted to reduce visual clutter.

With regard to the first-track field generating coil portions FGCP(FT) of the detector portion 1167, it may be regarded as nearly identical to the first-track field generating coil portion FGCP(FT) previously described with reference to FIG. 10, except that in FIG. 11 its shielded layer conductor portion CPS2e1(FT) is connected to the second-track field generating coil portion FGCP(ST) through the shielded layer conductor portion CPe1T', rather than being connected to the input connection portion ICP2 as in FIG. 10.

With regard to the second-track field generating coil portions FGCP(ST) of the detector portion 1167, it may be regarded as nearly identical to the first-track field generating coil portion FGCP(FT) previously described with reference to FIG. 10, except that in its conductor path subset PATHSS1e1 in FIG. 11 its shielded layer conductor portion CPS1e1 is connected to the first-track field generating coil portion FGCP(FT) through the shielded layer conductor portion CPe1T', rather than being connected to the input connection portion ICP1 as in FIG. 10.

Thus, the detector portion 1167 may operate substantially similarly to the detector portion 767 shown in FIG. 7, except for it may have the additional benefits and design flexibility associated with the use of its various end gradient arrangements EGASXeX, as previously outlined with reference to FIG. 10. It will be understood that numerous variations of the various elements shown in FIG. 11 are possible according to principles previously outlined with reference to FIG. 10, and elsewhere herein. Thus, the "two track" implementation shown in FIG. 11 is exemplary only, and not limiting.

FIG. 12 is a plan view diagram illustrating a seventh exemplary implementation of a detector portion 1267, showing a field generating coil configuration FGC including an implementation of "Type B" end gradient arrangement EGA according to principles disclosed herein, and a compatible scale pattern 180 usable in an electronic position encoder. Broadly speaking, the detector portion 1267 is in many respects similar to the detector portion 467 described with reference to FIGS. 4 and 5. It will be understood that the detector portion 1267 includes sensing elements SEN in the sensing element area SEA that may be similar or identical to those previously described with reference to FIGS. 4 and 5, and it may be used in conjunction with a compatible scale pattern similar to the scale pattern 180 shown in FIGS. 4 and 5. Reference numerals similar to those used in FIG. 10, and/or in FIGS. 4-5 (e.g., similar names or numerals or numerical "suffixes"), may designate analogous or similar elements in FIG. 12. Such elements, and/or others that are otherwise obviously similar to elements in various figures, may be understood to be analogous elements and operate similarly, except as otherwise indicated below. Only certain features of FIG. 12 are described in detail below, insofar as the description is intended to emphasize certain features not previously disclosed herein. Otherwise, FIG. 12 may be understood by analogy to other figures and description herein, or in the incorporated references.

Broadly speaking, the primary difference in the detector portion 1267 in comparison to the detector 467 shown In FIGS. 4 and 5 is that its elongated portion configurations EPCS1 and EPCS2 include specially configured Type B EGAs, and their elongated portions EPS1 and EPS2 are connected to conductor paths at their ends through the Type B EGAs, as described in greater detail below.

It will be understood that the detector portion 1267 includes a multi-layer circuit element, e.g., as previously outlined herein, with its conductive layers represented by the various conductive elements illustrated in FIG. 12, which are separated by insulating layers, approximately as previously outlined with reference to FIG. 5 and elsewhere herein.

As shown in FIG. 12, the field generating coil configuration FGC comprises an input portion INP and the field generating coil portion FGCP. In the implementation shown in FIG. 12, the input portion INP comprises the two input connection portions ICP1, and ICP2, which are operably connected to the signal processing configuration (e.g., the signal processing configuration 566) to provide position signal measurement operations that will be understood based on previous description.

The field generating coil portion FGCP illustrated in FIG. 12 comprises the first-side elongated portion configuration EPCS1 and second-side elongated portion configuration EPCS2, which are fabricated in one or more elongated portion layer of the multi-layer circuit element as previously outlined. The first-side elongated portion configuration EPCS1 and second-side elongated portion configuration EPCS2 extend along the x-axis direction on first and second sides of the generated field area GFA and collectively span or define a elongated portion length dimension EPDX along the x-axis direction. A minimum y-axis direction separation between the first-side and second-side elongated portion configurations EPCS1 and EPCS2 defines a generated field area minimum width dimension GFADYmin. In the particular implementation shown in FIG. 12, the first-side elongated portion configuration EPCS1 comprises the single elongated portion EPS1, and its associated Type B EGAs, EGAS1e1 and EGAS1e2. The second-side elongated portion configuration EPCS2 comprises the single elongated portion EPS2, and its associated Type B EGAs, EGAS2e1 and EGAS1e2. However, in other implementations, it should be appreciated that an elongated portion configuration including Type B EGAs may be more complicated, for example including a plurality of elongated portions, shaped and interconnected in various ways, if desired.

The field generating coil portion FGCP further comprises a set of conductor paths PATHS (e.g., comprising subsets PATHS-eX), as described further below), wherein each member conductor path is connected to at least one of the first-side or second-side elongated portion configurations EPCS1 or EPCS2. At least one member conductor path comprises a shielded layer conductor portion CPxxx (e.g., shielded layer conductor portion CPe1T or CPe2T) that is fabricated in a shielded conductor layer of the multi-layer circuit element. In the particular implementation shown in FIG. 12, the shielded layer conductor portions are transverse conductor portion (e.g., shielded layer conductor portion CPe1T or CPe2T) that extend along a direction transverse to the x-axis direction. The shielded layer transverse conductor portion CPe2T is a shielded layer transverse conductor portion that spans at least the minimum y-axis direction separation GFADYmin between the first-side and second-side elongated portion configurations and is included in a member conductor path that connects the first-side and second-side elongated portion configurations EPCS1 and EPCS2 in the field generating coil portion FGCP.

In the particular implementation shown in FIG. 12, in operation a current from a drive signal input on the input connection portion ICP1 flows through the conductive feedthrough FThruS1e1 of the conductor path subset PATHS-e1 to Type B EGAS1e1 which is part of the first-side elongated portion configuration EPCS1. The current continues through EGAS1e1 and along the elongated portion EPS1 to Type B EGAS1e2 which is part of the first-side elongated portion configuration EPCS1. The current continues through EGAS1e2 to the connected conductor path subset PATHS-e2, which comprises the conductive feedthrough FThruS1e2, the shielded layer transverse conductor portion CPe2T, and the conductive feedthrough FThruS2e2. The current continues through the conductor path subset PATHS-e2 to the Type B EGAS2e2. EGAS2e2 is part of the second-side elongated portion configuration EPCS2. The current flows through EGAS2e2 and through the elongated portion EPS2 to Type B EGAS2e1 which is part of the second-side elongated portion configuration EPCS2. The current then flows through EGAS2e1 and through the conductive feedthrough FThruS2e1 and the shielded layer transverse conductor portion CPe1T of the conductor path subset PATHS-e1 to the input connection portion ICP2 and the signal processing configuration, to operate as previously outlined herein.

In order to describe one implementation of a Type B EGA in greater detail, we refer to EGAS2e2, which is one implementation of a Type B EGA. In general a respective Type B EGA comprises a configuration wherein the first-side and second-side elongated portion configurations EPCS1 and EPCS2 are relatively closer to one another along the y-axis direction in the elongated portion layer over a central region CR that extends along the x-axis direction, and the respective Type B EGA is configured such that the first-track first-side and second-side elongated portion configurations EPCS1 and EPCS2 are relatively farther from one another along the y-axis direction in the elongated portion layer over a respective end region ER that extends along the x-axis direction. The respective end region ER (e.g., ER-e2) is associated with the respective Type B EGA (e.g., EGAS2e2). The respective Type B EGA (e.g., EGAS2e2) is included in the associated first-side or second-side elongated portion configuration (e.g., EPCS2) and is connected in the elongated portion layer in the respective end region ER (e.g., ER-e2) to a member conductor path (e.g., PATHS-e2) that carries current outside the elongated portion layer. As a result of such a Type B end gradient arrangement (e.g., EGAS2e2), the generated field area GFA is relatively narrower along the y-axis direction along the central region CR and relatively wider along the y-axis direction along the respective end region ER (e.g., ER-e2) associated with the respective Type B EGA (e.g., EGAS2e2). This results in a desirable field gradient near the end (e.g., end 2) of the generated field area GFA, wherein the field strength and signal strength in the sensing elements SEN located near the end (e.g., end 2) of the generated field area diminish along the end region ER-e2, which may provide a desirable spatial filtering effect as previously outlined herein.

In the particular implementation of a Type B EGA exemplified by EGAS2e2, it will be appreciated the Type B EGA comprises the end portion of the second-side elongated portion EPS2, which is angled away from the sensing element area SEA and away from the first-side elongated portion EPS1 over the end region ER-e2. According to one type of description, this may be regarded as one implementation of a Type B end gradient arrangement wherein its respective end region ER-e2 includes a proximal subregion that is closer to the central region CR and a distal subregion that is farther from the central region CR than the proximal subregion. In the distal subregion the second-side elongated portion configuration EPCS2 is separated relatively farther from the first-side elongated portion configuration EPCS1 along the y-axis direction in comparison to its separation in the proximal subregion. This may result in a particularly desirable (e.g., gradually changing) field gradient near the end of the generated field area GFA. It will be appreciated that this implementation of a Type B EGA is exemplary only and not limiting. For example, in various implementations, the configuration of an elongated portion in an end region ER need not comprise a straight angled portion—it may simply comprise one or more "stepped" segments that are not angled. Other alternative Type B EGAs are described below with reference to FIGS. 13 and 14, and yet other Type B EGA implementations will be apparent to one of ordinary skill in the art based on this disclosure.

In various implementations a Type B EGA may advantageously be configured to include certain features previously outlined with reference to Type A EGAs. As one example, in various implementations where the signal modulating elements of the first pattern track are arranged corresponding to a spatial wavelength WL along the x-axis direction, it may be advantageous if each Type B EGA included in a detector portion is configured such that its end node region ER has an end node region dimension ERDX along the x-axis direction that is at least J*WL, wherein J is a number that is at least 1, or at least 2, or more.

As shown in FIG. 12, the conductive shield regions CSR and CSR' may be considered to be included in a conductive shield region configuration CSRC. According to previously outlined principles, the conductive shield regions CSR and CSR' generally extend along the x-axis and y-axis directions to various extents in various implementations, and are fabricated in a shield region layer (or layers) that is (are) located between the shielded conductor layer and one or more receiver loop layers of the multi-layer circuit element, with respect to their locations along a z-axis direction that is nominally normal to the front surface of the multi-layer circuit element.

In the particular implementation shown in FIG. 12, the sensing element area SEA extends over the sensing element area length dimension SEADX along the x-axis direction and a sensing element area width dimension along the y-axis direction, wherein the sensing element area length dimension SEADX is longer than the elongated portion length dimension EPDX. The shielded layer transverse conductor portion CPe2T that connects the first-side and second-side elongated portion configurations EPCS1 and EPCS2 is configured such that its z-axis projection toward the receiver loop layers at least partially overlaps with the conductive receiver loops in the sensing element area SEA. In this implementation the conductive shield region configuration CSRC advantageously comprises the conductive shield region CSR configured such that it is interposed between the receiver loop layers and the associated shielded layer transverse conductor portion CPe2T and is configured to intercept all the area of the z-axis projection of that shielded layer transverse conductor portion CPe2T along the z-axis direction toward the receiver loop layers, at least where that z-axis projection overlaps the sensing element area SEA, except where the conductive shield region CSR includes insulating voids that surround conductive feedthroughs (e.g., the conductive feedthroughs FThruS1e2 and FThruS2e2) that extend generally along the z-axis direction and pass through that respective conductive shield region CSR. The conductive shield region CSR' is similarly configured relative to the shielded layer transverse conductor portion CPe1T, and similarly shielded by the conductive shield region CSR'.

However, such extensive shielding is not strictly required in all implementations. For example, for the same reason previously explained with reference to Type A EGAs, it should be appreciated in some implementations where Type B EGAs are included according to principles disclosed herein, it may not be necessary for the sensing element area length dimension SEADX to extend beyond the elongated portion length dimension EPDX (that is, the amount SE may be zero, or the sensing element area length dimension SEADX may be less than the elongated portion length dimension EPDX.) It will be appreciated that in some such implementations, a z-axis projection of a respective shielded layer transverse conductor portion (e.g., CPe2T) that connects the first-side and second-side elongated portion configurations EPCS1 and EPCS2 and that is connected to the end region ER or to part of an elongated portion that is configured as or comprises a Type B EGA (e.g., EGAS2e2) need not overlap with conductive receiver loops in a sensing element area SEA that is shorter than the generated field area GFA. However, to limit the overall size of a detector portion to be as short as possible (or for other reasons), it may be desirable to position the shielded layer transverse conductor portion (e.g., CPe2T) such that its z-axis project is relatively close to the end of the sensing loop area SEA. Accordingly, in some such implementations, it may still be desirable if the conductive shield region configuration CSRC comprises at least one conductive shield regions CSR interposed between the receiver loop layers and the shielded layer transverse conductor portion that connects the first-side and second-side elongated portion configurations (e.g., CPe2T) and is configured to intercept at least a majority of area of the z-axis projection of that shielded layer transverse conductor portion (e.g., CPe2T) along the z-axis direction toward the receiver loop layers. In such a case, sufficient performance advantages and/or accuracy may still be provided in various implementations that include a Type B EGA according to principles disclosed herein.

FIG. 13 is a plan view diagram illustrating an eight exemplary implementation of a detector portion 1367, showing a field generating coil configuration FGC including end gradient arrangements EGASXeX that combine features of both Type A and Type B EGAs according to principles disclosed herein, and a compatible scale pattern 180 usable in an electronic position encoder.

Broadly speaking, the detector portion 1367 is in most respects similar to the detector portion 1267 described with reference to FIG. 12, except the end gradient arrangements EGASXeX include Type A EGA element features similar or identical to those previously described with reference to the Type A EGAs shown in FIG. 10, in addition to including Type B EGA element features similar or identical to those previously described with reference to the Type B EGAs shown in FIG. 12. Reference numerals similar to those used in FIGS. 10 and/or 12 may designate analogous or similar elements in FIG. 13, which may be understood to be analogous elements and/or operate similarly, except as otherwise indicated below. Only certain features of FIG. 12 are described in detail below, insofar as the description is intended to emphasize certain features not previously disclosed herein.

The various cross-hatched shield layer conductor portions CPSXeX obscure the slanted end regions of the elongated portions EPS1 and EPS2, which are fabricated in the elongated portion layer. However, it will be understood that the elongated portions EPS1 and EPS2 shown in FIG. 13 may be similar or identical to those shown in FIG. 12. Thus, each end gradient arrangement EGASXeX shown in FIG. 13 includes Type A EGA features similar or identical to their previously described counterpart Type A EGASXeX in FIG. 10. However, as shown in FIG. 13, the shield layer conductor portions CPSXeX shown in FIG. 13 are angled in their respective end regions ER-e1 and/or ER-e2, such that they are compatible with a Type B EGA, and the associated conductive feedthroughs FThruSXeX and current path nodes CPNp, CPNi and CPNd that are included in the various end gradient arrangement EGASXeX shown in FIG. 13 (but not shown in detail) are arranged in a complementary angled pattern in the respective end regions ER-e1 and/or ER-e2, such that all of the included Type A EGA elements are furthermore compatible with Type B EGA elements and features.

It will be understood the various elements shown in FIG. 13 may be alternatively configured or combined according to principles previously outlined with reference to FIGS. 10 and/or 12, and/or other implementations disclosed herein. Thus, the "Type A EGA and Type B EGA combination" implementation shown in FIG. 13 is exemplary only, and not limiting. Other possible implementations will be apparent to one of ordinary skill in the art based on this disclosure.

FIG. 14 is a plan view diagram illustrating a ninth exemplary implementation of a detector portion 1467, showing a "two-turn" field generating coil configuration FGC including end gradient arrangements EGASXeX that combine features of both Type A and Type B EGAs according to principles disclosed herein. Reference numerals similar to those used in FIGS. 10, 12 and/or 13 may designate analogous or similar elements in FIG. 14, which may be understood to be analogous elements and/or operate similarly, except as otherwise indicated below. Furthermore, certain aspects of the operation and advantages of the "two-turn" field generating coil configuration FGC shown in FIG. 14 may be analogous to the those previously outlined reference to the two-turn field generating coil configuration of the detector portion 867 shown in FIG. 8. Therefore, only certain features of FIG. 14 are described in detail below, insofar as the description is intended to emphasize certain features not previously disclosed herein.

Briefly, in the detector portion 1467 shown in FIG. 14, the two-turn field generating coil configuration FGC comprises:

a first first-side elongated portion EPS1b of first-side elongated portion configuration EPCS1 including a proximal current path node CPNp of EGAS1e1 near a first end of the generated field area GFA, and including a proximal current path node CPNp of EGAS1e2 near a second end of the generated field area GFA;

a first second-side elongated portion EPS2b of a second-side elongated portion configuration EPCS2 including a proximal current path node CPNp of EGAS2e2 near the second end of the generated field area GFA, and including a proximal current path node CPNp of EGAS2e1 near the first end of the generated field area GFA;

a second first-side elongated portion EPS1a of the first-side elongated portion configuration EPCS1 including a distal current path node CPNd of EGAS1e1 near the first end of the generated field area GFA, and including a distal current path node CPNd of EGAS1e2 near the second end of the generated field area GFA; and a second second-side elongated portion EPS2a of the second-side elongated portion configuration EPCS2 including a distal current path node CPNd of EGAS2e2 near the second end of the generated field area GFA, and including a distal current path node CPNd of EGAS2e1 near the first end of the generated field area GFA.

The proximal current path node CPNp of EGAS1e2 is connected in series to the proximal current path node CPNp of EGAS2e2 through a first member conductor path which comprises a conductive feedthrough FThruS1e2 that is connected to a shielded layer transverse conductor portion CPe2Ta that is connected to a conductive feedthrough FThruS2e2. The proximal current path node CPNp of EGAS2e1 is connected in series to the distal current path node CPNd of EGAS1e1 through a second member conductor path which comprises a conductive feedthrough FThruS2e1 that is connected to a shielded layer transverse conductor portion CPe1Ta that is connected to a conductive feedthrough FThruS1e1. The distal current path node CPNd of EGAS1e2 is connected in series to the distal current path node CPNd of EGAS2e2 through a third member conductor path which comprises a conductive feedthrough FthruS1e2 that is connected to a shielded layer transverse conductor portion CPe2Tb that is connected to a conductive feedthrough FThruS2e2. The distal current path node CPNd of EGAS2e1 may be connected in series to a drive signal input through a conductor path which comprises a conductive feedthrough FthruS2e1 and a shielded layer conductor portion CPe1Tb, and the proximal current path node CPNp of EGAS1e1 may be connected in series to a drive signal input through a conductor path which comprises a conductive feedthrough FthruS1e1.

It will be understood that in each end gradient arrangement EGASXeX shown in FIG. 14, the current flow in the end node region ER between its proximal and distal current path node CPN has a magnitude of 1$i$, because only one elongated portion extends into the end node region ER. In contrast, the central region CR includes 2 elongated portions of the associated elongated portion configuration, which together carry a net current of 2$i$. Thus, each of the end gradient arrangements EGASXeX complies with principles previously outlined in relation to a Type A EGA, herein. Furthermore, it will be understood that in each end gradient arrangement EGASXeX shown in FIG. 14, the separation of the elongated portions EPS1$a$ and Eps2$a$ that extend into the end regions ER of the elongated portion configurations EPCS1 and EPCS2 are farther apart along the y-axis direction in comparison to the y-axis direction separation of the elongated portions EPS1$b$ and EPS2$b$ included in the central region CR of the elongated portion configurations. Thus, each of the end gradient arrangements EGASXeX complies with principles previously outlined in relation to a Type B EGA, herein.

In the implementation shown in FIG. 14, the conductive shield region configuration CSRC comprises respective conductive shield regions interposed between the receiver loop layers and all respective shielded layer transverse conductor portions included in any member conductor paths connected to current path nodes included in the included EGAs. However, various other conductive shield region configurations are possible according to principle previously outlined herein.

It will be understood the various elements shown in FIG. 14 may be alternatively configured or combined according to principles previously outlined with reference to FIGS. 10-13, and/or other implementations disclosed herein. Thus, the "Type A EGA and Type B EGA combination" implementation shown in FIG. 14 is exemplary only, and not limiting. Other possible implementations will be apparent to one of ordinary skill in the art based on this disclosure.

Each of the implementations shown in FIGS. 10-14 are implementation wherein at each end of the generated field area GFA, each of the first-track first-side and second-side elongated portion EPCS1 and EPCS2 configurations advantageously comprises an EGA configured to induce a field gradient that reduces the field strength in the generated field area GFA as a function of position along the x-axis direction as the position approaches the end of the generated field area GFA. However, it will be appreciated that, in some embodiments and or applications it may be sufficient if at each end of the generated field area only one of the first-track first-side and second-side elongated portion configurations includes an end gradient arrangement that reduces the field strength in the generated field area GFA as a function of position along the x-axis direction as the position approaches the end of the generated field area GFA. Such embodiments may still retain the benefits of an improved S/N ratio, accuracy, and/or size, previously outlined herein in relation to the use of EGAs.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. The various implementations and features described above can be combined to provide further implementations. All of the U.S. patents and U.S. patent applications referred to in this specification are incorporated herein by reference, in their entirety. Aspects of the implementations can be modified, if necessary, to employ concepts of the various patents and applications to provide yet further implementations. As one example, it will be appreciated that various features and principles disclosed herein may be applied to rotary position encoders, wherein the x-axis direction and y-axis direction referred to in the description above and in the claims are to be respectively construed as corresponding to a circular measuring axis direction and a radial direction when applied to such rotary position encoders.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. An electronic position encoder usable to measure a relative position between two elements along a measuring axis direction that coincides with an x-axis direction, the electronic position encoder comprising:
    a scale extending along the measuring axis direction and including a signal modulating scale pattern including at least a first pattern track having a pattern track width dimension along a y-axis direction that is perpendicular to the x-axis direction, each pattern track including signal modulating elements that are arranged to provide a spatially varying characteristic which changes as a periodic function of position along the x-axis direction,
    a detector portion configured to be mounted proximate to the at least first pattern track and to move along the measuring axis direction relative to the at least first pattern track, the detector portion including a multi-layer circuit element having a front surface that faces the scale during normal operation, including:
        a field generating coil configuration fixed on multi-layer circuit element, including:
            an input portion including at least two connection portions that connect the field generating coil configuration to a coil drive signal from a signal processing configuration; and
            a first-track field generating coil portion configured to nominally surround a first-track generated field area that is nominally aligned with the first pattern track and generate a first-track changing magnetic flux in the first-track generated field area in response to the coil drive signal, the first-track field generating coil portion comprising:
                first-track first-side and second-side elongated portion configurations fabricated in one or more elongated portion layers of the multi-layer circuit element and extending along the x-axis direction on first and second sides of the first-track generated field area, wherein the first-track first-side and second-side elongated portion configurations collectively span or define a first-track elongated portion length dimension along the x-axis direction, and a minimum y-axis direction separation between the first-track first-side and second-side elongated portion configurations defines a first-track generated field area minimum width dimension, and
                a set of first-track conductor paths, wherein each member conductor path is connected to at least one of the first-track first-side or second-side elongated portion configurations and at least one member conductor path comprises a shielded layer conductor portion that is fabricated in a first-track shielded conductor layer of the multi-layer circuit element, and at least one such shielded layer conductor portion is a transverse conductor portion that extends along a direction transverse to the x-axis direction, and at least one such shielded layer transverse conductor portion spans at least the minimum y-axis direction separation between the first-track first-side and second-side elongated portion configurations and is included in a member conductor path that connects the first-track first-side and second-side elongated portion configurations in the first-track field generating coil portion;
        a conductive shield region configuration comprising at least one first-track conductive shield region that extends along the x-axis and y-axis directions and that is fabricated in a first-track shield region layer that is located between the first-track shielded conductor layer and one or more receiver loop layers of the multi-layer circuit element, with respect to their locations along a z-axis direction that is nominally normal to the front surface of the multi-layer circuit element; and
        a plurality of sensing elements comprising respective conductive receiver loops fabricated in the one or more receiver loop layers of the multi-layer circuit element, wherein the conductive receiver loops are distributed along the x-axis direction over a first-track sensing element area that is nominally aligned with the first pattern track, and the sensing elements are configured to provide detector signals or detector signal contributions which respond to a local effect on the first-track changing magnetic flux provided by adjacent signal modulating elements SME of the scale pattern; and
    a signal processing configuration that is operably connected to the detector portion to provide the coil drive signal and that is configured to determine the relative position between the detector portion and the scale pattern based on detector signals input from the detector portion,
wherein:
    at each end of the generated field area, at least one of the first-track first-side and second-side elongated portion configurations includes an end gradient arrangement configured to induce a field gradient that reduces the field strength in the generated field area as a function of position along the x-axis direction as the position approaches the end of the generated field area;
    at least one end gradient arrangement is connected to an associated one of the member conductor paths that includes an associated shielded layer transverse conductor portion that connects the first-track first-side and second-side elongated portion configurations; and the conductive shield region configuration comprises at least one first-track conductive shield region that is configured such that it is interposed between the receiver loop layers and the associated shielded layer transverse conductor portion that connects the first-track first-side and second-side elongated portion configurations, and is configured to intercept at least a majority of area of a z-axis projection of that associated shielded layer transverse conductor portion along the z-axis direction toward the receiver loop layers.

2. The electronic position encoder of claim 1, wherein:
the first-track sensing element area extends over a first-track sensing element area length dimension along the x-axis direction and a first-track sensing element area width dimension along the y-axis direction, wherein the first-track sensing element area length dimension along the x-axis direction is longer than the first-track elongated portion length dimension;
the associated shielded layer transverse conductor portion that connects the first-track first-side and second-side elongated portion configurations is configured such that its z-axis projection toward the receiver loop layers at least partially overlaps with the conductive receiver loops in the first-track sensing element area; and
the conductive shield region configuration comprises a first-track conductive shield region configured such that it is interposed between the receiver loop layers and the associated shielded layer transverse conductor portion that connects the first-track first-side and second-side elongated portion configurations and is configured to intercept all the area of the z-axis projection of that associated shielded layer transverse conductor portion along the z-axis direction toward the receiver loop layers, at least where that z-axis projection overlaps the first-track sensing element area, except where the first-track conductive shield region includes insulating voids that surround conductive feedthroughs that extend generally along the z-axis direction and pass through that respective first-track conductive shield region.

3. The electronic position encoder of claim 1, wherein:
at least one elongated portion layer and at least one receiver loop layer are the same layer of the multi-layer circuit element, and at least one of the first-track elongated portion configurations and at least some portions of the conductive receiver loops are fabricated in that same layer.

4. The electronic position encoder of claim 1, wherein at each end of the generated field area, each of the first-track first-side and second-side elongated portion configurations comprises an end gradient arrangement (EGA) configured to induce a field gradient that reduces the field strength in the generated field area as a function of position along the x-axis direction as the position approaches the end of the generated field area.

5. The electronic position encoder of claim 1, wherein the included end gradient arrangements are configured according to at least one of a Type A end gradient arrangement or a Type B end gradient arrangement, wherein,
a Type A end gradient arrangement comprises: at least two respective current path nodes in the associated first-side or second-side elongated portion configuration, including a distal current path node that is closest to the end and farthest from the center of the generated field area with respect to the x-axis direction, and a proximal current path node that is closest to the center and farthest from the end of the generated field area with respect to the x-axis direction, wherein the distal and proximal current path nodes are each connected in the elongated portion layer to a member conductor path that carries current outside the elongated portion layer, whereby in the associated elongated portion configuration (the net operational current flow in a central region that extends along the x-axis direction to the proximal current path node is relatively greater in the elongated portion layer, and the net operational current flow in an end node region that extends along the x-axis direction between the proximal current path node and the distal current path node is relatively smaller in the elongated portion layer; and a Type B end gradient arrangement comprises a configuration wherein the first-track first-side and second-side elongated portion configurations are relatively closer to one another along the y-axis direction in the elongated portion layer over a central region that extends along the x-axis direction, and the associated first-side or second-side elongated portion configuration is configured such that the first-track first-side and second-side elongated portion configurations are relatively farther from one another along the y-axis direction in the elongated portion layer over a respective end region that extends along the x-axis direction and is associated with a respective Type B end gradient arrangement, wherein the associated first-side or second-side elongated portion configuration is connected in the elongated portion layer in the respective end region to a member conductor path that carries current outside the elongated portion layer, whereby the generated field area is relatively narrower along the y-axis direction along the central region and relatively wider along the y-axis direction along the respective end region associated with the respective Type B end gradient arrangement.

6. The electronic position encoder of claim 5, wherein:
at least one included Type A end gradient arrangement further comprises at least one intermediate current path node located in the end node region between the distal current path node and the proximal current path node with respect to the x-axis direction; and
the intermediate current path node is connected in the elongated portion layer and is connected to a conductor path (CPATH) that carries current outside the elongated portion layer, whereby the net operational current flow in the elongated portion layer in a subregion of the end node region between the proximal current path node and the intermediate current path node is relatively smaller than the net operational current flow in the central region and relative larger than the net operational current flow in a subregion of the end node region between the intermediate current path node and the distal current path node.

7. The electronic position encoder of claim 5, comprising a first-track field generating coil portion that is configured with multi-turn configuration around the first-track generated field area that includes a plurality of end gradients arrangements (EGA) that comprise a combination of a Type A end gradient arrangement and a Type B end gradient arrangement, wherein the multi-turn configuration comprises:

a first first-side elongated portion of first-side elongated portion configuration including a proximal current path node of a first-side first-end EGA near a first end of the generated field area, and including a proximal current path node of a first-side second-end EGA near a second end of the generated field area;

a first second-side elongated portion of a second-side elongated portion configuration including a proximal current path node of a second-side second-end EGA near the second end of the generated field area, and including a proximal current path node of a second-side first-end EGA near the first end of the generated field area;

a second first-side elongated portion of the first-side elongated portion configuration including a distal current path node of the first-side first-end EGA near the first end of the generated field area, and including a distal current path node of the first-side second-end EGA near the second end of the generated field area; and a second second-side elongated portion of the second-side elongated portion configuration including a distal current path node of the second-side second-end EGA near the second end of the generated field area, and including a distal current path node of a second-side first-end EGA near the first end of the generated field area, wherein:

the proximal current path node of the first-side second-end EGA is connected in series to the proximal current path node of the second-side second-end EGA through a first member conductor path which comprises a conductive feedthrough that is connected to a shielded layer transverse conductor portion that is connected to a conductive feedthrough;

the proximal current path node of the second-side first-end EGA is connected in series to the distal current path node of the first-side first-end EGA through a second member conductor path which comprises a conductive feedthrough that is connected to a shielded layer transverse conductor portion that is connected to a conductive feedthrough;

the distal current path node of the first-side second-end EGA is connected in series to the distal current path node of the second-side second-end EGA through a third member conductor path which comprises a conductive feedthrough that is connected to a shielded layer transverse conductor portion that is connected to a conductive feedthrough;

the distal current path node of the second-side first-end EGA is connected in series to a drive signal input through a conductor path which comprising a conductive feedthrough and a shielded layer conductor portion; and the proximal current path node of the first-side first-end EGA is connected in series to a drive signal input through a conductor path which comprises a conductive feedthrough and a shielded layer conductor portion.

8. The electronic position encoder of claim 5, wherein at least one included end gradient arrangement comprises a Type A end gradient arrangement.

9. The electronic position encoder of claim 8, wherein in at least one Type A end gradient arrangement each respective current path node is connected to a respective member conductor path comprising a respective conductive feedthrough that extends generally along the z-axis direction and connects that current path node to a shielded layer conductor portion.

10. The electronic position encoder of claim 9, wherein in at least one Type A end gradient arrangement each respective current path node is connected through its respective conductive feedthrough to the same shielded layer conductor portion.

11. The electronic position encoder of claim 9, wherein the conductive shield region configuration comprises respective first-track conductive shield regions interposed between the receiver loop layers and all respective shielded layer transverse conductor portions included in any member conductor paths connected to current path nodes included in any Type A end gradient arrangement, wherein the respective first-track conductive shield regions are configured to intercept the entire area of a z-axis projection of all the respective shielded layer transverse conductor portions included in any member conductor paths connected to current path nodes included in any Type A end gradient arrangement, at least where the z-axis projection overlaps the first-track sensing element area, except where the respective first-track conductive shield regions include insulating voids that surround the respective conductive feedthroughs.

12. The electronic position encoder of claim 8, wherein:

the signal modulating elements of the first pattern track are arranged corresponding to a spatial wavelength WL along the x-axis direction; and each Type A end gradient arrangement is configured such that its end node region has an end node region dimension ENRDX along the x-axis direction that is at least J*WL, wherein J is a number that is at least 1.

13. The electronic position encoder of claim 12, wherein J is at least 2.

14. The electronic position encoder of claim 8, wherein:

the first-track sensing element area extends over a first-track sensing element area length dimension along the x-axis direction and a first-track sensing element area width dimension along the y-axis direction, wherein the first-track sensing element area length dimension along the x-axis direction is longer than the first-track elongated portion length dimension;

at least one shielded layer transverse conductor portion included in a member conductor path connected to current path node included in a Type A end gradient arrangement is configured such that its z-axis projection toward the receiver loop layers at least partially overlaps with the conductive receiver loops in the first-track sensing element area; and the conductive shield region configuration comprises respective first-track conductive shield regions interposed between the receiver loop layers and all respective shielded layer transverse conductor portions included in any member conductor paths connected to current path nodes included in any Type A end gradient arrangement, wherein the respective first-track conductive shield regions are configured to intercept the entire area of a z-axis projection of all the respective shielded layer transverse conductor portions included in any member conductor paths connected to current path nodes included in any Type A end gradient arrangement, at least where the z-axis projection overlaps the first-track sensing element area, except where the respective first-track conductive shield regions include insulating voids that surround conductive feedthroughs that extend generally along the z-axis direction and pass through the respective first-track conductive shield regions.

15. The electronic position encoder of claim 14, wherein:
the conductive shield region configuration comprises respective first-track conductive shield regions interposed between the receiver loop layers and all respective shielded layer conductor portions included in any member conductor paths connected to current path nodes included in any Type A end gradient arrangement, wherein the respective first-track conductive shield regions are configured to intercept the entire area of a z-axis projection of all the respective shielded layer conductor portions included in any member conductor paths connected to current path nodes included in any Type A end gradient arrangement, at least where the z-axis projection falls within a y-axis width dimension that spans the first-side and second-side elongated portion configurations, except where the respective first-track conductive shield regions include insulating voids that surround conductive feedthroughs that extend generally along the z-axis direction and pass through the respective first-track conductive shield regions.

16. The electronic position encoder of claim 14, wherein:
the signal modulating elements of the first pattern track are arranged corresponding to a spatial wavelength WL along the x-axis direction; and
the first-track sensing element area length dimension along the x-axis direction extends beyond the first-track elongated portion length dimension at each end by an amount SE that is at least WL.

17. The electronic position encoder of claim 5, wherein at least one included end gradient arrangement comprises a Type B end gradient arrangement.

18. The electronic position encoder of claim 17, wherein in at least one included Type B end gradient arrangement the respective end region includes a proximal subregion that is closer to the central region and a distal subregion that is farther from the central region than the proximal subregion, and in the distal subregion the first-track first-side and second-side elongated portion configurations are separated relatively farther from one another along the y-axis direction in comparison to their separation in the proximal subregion.

19. The electronic position encoder of claim 17, wherein in each included Type B end gradient arrangement:
its associated first-side or second-side elongated portion configuration comprises at least one respective first-track elongated portion connected in its respective end region to a member conductor path comprising a respective conductive feedthrough and a shielded layer conductor portion, wherein that respective conductive feedthrough is connected between that respective first-track elongated portion and the shielded layer conductor portion.

20. The electronic position encoder of claim 17, wherein:
the signal modulating elements of the first pattern track are arranged corresponding to a spatial wavelength WL along the x-axis direction; and
each included Type B end gradient arrangement is configured such that its respective end region extends over an end region dimension ERDX along the x-axis direction that is at least J*WL, wherein J is a number that is at least 2.

* * * * *

UNITED STATES PATENT AND TRADEMARK OFFICE
CERTIFICATE OF CORRECTION

| | |
|---|---|
| PATENT NO. | : 11,169,008 B2 |
| APPLICATION NO. | : 16/863543 |
| DATED | : November 9, 2021 |
| INVENTOR(S) | : Ted Staton Cook |

It is certified that error appears in the above-identified patent and that said Letters Patent is hereby corrected as shown below:

In the Claims

Column 52, Claim 6, Line 42:
"6. The electronic position encoder of claim 5, wherein:" should read: --8. The electronic position encoder of claim 7, wherein:--.

Column 52, Claim 7, Line 60:
"7. The electronic position encoder of claim 5, comprising" should read: --6. The electronic position encoder of claim 5, comprising--.

Column 53, Claim 8, Line 61:
"8. The electronic position encoder of claim 5, wherein at" should read: --7. The electronic position encoder of claim 5, wherein at--.

Column 53, Claim 9, Line 64:
"9. The electronic position encoder of claim 8, wherein in" should read: --9. The electronic position encoder of claim 7, wherein in--.

Column 54, Claim 12, Line 26:
"12. The electronic position encoder of claim 8, wherein:" should read: --12. The electronic position encoder of claim 7, wherein:--.

Column 54, Claim 14, Line 37:
"14. The electronic position encoder of claim 8, wherein:" should read: --14. The electronic position encoder of claim 7, wherein:--.

Signed and Sealed this
Twenty-third Day of May, 2023

Katherine Kelly Vidal
*Director of the United States Patent and Trademark Office*